United States Patent
Suzuki et al.

(10) Patent No.: US 10,353,507 B2
(45) Date of Patent: Jul. 16, 2019

(54) FORCE DETECTION APPARATUS, DISPLAY APPARATUS, AND ORGANIC ELECTRO-LUMINESCENCE DISPLAY APPARATUS

(71) Applicant: Japan Display Inc., Tokyo (JP)

(72) Inventors: Takafumi Suzuki, Tokyo (JP); Shota Hosaka, Tokyo (JP); Yosuke Nakamori, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 15/665,761

(22) Filed: Aug. 1, 2017

(65) Prior Publication Data

US 2018/0039367 A1 Feb. 8, 2018

(30) Foreign Application Priority Data

Aug. 2, 2016 (JP) .................. 2016-152168

(51) Int. Cl.
*G06F 3/044* (2006.01)
*G06F 3/041* (2006.01)
*G02F 1/1343* (2006.01)
*G02F 1/1333* (2006.01)

(52) U.S. Cl.
CPC .......... *G06F 3/0414* (2013.01); *G02F 1/1343* (2013.01); *G02F 1/13338* (2013.01); *G06F 3/044* (2013.01)

(58) Field of Classification Search
CPC .... G06F 3/0414; G06F 3/044; G02F 1/13338; G02F 1/1343

USPC .......................................................... 345/174
See application file for complete search history.

(56) References Cited

U.S. PATENT DOCUMENTS

| | | | | |
|---|---|---|---|---|
| 2010/0149153 A1* | 6/2010 | Yamamoto | ........... | G09G 3/3233 345/211 |
| 2016/0320914 A1 | 11/2016 | Tachikawa et al. | | |
| 2017/0075493 A1* | 3/2017 | Lee | ........ | G06F 3/0418 |
| 2017/0371470 A1* | 12/2017 | Nathan | ................ | G06F 3/0414 |

FOREIGN PATENT DOCUMENTS

JP 2015-127657 A 7/2015

\* cited by examiner

*Primary Examiner* — Jennifer Mehmood
*Assistant Examiner* — Ngan T Pham Lu
(74) *Attorney, Agent, or Firm* — K&L Gates LLP

(57) ABSTRACT

According to an aspect, a force detection apparatus includes: a first electrode facing an input surface to which an object to be detected applies force, and configured to be supplied with a drive signal; a conductor facing the first electrode, and supplied with a reference potential; a second electrode and a third electrode arranged between the first electrode and the conductor; a first dielectric layer arranged between the first electrode, and the second electrode and the third electrode; and a second dielectric layer arranged between the second electrode and the third electrode, and the conductor. The second electrode is supplied with the reference potential. A signal that is the same as the drive signal is supplied in synchronization with the drive signal to the third electrode.

14 Claims, 49 Drawing Sheets

FIG.49
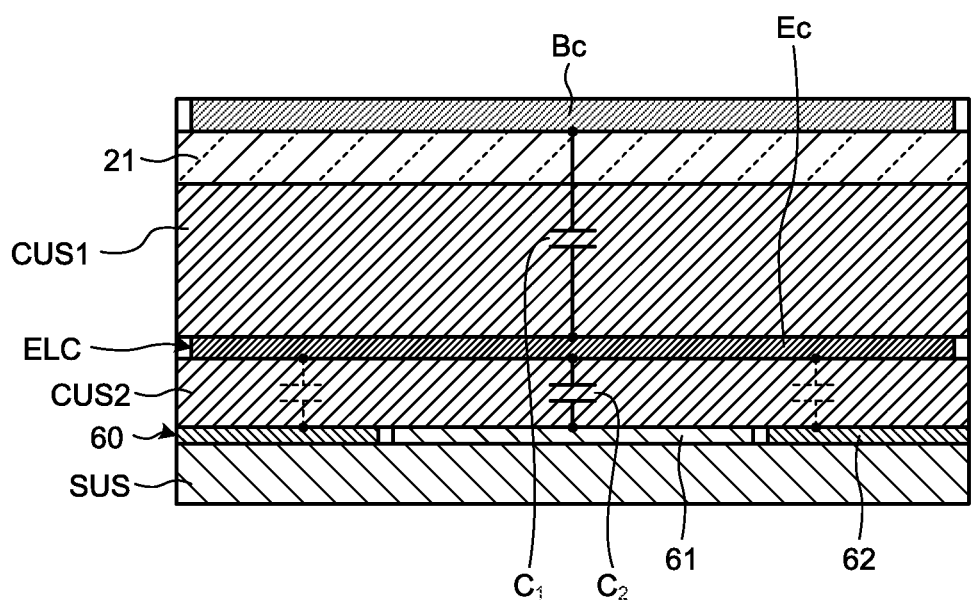
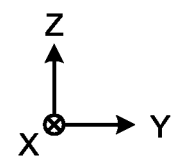

FORCE DETECTION APPARATUS, DISPLAY APPARATUS, AND ORGANIC ELECTRO-LUMINESCENCE DISPLAY APPARATUS

CROSS-REFERENCE TO RELATED APPLICATIONS

This application claims priority from Japanese Application No. 2016-152168, filed on Aug. 2, 2016, the contents of which are incorporated by reference herein in its entirety.

BACKGROUND

1. Technical Field

The present invention relates to a force detection apparatus, a display apparatus, and an organic electro-luminescence display apparatus capable of detecting force applied to an input surface.

2. Description of the Related Art

In recent years, touch detection apparatuses, what are called touch panels, capable of detecting an external in-proximity object, have attracted attention. A touch panel is mounted on a display apparatus such as a liquid crystal display apparatus or integrated with the display apparatus, and the apparatus is used as a display apparatus with a touch detection function. The display apparatus with a touch detection function displays various button images and the like in the display apparatus to enable an information input, using the touch panel as a substitute for typical mechanical buttons.

Force detection apparatuses capable of detecting force applied to the touch panel, in addition to the touch detection, have also been used.

As a related technology, Japanese Patent Application Laid-open No. 2015-127657 describes an input apparatus that linearizes an output characteristic of a pressure sensor, using an inverse function of an output characteristic function of the pressure sensor.

There is a force detection apparatus that detects force on the basis of change of capacitance between a first conductor and a second conductor, the first conductor being provided on an input surface side of a touch panel, and the second conductor being provided on a back surface side of the touch panel. When force is applied to the input surface of the detection apparatus, the touch panel is bent, an air layer between the first conductor and the second conductor becomes thin, a distance between the first conductor and the second conductor becomes short, and the capacitance between the first conductor and the second conductor is increased. The force detection apparatus outputs a force signal value on the basis of the change of the capacitance.

By the way, if only the air layer exists between the first conductor and the second conductor, the thickness of the air layer reaches zero when strong force is applied to the input surface, and thus the detection apparatus cannot detect the strong force. Therefore, providing a cushion layer between the first conductor and the second conductor, in addition to the air layer, can be considered. In doing so, when weak force is applied to the input surface, only the air layer becomes thin and the cushion layer is not deformed. Therefore, the force detection apparatus can favorably detect the weak force. When the strong force is applied to the input surface, the thickness of the air layer reaches zero and the cushion layer is elastically deformed according to the force. Therefore, the force detection apparatus can favorably detect the strong force.

In a first range in which only the air layer becomes thin and the cushion layer is not deformed, a relationship between the force and the force signal value becomes linear. Similarly, even in a second range in which the thickness of the air layer reaches zero and the cushion layer is elastically deformed according to the force, the relationship between the force and the force signal value becomes linear. However, permittivity of the air layer and permittivity of the cushion layer are different. Further, the degree of change of the thickness of the air layer with respect to the force and the degree of change of the thickness of the cushion layer with respect to the force are different. Therefore, an inflection point occurs in the relationship between the force and the force signal value in a boundary between the first range and the second range. Therefore, the relationship between the force and the force signal value is not linear in the entire range that is a combination of the first range and the second range. Therefore, the force detection apparatus cannot favorably detect the force.

For the foregoing reasons, there is a need for a force detection apparatus, a display apparatus, and an organic electro-luminescence display apparatus capable of favorably detecting force.

SUMMARY

According to an aspect, a force detection apparatus includes: a first electrode facing an input surface to which an object to be detected applies force, and configured to be supplied with a drive signal; a conductor facing the first electrode, and supplied with a reference potential; a second electrode and a third electrode arranged between the first electrode and the conductor; a first dielectric layer arranged between the first electrode, and the second electrode and the third electrode; and a second dielectric layer arranged between the second electrode and the third electrode, and the conductor. The second electrode is supplied with the reference potential. A signal that is the same as the drive signal is supplied in synchronization with the drive signal to the third electrode.

According to another aspect, an organic electro-luminescence display apparatus includes: a first electrode facing an input surface to which an object to be detected applies force, and configured to be supplied with a drive signal; a conductor facing the first electrode, and supplied with a reference potential; a second electrode and a third electrode arranged between the first electrode and the conductor; a first dielectric layer arranged between the first electrode, and the second electrode and the third electrode; a second dielectric layer arranged between the second electrode and the third electrode, and the conductor; and an organic electro-luminescence display device arranged opposite the second electrode and the third electrode across the first electrode, and configured to display an image toward the input surface. The first electrode is coupled with an anode or a cathode of an organic electro-luminescence element. The second electrode is supplied with a reference potential. A signal that is the same as the drive signal is supplied in synchronization with the drive signal to the third electrode.

BRIEF DESCRIPTION OF THE DRAWINGS

FIG. 49 is an enlarged sectional view of a portion surrounded by the broken line in FIG. 48;

DETAILED DESCRIPTION

Embodiments of the present invention will be described in detail with reference to the drawings. The present invention is not limited by content described in the embodiments below. Configuration elements described below include elements easily arrived at by a person skilled in the art and elements substantially the same. Further, the configuration elements described below can be appropriately combined. What is disclosed herein is merely an example, and appropriate modifications which maintain the points of the invention, and which can be easily conceived by a person skilled in the art, are obviously included in the scope of the present invention. To make description more clear, the drawings may be schematically illustrated in the width, thickness, shapes, and the like of respective portions, compared with actual forms. However, such illustration is merely an example, and does not limit the construction of the present invention. In the present specification and drawings, elements similar to those described with respect to the drawings that have already been mentioned are denoted with the same reference signs, and detailed description may be appropriately omitted.

In this disclosure, when an element is described as being "on" another element, the element can be directly on the other element, or there can be one or more elements between the element and the other element.

Figure 1:
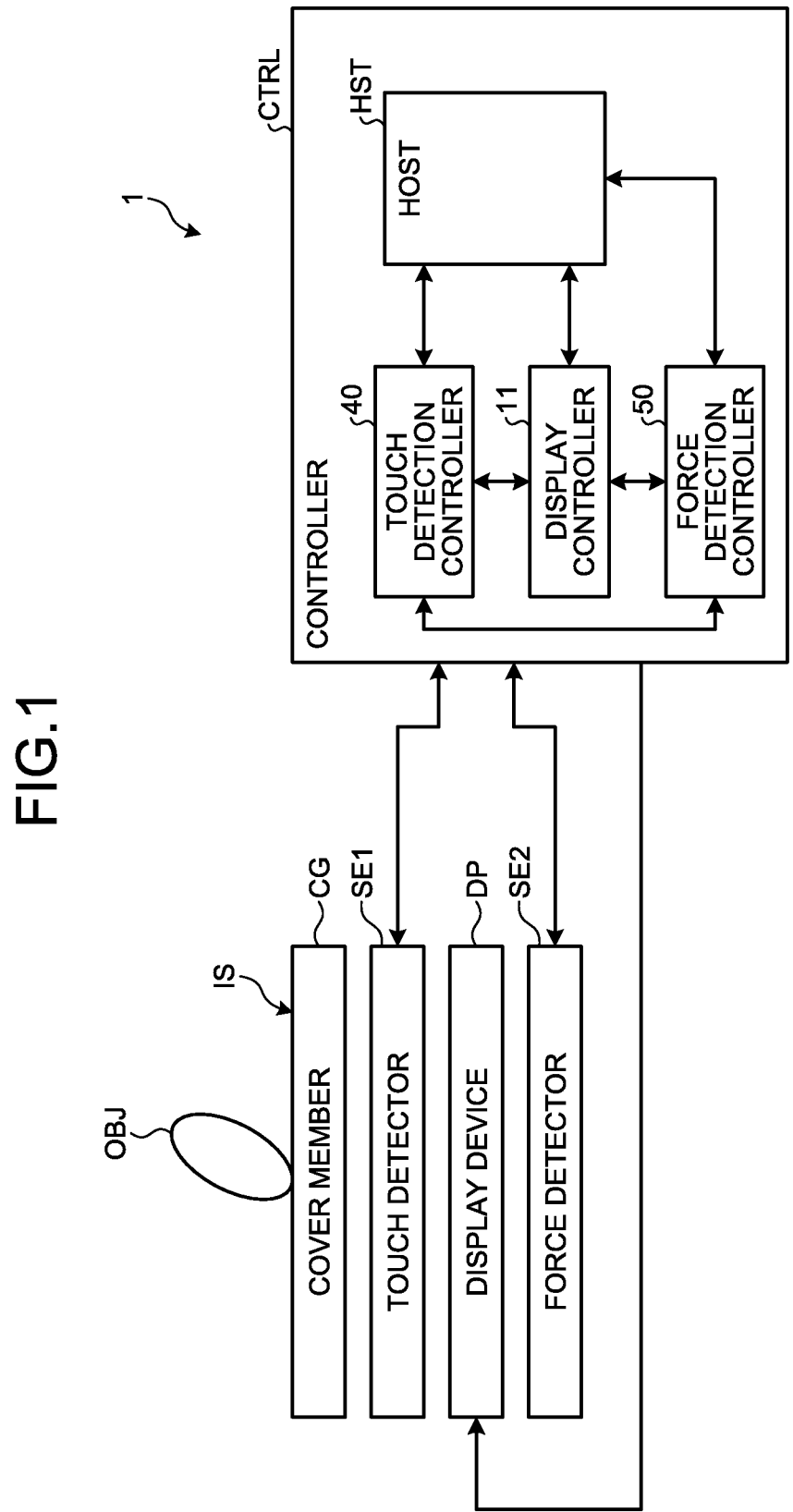
FIG. 1 is a block diagram illustrating a configuration of a display apparatus with a touch detection function according to an embodiment.

FIG. 1 is a block diagram illustrating a configuration of a display apparatus with a touch detection function according to an embodiment of the present invention.

A display apparatus 1 with a touch detection function according to the present embodiment includes a touch detector SE1, a display device DP, a force detector SE2, and a controller CTRL. A combination of the force detector SE2 and the controller CTRL in the display apparatus 1 with a touch detection function is an example of a force detection apparatus of the present invention.

The touch detector SE1 detects contact or proximity of an object to be detected OBJ with or to an input surface IS of a cover member CG. To be specific, the touch detector SE1 outputs a signal value according to the contact with or proximity to a region in the input surface IS, with which the object to be detected OBJ overlaps, in a direction perpendicular to the input surface IS, to the controller CTRL.

The object to be detected OBJ may be a first-type object that is deformed when coming in contact with the input surface IS, or may be a second-type object that is not deformed or has less deformation than the first-type object when coming in contact with the input surface IS. Examples of the first-type object include, but are not limited to, a finger. Examples of the second-type object include, but are not limited to, a resin or metal stylus pen.

The number of the objects to be detected that are detectable by the touch detector SE1 is not limited to one. The touch detector SE1 may be configured to detect two or more objects to be detected. Examples of the touch detector SE1 include, but are not limited to, a capacitive sensor and a resistive film sensor. Examples of the capacitive sensor include a mutual-capacitive sensor and a self-capacitive sensor.

The display device DP displays an image toward an input surface IS side. Examples of the display device DP include, but are not limited to, a liquid crystal display apparatus and an organic electro-luminescence display apparatus.

The touch detector SE1 and the display device DP may be integrated into an in-cell-type device. The touch detector SE1 and the display device DP may make up an on-cell-type device having the touch detector SE1 mounted on the display device DP.

The force detector SE2 detects force of the object to be detected OBJ that presses the input surface IS. To be specific, the force detector SE2 outputs a signal according to the force of the object to be detected OBJ that presses the input surface IS to the controller CTRL. Examples of the force detector SE2 include a capacitive sensor.

The controller CTRL calculates a force signal value that indicates force on the basis of the signal output from the force detector SE2. The controller CTRL includes a display controller 11, a touch detection controller 40, a force detection controller 50, and a host HST.

Examples of the display controller 11 include an IC chip mounted on a glass substrate of the display device DP. Examples of the touch detection controller 40 include an IC chip mounted on a printed substrate (for example, a flexible printed substrate) coupled with the glass substrate of the display device DP. Examples of the force detection controller 50 include an IC chip mounted on the printed substrate coupled with the glass substrate of the display device DP. Examples of the host HST include a central processing unit (CPU). The display controller 11, the touch detection controller 40, the force detection controller 50, and the host HST control the touch detector SE1, the display device DP, and the force detector SE2 in cooperation with one another.

Processing for calculating the force signal value, executed by the controller CTRL, may be executed by the display controller 11, by the touch detection controller 40, by the force detection controller 50, by the host HST, or by two or more of the display controller 11, the touch detection controller 40, the force detection controller 50, and the host HST in cooperation with one another.

Hereinafter, specific configuration examples of the touch detector SE1, the display device DP, and the force detector SE2 will be described. However, the embodiments are not limited to these configuration examples.

Configuration Examples of Touch Detector and Display Device

Figure 2:
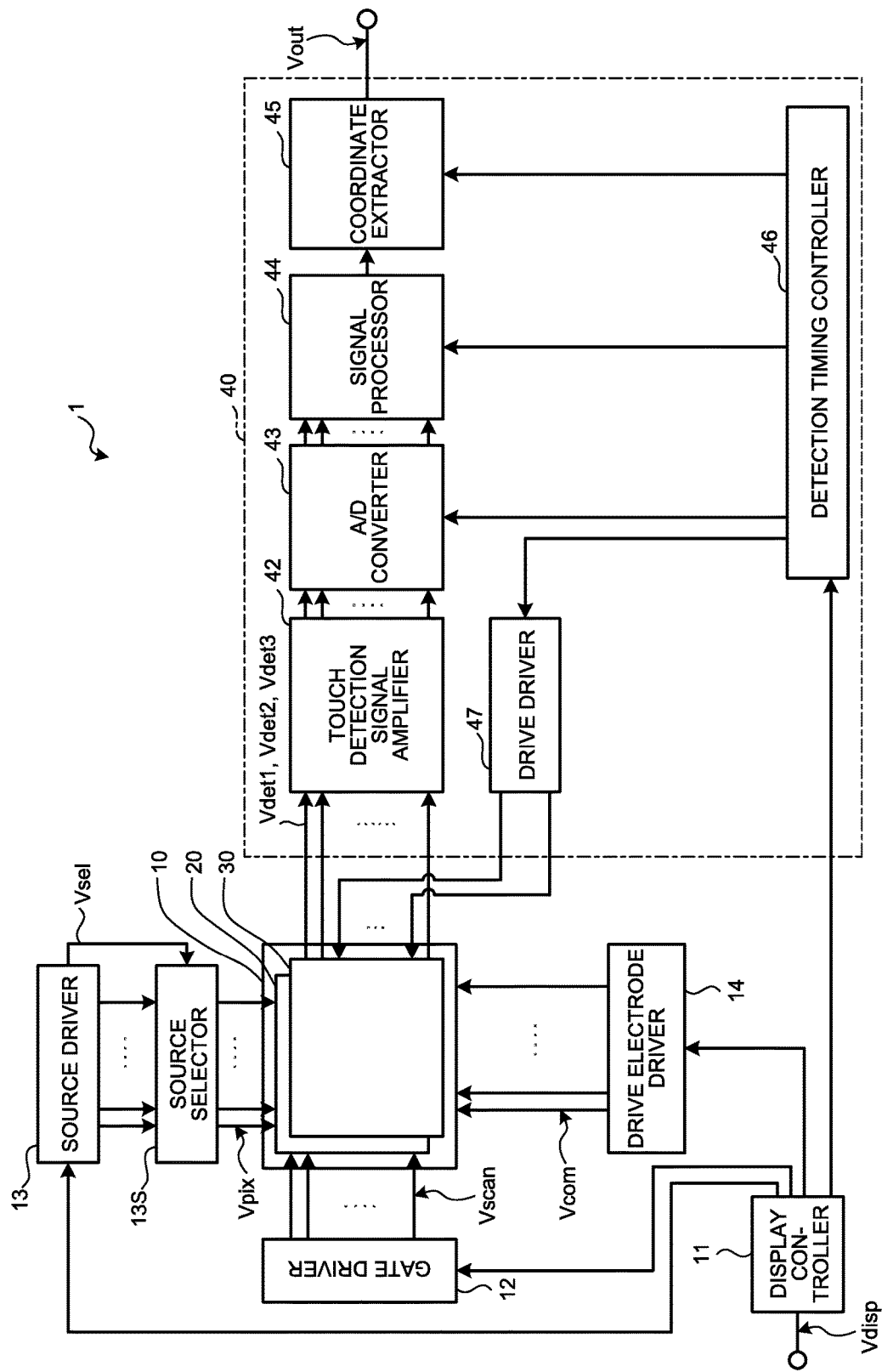
FIG. 2 is a block diagram illustrating configuration examples of a touch detector and a display device of the display apparatus with a touch detection function according to the embodiment.

FIG. 2 is a block diagram illustrating configuration examples of the touch detector and the display device of the display apparatus with a touch detection function according to the embodiment. The display apparatus 1 with a touch detection function illustrated in FIG. 2 is an apparatus that detects coordinates and a contact area of the object to be detected OBJ by mutual-capacitive detection or self-capacitive detection.

The display apparatus 1 with a touch detection function includes a display device 10 with a touch detection function, the display controller 11, a gate driver 12, a source driver 13, a source selector 13S, a drive electrode driver 14, and the touch detection controller 40.

The display device 10 with a touch detection function is an in-cell-type or hybrid-type device obtained by incorporating a capacitive touch detection device 30 into a liquid crystal display device 20 such that the liquid crystal display device 20 and the capacitive touch detection device 30 are integrated. The liquid crystal display device 20 is a device that uses a liquid crystal display element as a display element. Incorporating the capacitive touch detection device 30 into the liquid crystal display device 20 such that the liquid crystal display device 20 and the capacitive touch detection device 30 are integrated includes, for example, using several members such as a substrate and electrodes for both the liquid crystal display device 20 and the touch detection device 30.

The liquid crystal display device 20 corresponds to the display device DP of FIG. 1. The touch detection device 30 corresponds to the touch detector SE1 of FIG. 1.

The display device 10 with a touch detection function may be an on-cell-type device having the capacitive touch detection device 30 mounted on the upper side of the liquid crystal display device 20 that uses a liquid crystal display element as a display element. In a case of the on-cell-type device, the touch detection device 30 may be provided directly on the liquid crystal display device 20, or the touch detection device 30 may be provided above the liquid crystal display device 20 and an intervening layer, instead of directly on the liquid crystal display device 20.

In the present configuration example, the liquid crystal display device 20 is employed as the display device DP. However, the display device DP may employ an organic electro-luminescence (organic EL) element. In this case, one of an anode and a cathode that form the organic EL element may be used as a drive electrode COML related to touch detection described below.

The liquid crystal display device 20 is a device that sequentially scans one horizontal line at a time and performs display, according to a scanning signal Vscan supplied from the gate driver 12, as described below.

The display controller 11 is a circuit that respectively supplies control signals to the gate driver 12, the source driver 13, the drive electrode driver 14, and the touch detection controller 40 on the basis of a video signal Vdisp supplied from the host HST, and controls the aforementioned drivers and controller to be operated in synchronization with one another. The display controller 11 generates an image signal Vsig from the video signals Vdisp of one horizontal line. The image signal Vsig is obtained by time-division multiplexing pixel signals Vpix for sub-pixels SPix of the liquid crystal display device 20. The display controller 11 supplies the generated image signal Vsig to the source driver 13.

The controller CTRL in the present disclosure includes the display controller 11, the gate driver 12, the source driver 13, and the drive electrode driver 14.

The gate driver 12 has a function to sequentially select one horizontal line to be displayed and driven, of the display device 10 with a touch detection function, on the basis of the control signal supplied from the display controller 11.

The source driver 13 is a circuit that supplies the pixel signal Vpix to pixels Pix (sub-pixels SPix) of the display device 10 with a touch detection function, on the basis of the control signal supplied from the display controller 11. For example, six-bit image signals Vsig of red (R), green (G), and blue (B) are provided to the source driver 13.

The source driver 13 receives the image signal Vsig from the display controller 11, and supplies the image signal Vsig to the source selector 13S. The source driver 13 generates a switch control signal Vsel, which is necessary to separate the pixel signals Vpix multiplexed into the image signal Vsig, and supplies the generated switch control signal Vsel together with the pixel signals Vpix to the source selector 13S. The source selector 13S can reduce the number of wires between the source driver 13 and the display controller 11. The source selector 13S may not be included. A part of control of the source driver 13 may be performed by the display controller 11, and only the source selector 13S may be arranged.

The drive electrode driver 14 is a circuit that supplies drive signals Vcom to the drive electrode COML described below of the display device 10 with a touch detection function, on the basis of the control signal supplied from the display controller 11. The drive signals Vcom include a drive signal (touch drive signal) Vcomtm for mutual-capacitive touch detection, a drive signal Vcomts2 for self-capacitive touch detection, and a display drive voltage VcomDC as a display voltage.

The touch detection controller 40 includes a drive driver 47 that supplies a drive signal Vcomts1 to a touch detection electrode TDL described below in performing a self-capacitive touch detection operation.

The touch detection device 30 is operated on the basis of a basic principle of mutual-capacitive touch detection, and the touch detection electrode TDL outputs a detection signal Vdet1. The touch detection device 30 is operated on the basis of a basic principle of self-capacitive touch detection, and the touch detection electrode TDL outputs a detection signal Vdet2. The touch detection device 30 is operated on the basis of the basic principle of self-capacitive touch detection, and the drive electrode COML and an intermediate electrode ELC output a detection signal Vdet3 through a voltage detector.

The touch detection device 30 can be configured to perform touch detection only using mutual-capacitive touch detection technology. However, to favorably reduce an influence of moisture beads and the like adhering to the input surface IS and to favorably detect a stylus pen or the like, the touch detection device 30 executes both the mutual-capacitive touch detection and the self-capacitive touch detection in the present configuration example. Note that the embodiments are not limited to the case of executing both the mutual-capacitive touch detection and the self-capacitive touch detection.

The basic principle of mutual-capacitive touch detection of the display apparatus 1 with a touch detection function of the present configuration example will be described with reference to FIGS. 3 to 5.

Figure 3:
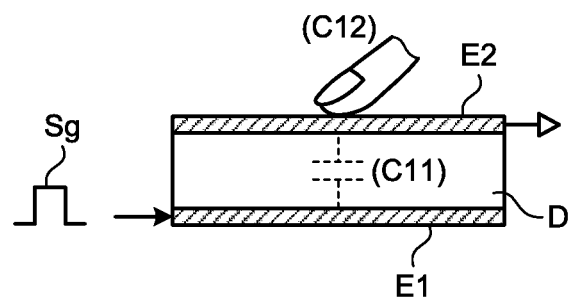
FIG. 3 is an explanatory diagram illustrating a state in which an object to be detected is in contact with or in proximity to a touch detection electrode, for describing a basic principle of mutual-capacitive touch detection.

FIG. 3 is an explanatory diagram illustrating a state in which an object to be detected is in contact with or in proximity to a touch detection electrode, for describing the basic principle of mutual-capacitive touch detection. FIG. 4 is an explanatory diagram illustrating an example of an equivalent circuit of mutual-capacitive touch detection. FIG. 5 is a diagram illustrating an example of waveforms of the drive signal and the detection signal of mutual-capacitive touch detection. FIG. 4 also illustrates a detection circuit.

For example, as illustrated in FIG. 3, a capacitance element C11 includes a drive electrode E1 and a touch detection electrode E2 that are a pair of electrodes arranged to face each other across a dielectric D. As illustrated in FIG. 4, the capacitance element C11 has one end coupled with an alternating-current signal source (drive signal source) S and the other end coupled with a voltage detector (touch detector) DET. The voltage detector DET is an integrated circuit included in a touch detection signal amplifier 42 illustrated in FIG. 2, for example.

When an alternating-current rectangular wave Sg of a predetermined frequency (a frequency on the order of several kHz to several hundreds of kHz, for example) is applied from the alternating-current signal source S to the drive electrode E1 (one end of the capacitance element C11), an output wave form (detection signal Vdet1) appears through the voltage detector DET coupled with the touch detection electrode E2 (the other end of the capacitance element C11). This alternating-current rectangular wave Sg corresponds to the drive signal Vcomtm, described below.

In a state in which the object to be detected is not in contact with or in proximity to the touch detection electrode E2 (non-contact state), a current $I_0$ according to a capacitance value of the capacitance element C11 flows with charge and discharge from/to the capacitance element C11. As illustrated in FIG. 5, the voltage detector DET converts variation of the current $I_0$ according to the alternating-current rectangular wave Sg into variation of voltage (a waveform $V_0$ in the solid line).

Meanwhile, in a state in which the object to be detected is in contact with (or in proximity to) the touch detection electrode E2 (in a contact state), capacitance C12 formed with a finger of a user is in contact with or in proximity to the touch detection electrode E2, as illustrated in FIG. 3, so that fringe capacitance between the drive electrode E1 and the touch detection electrode E2 is interrupted. Due to this, the capacitive element functions as a capacitance element C11' having a smaller capacitance value than the capacitance element C11. Then, as seen in the equivalent circuit illustrated in FIG. 4, a current $I_1$ flows in the capacitance element C11'.

Figure 5:
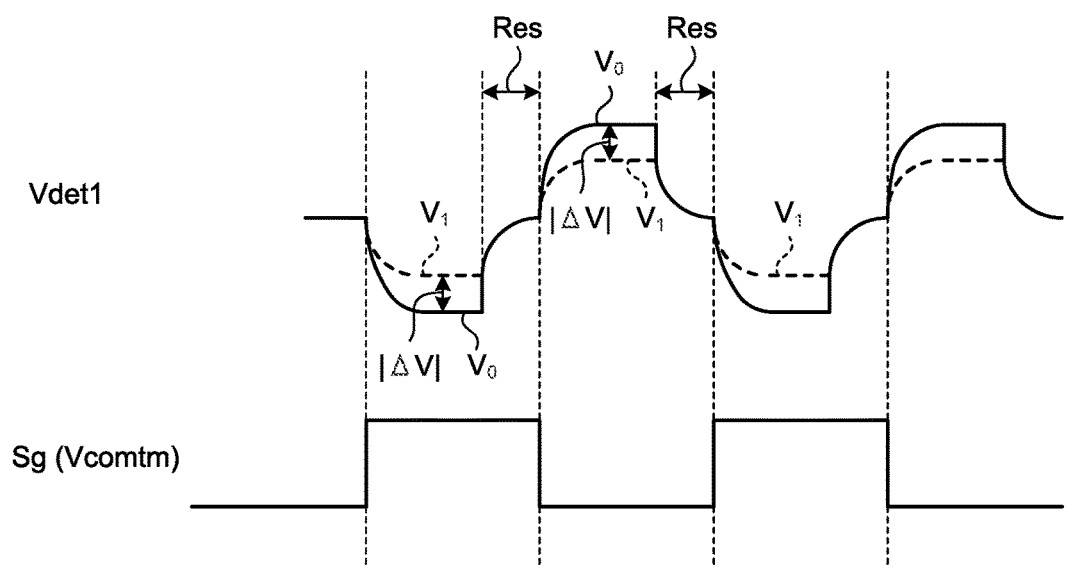
FIG. 5 is a diagram illustrating an example of waveforms of a drive signal and a detection signal of mutual-capacitive touch detection.

As illustrated in FIG. 5, the voltage detector DET converts variation of the current according to the alternating-current rectangular wave Sg into variation of voltage (the waveform $V_1$ in the dotted line). In this case, the waveform $V_1$ has smaller amplitude than the above-described waveform $V_0$. Accordingly, an absolute value $|\Delta V|$ of a voltage difference between the waveform $V_0$ and the waveform $V_1$ is changed according to an influence of the object to be detected. To accurately detect the absolute value $|\Delta V|$ of a voltage difference between the waveform $V_0$ and the waveform $V_1$, it is more favorable that the voltage detector DET performs an operation provided with a period Res to reset charge and discharge of a capacitor in accordance with the frequency of the alternating-current rectangular wave Sg by switching in the circuit.

Referring back to FIG. 2, the touch detection device 30 sequentially scans one detection block at a time according to the drive signal Vcomtm supplied from the drive electrode driver 14, and outputs the detection signal Vdet1.

Next, the basic principle of self-capacitive touch detection of the display apparatus 1 with a touch detection function of the present configuration example will be described with reference to FIGS. 6 to 9.

Figure 6:
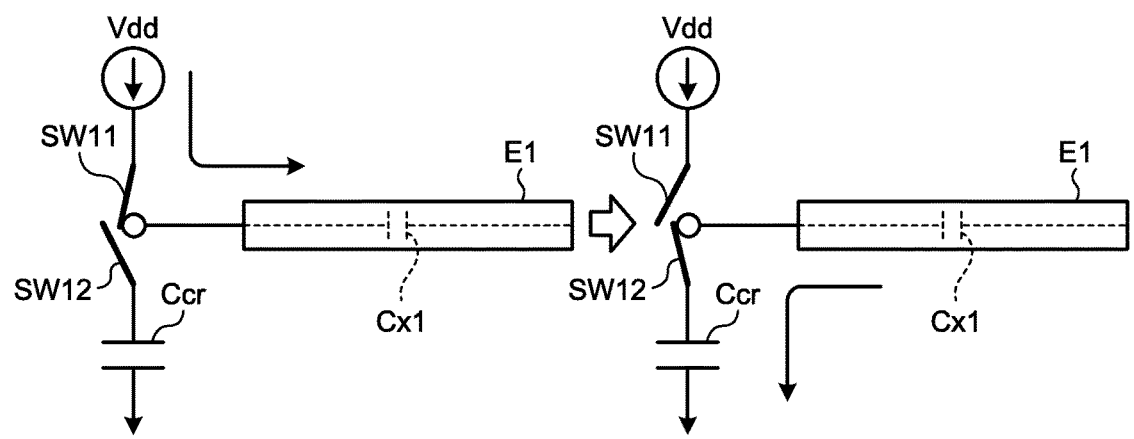
FIG. 6 is an explanatory diagram illustrating a state in which an object to be detected is neither in contact with nor in proximity to a detection electrode, for describing a basic principle of self-capacitive touch detection.
Figure 7:
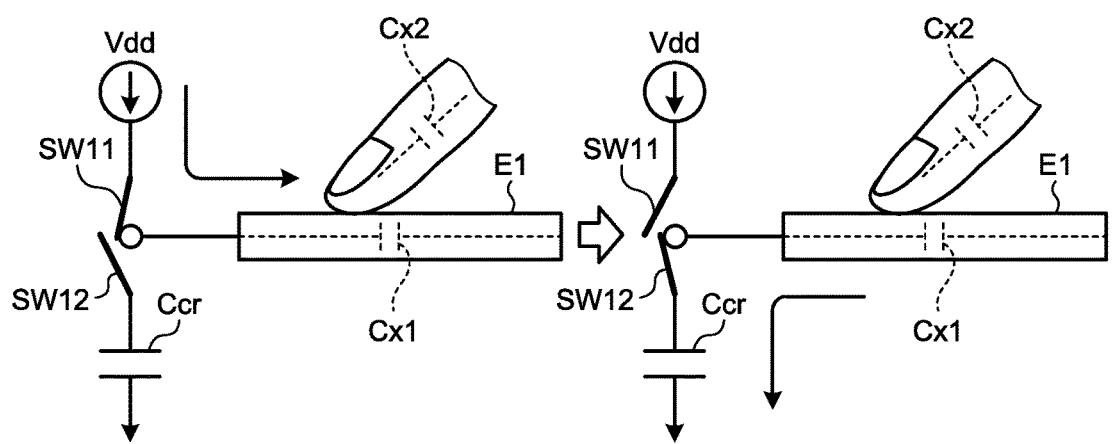
FIG. 7 is an explanatory diagram illustrating a state in which an object to be detected is in contact with or in proximity to the detection electrode, for describing the basic principle of self-capacitive touch detection.
Figure 8:
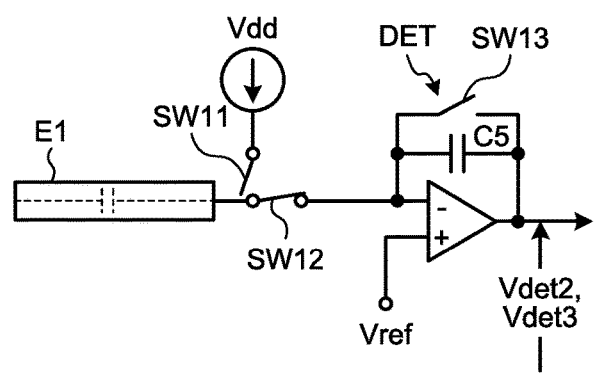
FIG. 8 is an explanatory diagram illustrating an example of an equivalent circuit of self-capacitive touch detection.
Figure 9:
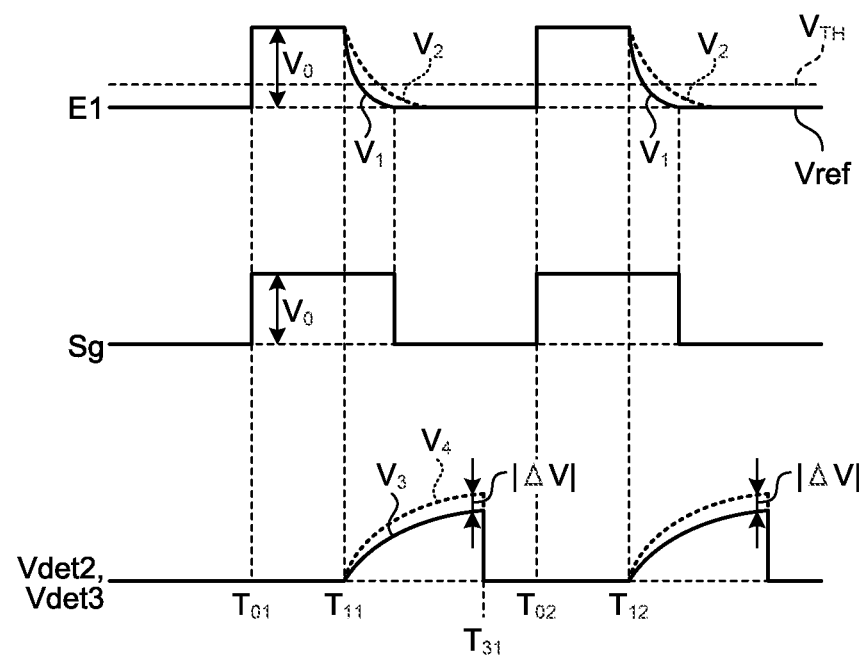
FIG. 9 is a diagram illustrating an example of waveforms of a drive signal and a detection signal of self-capacitive touch detection.

FIG. 6 is an explanatory diagram illustrating a state in which an object to be detected is neither in contact with nor in proximity to a detection electrode, for describing the basic principle of self-capacitive touch detection. FIG. 7 is an explanatory diagram illustrating a state in which an object to be detected is in contact with or in proximity to the detection electrode, for describing the basic principle of self-capacitive touch detection. FIG. 8 is an explanatory diagram illustrating an example of an equivalent circuit of self-capacitive touch detection. FIG. 9 is a diagram illustrating an example of waveforms of the drive signal and the detection signal of self-capacitive touch detection.

The left diagram in FIG. 6 illustrates a state in which a power source Vdd is coupled with the detection electrode E1 by a switch SW11, and the detection electrode E1 is not coupled with a capacitor Ccr by a switch SW12, in a state in which the object to be detected is neither in contact with nor in proximity to the detection electrode E1. In this state, a capacitance Cx1 included in the detection electrode E1 is charged. The right diagram in FIG. 6 illustrates a state in which the power source Vdd is decoupled from the detection electrode E1 by the switch SW11, and the detection electrode E1 is coupled with the capacitor Ccr by the switch SW12. In this state, an electric charge of the capacitance Cx1 is discharged through the capacitor Ccr.

The left diagram in FIG. 7 illustrates a state in which the power source Vdd is coupled with the detection electrode E1 by the switch SW11, and the detection electrode E1 is not coupled with the capacitor Ccr by the switch SW12, in a state in which the object to be detected is in contact with or in proximity to the detection electrode E1. In this state, capacitance Cx2 generated by the object to be detected in proximity to the detection electrode E1 is also charged, in addition to the capacitance Cx1 included in the detection electrode E1. The right diagram in FIG. 7 illustrates a state in which the power source Vdd is decoupled from the detection electrode E1 by the switch SW11, and the detection electrode E1 is coupled with the capacitor Ccr by the switch SW12. In this state, the electric charge of the capacitance Cx1 and the electric charge of the capacitance Cx2 are discharged through the capacitor Ccr.

A voltage change characteristic of the capacitor Ccr at the time of discharge (in the state in which the object to be detected is in contact with or in proximity to the detection electrode E1) illustrated in the right diagram in FIG. 7 is distinctly different due to existence of the capacitance Cx2, from a voltage change characteristic of the capacitor Ccr at the time of discharge (in the state in which the object to be detected is neither in contact with nor in proximity to the detection electrode E1) illustrated in the right diagram in FIG. 6. Therefore, in the self-capacitive touch detection, existence or non-existence of contact or proximity of the object to be detected is determined using the difference of the voltage change characteristic of the capacitor Ccr between existence and non-existence of the capacitance Cx2.

To be specific, an alternating-current rectangular wave Sg (see FIG. 9) of a predetermined frequency (a frequency on the order of several kHz to several hundreds of kHz, for example) is applied to the detection electrode E1. The voltage detector DET illustrated in FIG. 8 converts variation of current according to the alternating-current rectangular wave Sg into variation (waveforms $V_3$ and $V_4$) of voltage. The voltage detector DET is an integrated circuit included in the touch detection signal amplifier 42 illustrated in FIG. 2, for example.

As described above, the detection electrode E1 can be decoupled from other elements by the switch SW11 and the switch SW12. In FIG. 9, the alternating-current rectangular wave Sg rises to a voltage level equivalent to the voltage $V_0$ at timing of time $T_{01}$. At this time, the switch SW11 is ON and the switch SW12 is OFF. Therefore, the voltage of the detection electrode E1 rises to the voltage $V_0$.

Next, the switch SW11 is turned OFF before timing of time $T_{11}$. At this time, while the detection electrode E1 is in an electrically floating condition, the potential $V_0$ of the detection electrode E1 is maintained by the capacitance Cx1 of the detection electrode E1 (see FIG. 6) or capacitance (Cx1+Cx2, see FIG. 7) that is obtained by adding the capacitance Cx2 due to the contact or proximity of the object to be detected with or to the capacitance Cx1 of the detection electrode E1. Further, a switch SW13 is turned ON before timing of time $T_{11}$ and is turned OFF after a lapse of a predetermined time to reset the voltage detector DET. With this reset operation, the output voltage (detection signal) Vdet of the voltage detector DET becomes substantially equal to a reference voltage Vref.

Next, when the switch SW12 is turned ON at timing of time $T_{11}$, the voltage of an inversion input side of the voltage detector DET becomes the voltage $V_0$ of the detection electrode E1. After that, the voltage of the inversion input side of the voltage detector DET is decreased to the reference voltage Vref according to time constants of the capacitance Cx1 (or Cx1+Cx2) of the detection electrode E1 and capacitance C5 in the voltage detector DET. At this time, the electric charge accumulated in the capacitance Cx1 (or Cx1+Cx2) of the detection electrode E1 is moved to the capacitance C5 in the voltage detector DET. Therefore, the output voltages (detection signals) Vdet2 and Vdet3 of the voltage detector DET are increased.

When the object to be detected is neither in contact with nor in proximity to the detection electrode E1, the output voltage Vdet2 of the voltage detector DET has the waveform $V_3$ illustrated by the solid line and Vdet2=Cx1×V0/C5 is established. Similarly, when the object to be detected is neither in contact with nor in proximity to the detection electrode E1, the output voltage Vdet3 of the voltage detector DET has the waveform $V_3$ illustrated by the solid line and Vdet3=Cx1×V0/C5 is established.

When the capacitance due to an influence of the object to be detected is added, the output voltage Vdet2 of the voltage detector DET has the waveform $V_4$ illustrated by the dotted line and Vdet2=(Cx1+Cx2)×V0/C5 is established. Similarly, when the capacitance due to an influence of the object to be detected is added, the output voltage Vdet3 of the voltage detector DET has the waveform $V_4$ illustrated by the dotted line and Vdet3=(Cx1+Cx2)×V0/C5 is established.

After that, the switch SW12 is turned off at timing of time $T_{31}$ after the electric charge of the capacitance Cx1 (or Cx1+Cx2) of the detection electrode E1 is sufficiently moved to the capacitance C5, and the switch SW11 and the switch SW13 are turned ON. Due to this, the potential of the detection electrode E1 becomes a low level, which is the same potential as the alternating-current rectangular wave Sg, and the voltage detector DET is reset. The timing to turn ON the switch SW11 may be any timing after the switch SW12 is turned OFF and before a time $T_{02}$. The timing to reset the voltage detector DET may be any timing after the switch SW12 is turned OFF and before a time $T_{12}$.

The above operation is repeated at a predetermined frequency (a frequency on the order of several kHz to several hundreds of kHz, for example). Existence or non-existence of the object to be detected (existence or non-existence of touch) can be detected on the basis of an absolute value |ΔV| of a difference between the waveform $V_3$ and the waveform $V_4$. As illustrated in FIG. 9, the potential of the detection electrode E1 has the waveform $V_1$ when the object to be detected is not in proximity, and has the waveform $V_2$ when the capacitance Cx2 due to an influence of the object to be detected is added. Existence or non-existence of an external proximity object (existence or non-existence of touch) can be determined by measurement of time until the waveform $V_1$ and the waveform $V_2$ go down to a predetermined threshold voltage $V_{TH}$.

In the present configuration example, in the touch detection device 30, the electric charge is supplied to the touch detection electrodes TDL according to the drive signal Vcomts1 supplied from the drive driver 47 illustrated in FIG. 2 such that the self-capacitive touch detection is performed, and the touch detection electrodes TDL outputs the detection signals Vdet2. In the touch detection device 30, the electric charge is supplied to the drive electrode COML according to the drive signal Vcomts2 supplied from the drive electrode driver 14 illustrated in FIG. 2 such that the self-capacitive touch detection is performed, and the drive electrode COML outputs the detection signals Vdet3.

Referring back to FIG. 2, the touch detection controller 40 is a circuit that detects existence or non-existence of touch (the above-described contact state) to the touch detection device 30 on the basis of the control signal supplied from the display controller 11 and the detection signals Vdet1, Vdet2, and Vdet3 supplied from the touch detection device 30 of the display device 10 with a touch detection function, and obtains coordinates and a contact area of a touch detection region when there is the touch.

The touch detection controller 40 includes the touch detection signal amplifier 42, an analog/digital (A/D) converter 43, a signal processor 44, a coordinate extractor 45, and a detection timing controller 46.

In the mutual-capacitive touch detection, the touch detection device 30 outputs and supplies the detection signals Vdet1 to the touch detection signal amplifier 42 of the touch detection controller 40 from a plurality of the touch detection electrodes TDL described below through the voltage detector DET illustrated in FIG. 4.

In the self-capacitive touch detection, the touch detection device 30 outputs and supplies the detection signal Vdet2 to the touch detection signal amplifier 42 of the touch detection controller 40 from the plurality of touch detection electrodes TDL described below through the voltage detector DET illustrated in FIG. 8. In the self-capacitive touch detection, the touch detection device 30 outputs and supplies the detection signal Vdet3 to the touch detection signal amplifier 42 of the touch detection controller 40 from the drive electrode COML described below through the voltage detector DET illustrated in FIG. 8.

The touch detection signal amplifier 42 amplifies the detection signals Vdet1, Vdet2, and Vdet3 supplied from the touch detection device 30. The touch detection signals amplified by the touch detection signal amplifier 42 are supplied to the A/D converter 43. The touch detection signal amplifier 42 may include a low-pass analog filter that removes a high-frequency component (noise component) included in the detection signals Vdet1, Vdet2, and Vdet3, extracts touch components, and outputs the touch components. The touch detection controller 40 may not include the touch detection signal amplifier 42. That is, the detection signals Vdet1, Vdet2, and Vdet3 from the touch detection device 30 may be supplied to the A/D converter 43.

The A/D converter 43 is a circuit that samples analog signals output from the touch detection signal amplifier 42 and converts the analog signals into digital signals at timing in synchronization with the drive signals Vcomtm, Vcomts1, and Vcomts2.

The signal processor 44 includes a digital filter that decreases frequency components (noise components) other than the frequency at which the drive signals Vcomtm, Vcomts1, and Vcomts2 are sampled, the frequency components being included in the output signals of the A/D converter 43.

The signal processor 44 is a logic circuit that detects existence or non-existence of touch to the touch detection device 30 on the basis of the output signals of the A/D converter 43. The signal processor 44 performs processing of extracting only a signal of a difference generated by a finger of a user. This signal of a difference generated by a finger of a user is the above-described absolute value |ΔV| of a difference between the waveform $V_0$ and the waveform $V_1$.

The signal processor 44 may perform calculation to average absolute values |ΔV| per one detection block to obtain an average value of the absolute values |ΔV|. With this calculation, the signal processor 44 can decrease the influence due to noises.

The signal processor 44 compares the detected signal of a difference due to a finger with a predetermined threshold voltage Vth and determines the con-contact state of the external proximity object when the detected signal of a difference is equal to or greater than the threshold voltage Vth.

The signal processor 44 compares the detected signal of a difference with the predetermined threshold voltage Vth and determines the contact state of the external proximity object when the detected signal of a difference is less than the threshold voltage Vth. In this way, the touch detection controller 40 can detect touch.

The coordinate extractor 45 is a logic circuit that obtains touch panel coordinates of touch when the touch is detected by the signal processor 44. The detection timing controller 46 controls the A/D converter 43, the signal processor 44, and the coordinate extractor 45 to be operated in synchronization with one another. The coordinate extractor 45 outputs the touch panel coordinates as a signal Vout.

Figure 10:
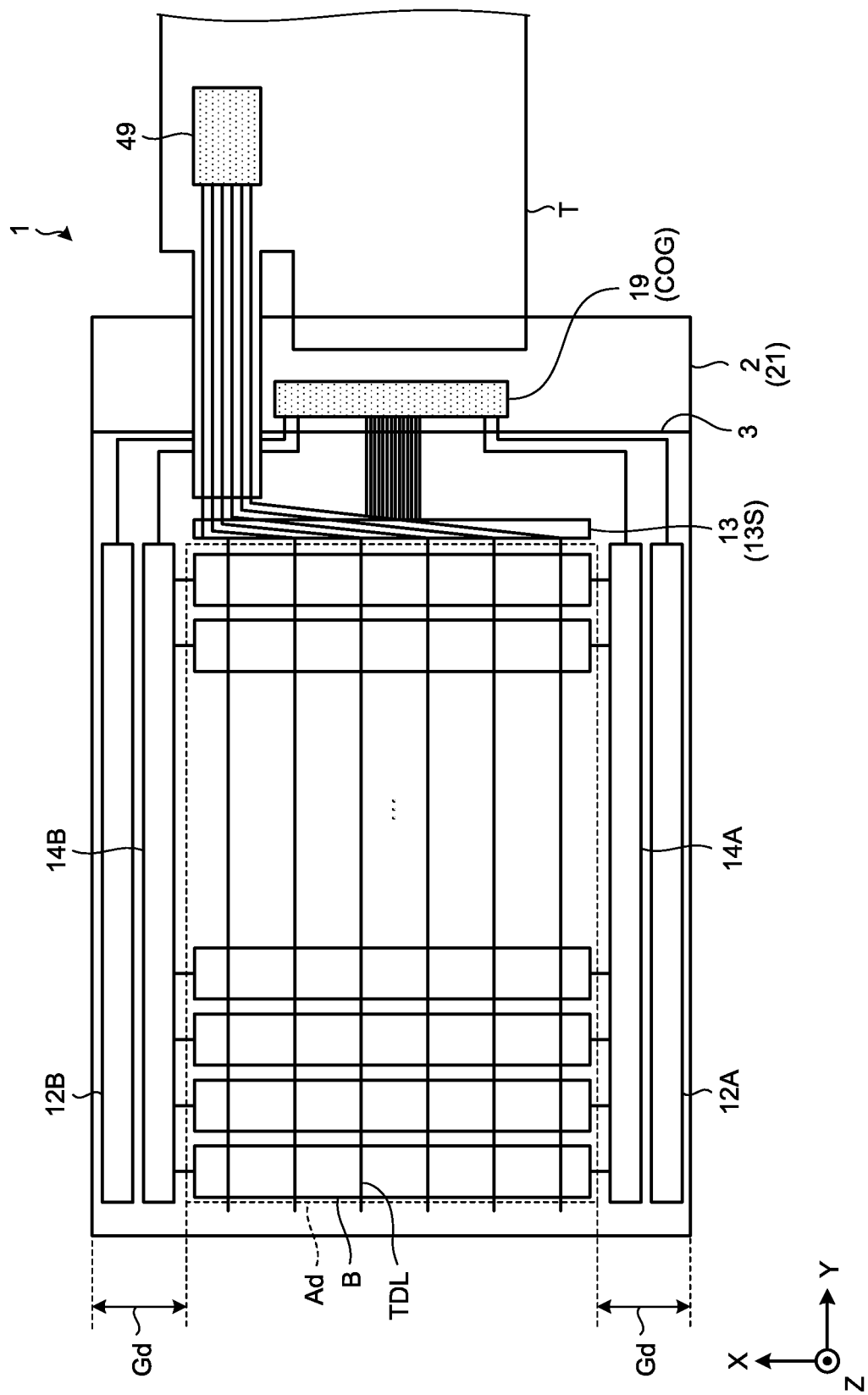
FIG. 10 is a diagram illustrating an example of a module on which the display apparatus with a touch detection function according to the embodiment is mounted.

FIG. 10 is a diagram illustrating an example of a module on which the display apparatus with a touch detection function according to the embodiment is mounted. The display apparatus 1 with a touch detection function includes a first substrate (for example, a pixel substrate 2) and a printed substrate (for example, a flexible printed substrate) T.

The pixel substrate 2 includes a first insulating substrate (for example, a TFT substrate 21). The TFT substrate 21 is, for example, a glass substrate or a film substrate. A drive IC chip (for example, a chip on glass (COG) 19) is mounted on the TFT substrate 21. A display region Ad of the liquid crystal display device 20 and a frame Gd are arranged on the pixel substrate 2 (TFT substrate 21).

The COG 19 is an IC chip that is a driver mounted on the TFT substrate 21, and is a control device including circuits necessary for a display operation, such as the display controller 11 illustrated in FIG. 2.

In the present configuration example, the source driver 13 and/or the source selector 13S are arranged on the TFT substrate 21. The source driver 13 and/or the source selector 13S may be included in the COG 19.

Drive electrode scanners 14A and 14B that are a part of the drive electrode driver 14 are arranged on the TFT substrate 21.

The gate driver 12 is provided as gate drivers 12A and 12B on the TFT substrate 21.

The COG 19 of the display apparatus 1 with a touch detection function may include the circuits of the drive electrode scanners 14A and 14B and the gate driver 12. The COG 19 is merely one embodiment of mounting and the embodiment is not limited thereto. For example, a configuration having a function similar to the COG 19 may be mounted on the flexible printed substrate T as a chip on film or a chip on flexible (COF).

As illustrated in FIG. 10, drive electrode blocks B of the drive electrode COML and the touch detection electrodes TDL are arranged to three-dimensionally intersect with each other in a direction perpendicular to a surface of the TFT substrate 21.

The drive electrode COML has a plurality of strip-shaped electrode patterns extending in one direction. In performing the touch detection operation, the drive signal VcomAC is sequentially supplied by the drive electrode driver 14 to the electrode patterns. The plurality of strip-shaped electrode patterns, each of which individually receives the drive signal VcomAC, correspond to the drive electrodes block B illustrated in FIG. 10.

The drive electrode blocks B (drive electrode COML) are arranged in a direction parallel to a short side of the display device 10 with a touch detection function. The touch detection electrodes TDL described below are arranged in a direction intersecting with the extending direction of the drive electrode blocks B and are arranged in a direction parallel to a long side of the display device 10 with a touch detection function, for example. Each of the drive electrode blocks B may be made up of one electrode or a plurality of electrodes.

The touch detection electrodes TDL are coupled with a touch IC 49 mounted on the flexible printed substrate T coupled with the short side of the display device 10 with a touch detection function. The touch IC 49 is an IC chip that is a driver mounted on the flexible printed substrate T, and is a control device including circuits necessary for a touch operation, such as the touch detection controller 40 illustrated in FIG. 2. Thus, the touch IC 49 is mounted on the flexible printed substrate T and is coupled with the touch detection electrodes TDL arranged in parallel. The flexible printed substrate T is not limited to a substrate as long as it is a terminal. In this case, the touch IC 49 is provided outside the module. The touch IC 49 is arranged on the flexible printed substrate T, but the arrangement of the touch IC 49 is not limited thereto. The touch IC 49 may be arranged on the TFT substrate 21 or a second insulating substrate 31.

In the present configuration example, the touch IC 49 is a control device that functions as the touch detection controller 40. However, a part of the function of the touch detection controller 40 may be provided as a function of another MPU.

To be specific, a part (for example, noise removal) of various functions such as A/D conversion and the noise removal that can be provided as functions of an IC chip as a touch driver may be performed in a circuit of an MPU or the like separately provided from the IC chip as a touch driver. In a case where one IC chip as a driver (one chip configuration) is employed, the detection signal may be transmitted to the IC chip as a touch driver on an array substrate through wiring of the flexible printed substrate T or the like.

The source selector 13S is arranged near the display region Ad on the TFT substrate 21, using a TFT element. A plurality of pixels Pix described below are arranged in the display region Ad in a matrix (row-column configuration). The frame Gd is a region where no pixel Pix is arranged as the surface of the TFT substrate 21 is viewed in a perpendicular direction. The gate driver 12 and the drive electrode scanners 14A and 14B, of the drive electrode driver 14, are arranged in the frame Gd.

The gate driver 12 includes, for example, the gate drivers 12A and 12B, and is arranged on the TFT substrate 21, using a TFT element. The gate drivers 12A and 12B are arranged on opposite sides of the display region Ad where the sub-pixels SPix (pixels) described below are arranged in a matrix (row-column configuration), and configured to drive the pixels from both sides. Scanning lines are arrayed between the gate driver 12A and the gate driver 12B. Therefore, the scanning lines extend in the direction parallel to the extending direction of the drive electrode COML, in the direction perpendicular to the surface of the TFT substrate 21.

In the present configuration example, the gate driver 12 includes the two circuits: the gate drivers 12A and 12B. However, this is an example of a specific configuration of the gate driver 12 and the embodiment is not limited thereto. For example, the gate driver 12 may be one circuit provided at only one end of each of the scanning lines.

The drive electrode driver 14 includes, for example, the drive electrode scanners 14A and 14B, and is arranged on the TFT substrate 21, using a TFT element. The drive electrode scanners 14A and 14B are configured to receive the display drive voltage VcomDC from the COG 19, and receive the drive signals Vcomtm and Vcomts2. The drive electrode scanners 14A and 14B can drive the plurality of drive electrode blocks B arranged in parallel, from both sides.

In the present configuration example, the drive electrode driver 14 includes the two circuits: the drive electrode scanners 14A and 14B. However, this is an example of a specific configuration of the drive electrode driver 14 and the embodiment is not limited thereto. For example, the drive electrode driver 14 may be one circuit provided at only one end of each of the drive electrode blocks B.

The display apparatus 1 with a touch detection function outputs the above-described detection signals Vdet1, Vdet2, and Vdet3 from the short side of the display device 10 with a touch detection function. This configuration facilitates routing of wiring in the display apparatus 1 with a touch detection function, when the wiring is coupled with the touch detection controller 40 through the flexible printed substrate T as a terminal.

Figure 11:
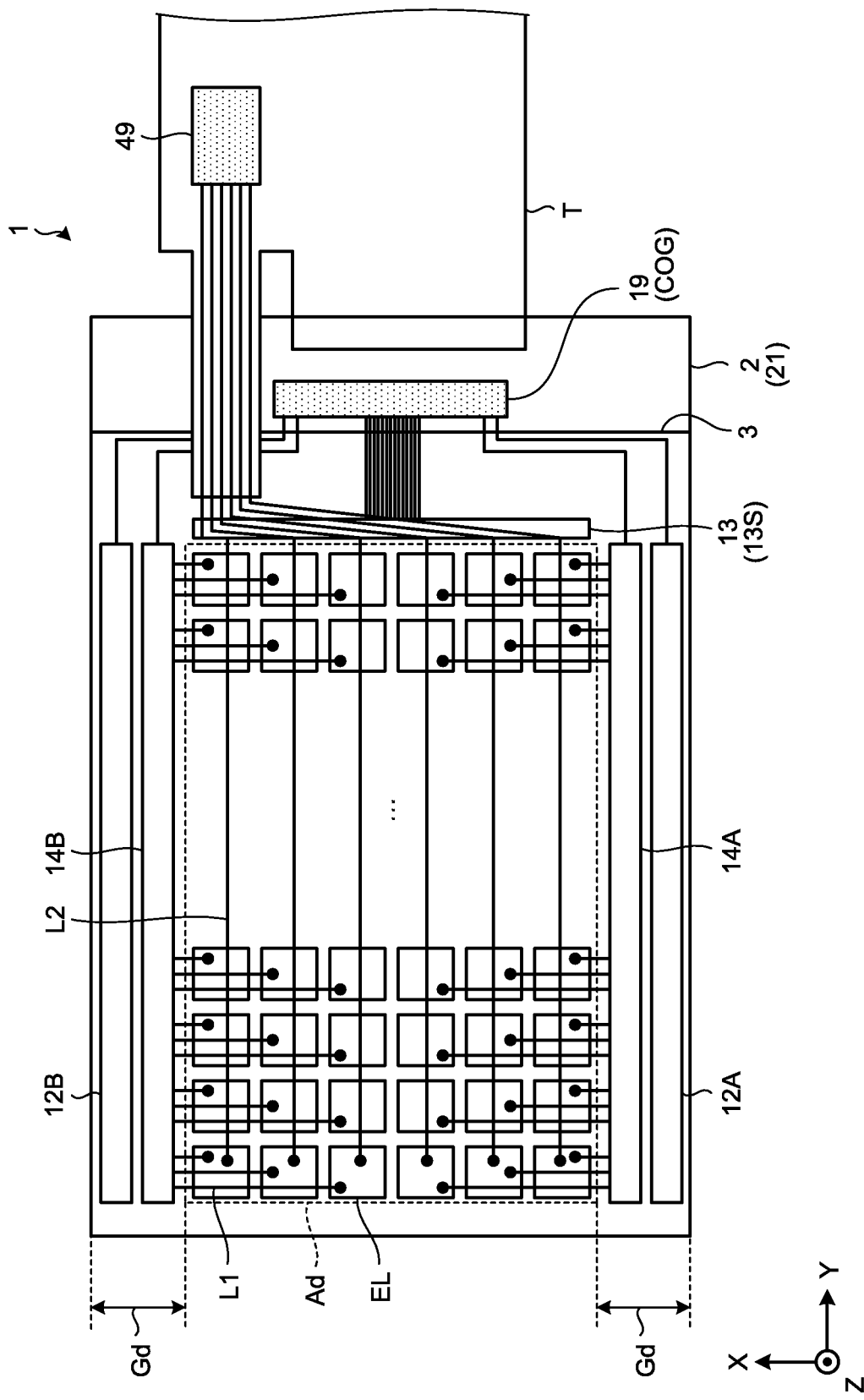
FIG. 11 is a diagram illustrating another example of a module on which a display apparatus with a touch detection function according to the embodiment is mounted.

FIG. 11 is a diagram illustrating another example of a module on which a display apparatus with a touch detection function according to the embodiment is mounted. The display apparatus 1 with a touch detection function according to the embodiment performs touch detection on the basis of the basic principle of self-capacitive touch detection. As illustrated in FIG. 11, in a case of the self-capacitive touch detection, a plurality of electrodes EL provided in a matrix (row-column configuration) may be used as electrodes that function as both the touch detection electrodes TDL and the drive electrode COML. In this case, the electrodes EL are coupled with the drive electrode scanners 14A and 14B and the touch detection controller 40 through coupling portions such as wiring L1 and L2. FIG. 11 illustrates only the wiring L2 provided for a part of the electrodes EL. In reality, the wiring L2 or similar coupling portions are individually provided for all the electrodes EL.

Although the shape and the size of the electrode EL are arbitrary, the size of the electrode EL may correspond to the size of a pixel, for example. In this case, one of electrodes making up the pixel (for example, a pixel electrode 22 or the drive electrode COML as a counter electrode in the pixel of a liquid crystal display apparatus) may be used as the electrode EL. That is, the electrode EL may be used as an electrode provided in each of a plurality of pixels of a display apparatus.

Figure 12:
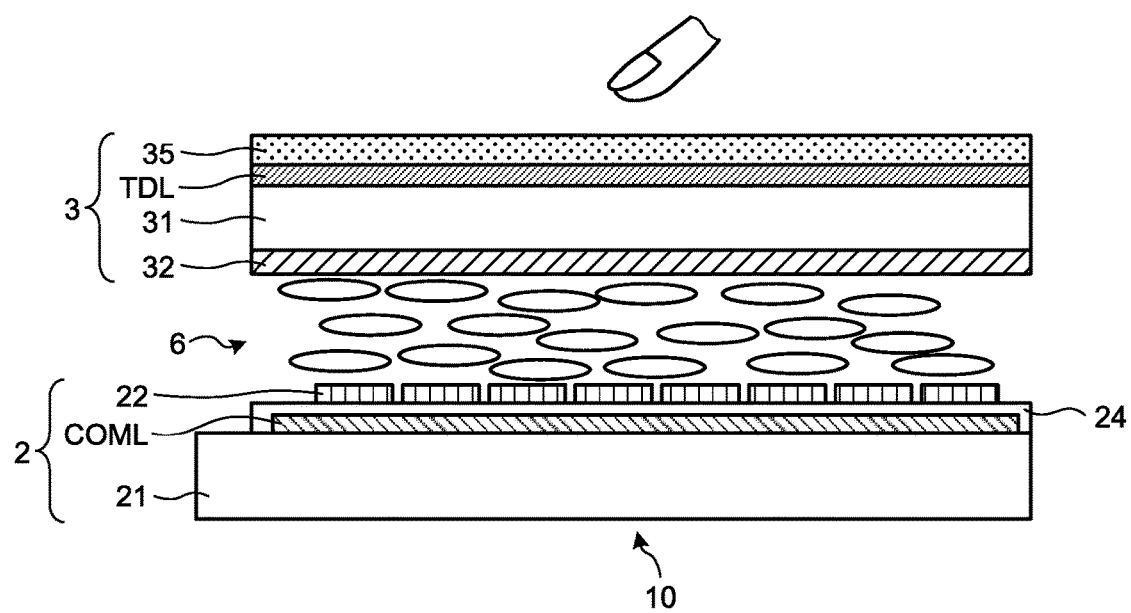
FIG. 12 is a sectional view illustrating a schematic section structure of the display device with a touch detection function.
Figure 13:
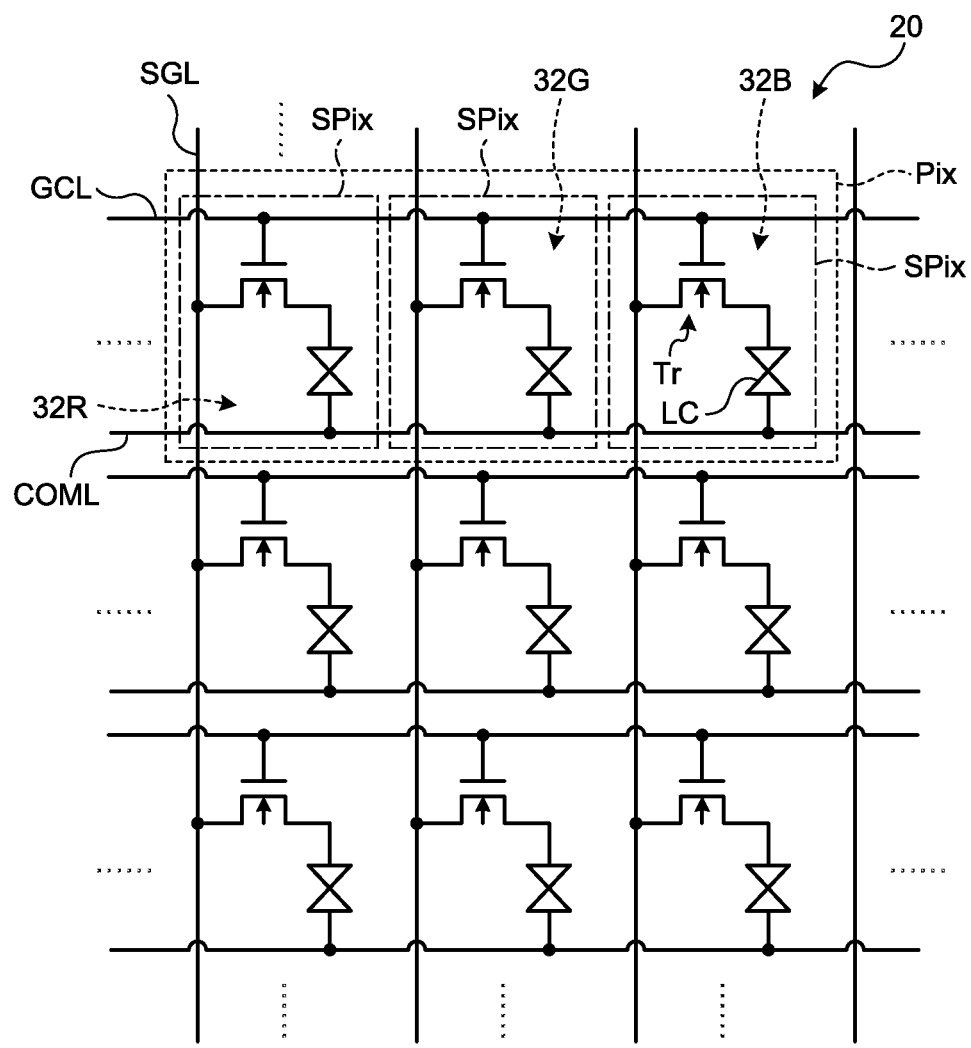
FIG. 13 is a circuit diagram illustrating a pixel arrangement of the display device with a touch detection function.

FIG. 12 is a sectional view illustrating a schematic section structure of the display device with a touch detection function. FIG. 13 is a circuit diagram illustrating a pixel arrangement of the display device with a touch detection function. As illustrated in FIG. 12, the display device 10 with a touch detection function includes the pixel substrate 2, a second substrate (a counter substrate 3, for example) and a display function layer (a liquid crystal layer 6, for example). The counter substrate 3 is arranged to face the pixel substrate 2 in the direction perpendicular to the surface of the pixel substrate 2, and the liquid crystal layer 6 is arranged between the pixel substrate 2 and the counter substrate 3.

The pixel substrate 2 includes a TFT substrate 21 as a circuit substrate, a plurality of the pixel electrodes 22, the drive electrode COML, and an insulating layer 24. The pixel electrodes 22 are arranged in a matrix (row-column configuration) on the TFT substrate 21. The drive electrode COML is arranged between the TFT substrate 21 and the pixel electrode 22. The insulating layer 24 insulates the pixel electrodes 22 and the drive electrode COML. A display function layer (for example, the liquid crystal layer 6) overlaps with the drive electrode COML in plan view. In the present embodiment, the plan view refers to a state in which the pixel substrate 2 or the counter substrate is viewed in a Z direction.

Thin film transistor (TFT) elements Tr of the sub-pixels SPix illustrated in FIG. 13, and wiring such as pixel signal lines SGL and scanning signal lines GCL illustrated in FIG. 13 are arranged on the TFT substrate 21. The pixel signal lines SGL supply the pixel signals Vpix to the pixel electrodes 22. The scanning signal lines GCL drive the TFT elements Tr. The pixel signal line SGL extends in a plane parallel to the surface of the TFT substrate 21, and supplies the pixel signal Vpix for displaying an image to the sub-pixels SPix. The sub-pixel SPix corresponds to a configuration unit that is controlled with the pixel signal Vpix. The sub-pixel SPix is a region surrounded by the pixel signal lines SGL and the scanning signal lines GCL, and corresponds to a configuration unit that is controlled by the TFT element Tr.

As illustrated in FIG. 13, the liquid crystal display device 20 includes a plurality of the sub-pixels SPix arranged in a matrix (row-column configuration). The sub-pixels SPix each include the TFT element Tr and the liquid crystal element LC. The TFT element Tr is fabricated from a thin film transistor material. The TFT element Tr in this example is fabricated from an n-channel metal oxide semiconductor (MOS) TFT material.

One of a source and a drain of the TFT element Tr is coupled with the pixel signal line SGL, a gate is coupled with the scanning signal line GCL, and the other of the source and the drain is coupled with one end of the liquid crystal element LC. The liquid crystal element LC has one end coupled with the drain of the TFT element Tr and the other coupled with the drive electrode COML, for example. In FIG. 12, from the TFT substrate 21 side, the drive electrode COML, the insulating layer 24, and the pixel electrode 22 are layered in this order. However, the embodiment is not limited thereto. From the TFT substrate 21 side, the pixel electrode 22, the insulating layer 24, and the drive electrode COML may be layered in this order, or the drive electrode COML and the pixel electrode 22 may be arranged on the same layer through the insulating layer 24.

The sub-pixel SPix is coupled with other sub-pixels SPix belonging to the same row of the liquid crystal display device 20, by the scanning signal line GCL. The scanning signal line GCL is coupled with the gate driver 12, and is supplied with the scanning signal Vscan from the gate driver 12.

The sub-pixel SPix is coupled with other sub-pixels SPix belonging to the same column of the liquid crystal display device 20, by the pixel signal line SGL. The pixel signal line SGL is coupled with the source driver 13, and is supplied with the pixel signal Vpix from the source driver 13.

Further, the sub-pixel SPix is coupled with other sub-pixels SPix belonging to the same row of the liquid crystal display device 20, by the drive electrode COML. The drive electrode COML is coupled with the drive electrode driver 14, and is supplied with the drive signal Vcom from the drive electrode driver 14. That is, in this example, the plurality of sub-pixels SPix belonging to the same row may share one drive electrode block of the drive electrode COML or one electrode included in one drive electrode block.

The direction in which the drive electrode COML of the present configuration example extends is parallel to the direction in which the scanning signal line GCL extends. The direction in which the drive electrode COML extends is not limited thereto. For example, the direction in which the drive electrode COML extends may be a direction parallel to the direction in which the pixel signal line SGL extends. The direction in which the touch detection electrode TDL extends is not limited to the direction in which the pixel signal line SGL extends. The direction in which the touch detection electrode TDL extends may be direction parallel to the direction in which the scanning signal line GCL extends.

The gate driver 12 illustrated in FIG. 2 applies the scanning signal Vscan to the gate of the TFT elements Tr of the pixels Pix through the scanning signal line GCL illustrated in FIG. 12, to sequentially select one row (one horizontal line) as a target to be driven and displayed, of the sub-pixels SPix arranged in a matrix (row-column configuration) in the liquid crystal display device 20.

The source driver 13 illustrated in FIG. 2 supplies, through the pixel signal lines SGL illustrated in FIG. 12, the pixel signals Vpix to the corresponding sub-pixels SPix included in the one horizontal line sequentially selected by the gate driver 12. Then, these sub-pixels SPix allow display of the one horizontal line according to the supplied pixel signals Vpix.

The drive electrode driver 14 illustrated in FIG. 2 applies the drive signal Vcom to each drive electrode block to drive the drive electrode COML in units of blocks.

As described above, in the liquid crystal display device 20, the gate driver 12 drives the scanning signal lines GCL to sequentially linearly scan the scanning signal lines GCL in a time division manner, such that one horizontal line is sequentially selected. In the liquid crystal display device 20, one horizontal line performs display at a time when the source driver 13 supplies the pixel signals Vpix to the sub-pixels SPix belonging to the one horizontal line. In this display operation, the drive electrode driver 14 applies the drive signal Vcom to the block of the drive electrode COML corresponding to the one horizontal line.

The liquid crystal layer 6 modulates light that passes through the liquid crystal layer 6 according to conditions of the electric field. At time of driving the drive electrode COML, a voltage according to the pixel signal Vpix supplied to the pixel electrode 22 is applied to the liquid crystal layer 6, and the electric field is generated. Then, the liquid crystal of the liquid crystal layer 6 exhibits orientation according to the electric field and modulates the light that passes through the liquid crystal layer 6.

In this way, the pixel electrode 22 and the drive electrode COML function as a pair of electrodes generating the electric field in the liquid crystal layer 6. That is, the liquid crystal display device 20 functions as the display device DP in which the display image is changed according to the electric charge provided for the pair of electrodes. One of the pixel electrodes 22 is arranged in at least every sub-pixel SPix. The drive electrode COML is superimposed with at least all the pixels or the sub-pixels in plan view.

In the present configuration example, as the liquid crystal display device 20, a liquid crystal display device using horizontal field-mode liquid crystal such as in-plane switching (IPS) including fringe field switching (FFS) is used, for example. Oriented films may be respectively arranged between the liquid crystal layer 6 and the pixel substrate 2, and between the liquid crystal layer 6 and the counter substrate 3, illustrated in FIG. 12.

The liquid crystal display device 20 has a configuration for the horizontal field mode. However, the liquid crystal display device 20 may have a configuration for another display mode. For example, the liquid crystal display device 20 may have a configuration for a mode mainly using a vertical field generated between principal planes of the substrate, such as a twisted nematic (TN) mode, an optically compensated bend (OCB) mode, or a vertical aligned (VA) mode. As the display mode using the vertical field, a configuration in which the pixel electrodes 22 are provided at the pixel substrate 2 and the drive electrode COML is provided at the counter substrate 3 is applicable.

The counter substrate 3 includes the second insulating substrate 31, and a color filter 32 arranged on one surface of the second insulating substrate 31. The touch detection electrode TDL as the detection electrode of the touch detection device 30 is arranged on the other surface of the second insulating substrate 31, and a polarizing plate 35 is arranged on the touch detection electrode TDL.

A mounting method of the color filter 32 may be a color-filter on array (COA) method in which the color filter 32 is arranged on the pixel substrate 2 as an array substrate.

The color filter 32 illustrated in FIG. 12 is configured such that color regions colored in three colors of red (R), green (G), and blue (B) of the color filter are periodically arranged. The three color regions 32R, 32G, and 32B colored in R, G, and B correspond to the sub-pixels SPix, and one set of three color regions 32R, 32G, and 32B corresponds to one pixel Pix.

The pixels Pix are arranged in a matrix (row-column configuration) along a direction parallel to the scanning signal lines GCL and a direction parallel to the pixel signal lines SGL to form the display region Ad described below. The color filter 32 faces the liquid crystal layer 6 in a direction perpendicular to the TFT substrate 21. In this way, each sub-pixel SPix can display a single color.

The color filter 32 may have a combination of other colors as long as the filter is colored in different colors. The color filter 32 may not be included. In this way, there may be a region where no color filter 32 exists, that is, there may be sub-pixels SPix that are not colored. The number of the sub-pixels SPix included in each pixel Pix may be four or more.

Figure 14:
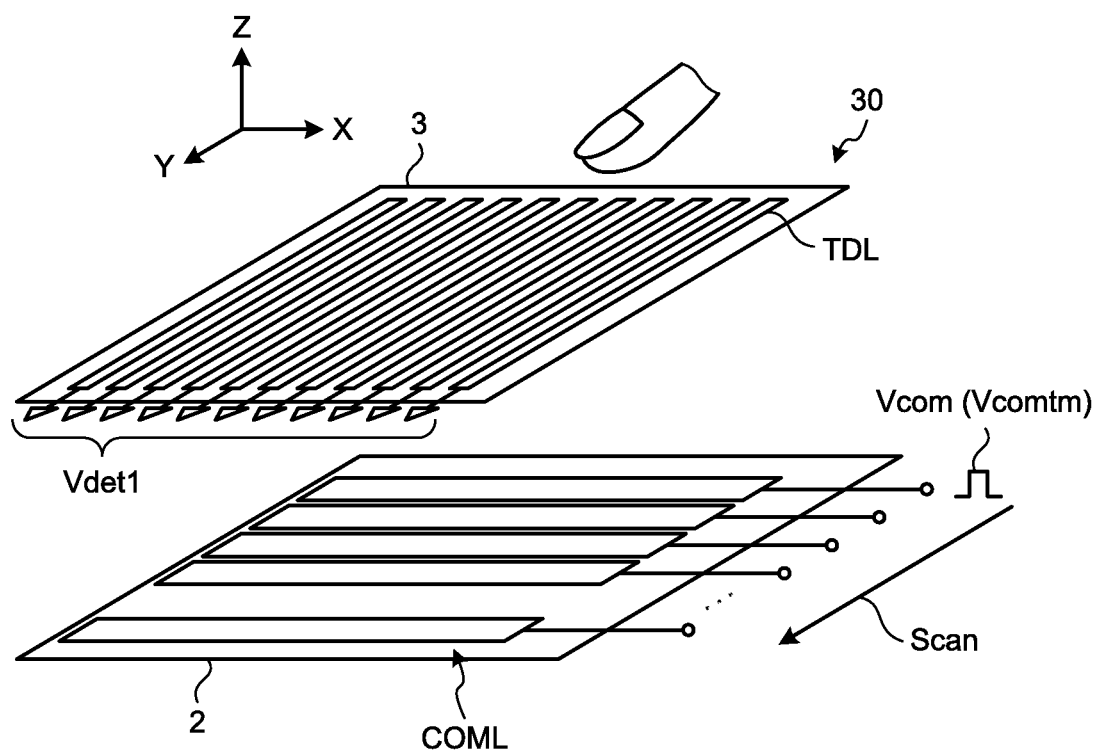
FIG. 14 is a perspective view illustrating a configuration example of a drive electrode and touch detection electrodes of the display device with a touch detection function.

FIG. 14 is a perspective view illustrating a configuration example of the drive electrode and the touch detection electrodes of the display device with a touch detection function. The drive electrode COML according to the present configuration example functions as a drive electrode of the liquid crystal display device 20 and also functions as a drive electrode of the touch detection device 30.

The drive electrode COML faces the pixel electrode 22 in the direction perpendicular to the surface of the TFT substrate 21. The touch detection device 30 is made up of the drive electrode COML provided in the pixel substrate 2 and the touch detection electrode TDL provided in the counter substrate 3.

The touch detection electrodes TDL are configured such that strip-shaped electrode patterns extend in a direction intersecting with the extending direction of the electrode patterns of the drive electrode COML. The touch detection electrodes TDL face the drive electrode COML in the direction perpendicular to the surface of the TFT substrate 21. The electrode patterns of the touch detection electrodes TDL are coupled with an input side of the touch detection signal amplifier 42 of the touch detection controller 40.

The electrode patterns in which the drive electrode COML and the touch detection electrodes TDL intersect with each other generate capacitance in an intersecting portion. In the touch detection device 30, when the drive electrode driver 14 applies the drive signal Vcomtm to the drive electrode COML, the touch detection electrode TDL outputs the detection signal Vdet1, and the touch detection is performed.

Figure 4:
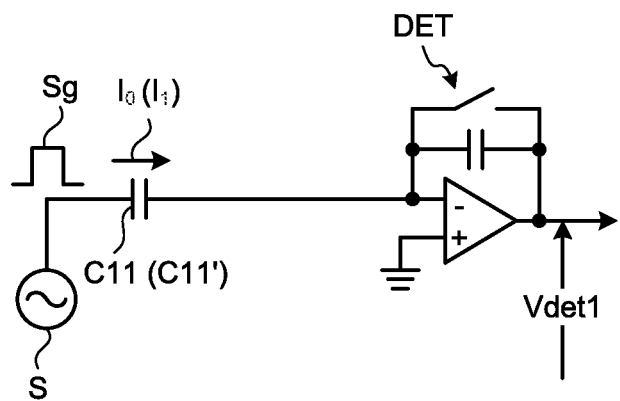
FIG. 4 is an explanatory diagram illustrating an example of an equivalent circuit of mutual-capacitive touch detection.

That is, the drive electrode COML corresponds to the drive electrode E1 in the basic principle of the mutual-capacitance touch detection illustrated in FIGS. 3 to 5, and the touch detection electrode TDL corresponds to the touch detection electrode E2. Then, the touch detection device 30 detects the touch according to the basic principles.

In this way, the touch detection device 30 includes the touch detection electrode TDL that forms mutual-capacitance with one (for example, the drive electrode COML) of the pixel electrode 22 and the drive electrode COML, and performs the touch detection on the basis of change of the mutual-capacitance.

The electrode patterns in which the drive electrode COML and the touch detection electrodes TDL intersect with each other form a mutual-capacitance touch sensor in a matrix (row-column configuration). Therefore, the touch detection controller 40 can detect a position and a contact area where the object to be detected OBJ is in contact with or in proximity to, by scanning the entire input surface IS of the touch detection device 30.

That is, in the touch detection device 30, the drive electrode driver 14 drives the drive electrode blocks B to sequentially linearly scan the drive electrodes block B illustrated in FIG. 10 in a time division manner, in performing the touch detection operation. With this operation, the drive electrode block B (one detection block) of the drive electrode COML is sequentially selected in a scanning direction Scan. Then, the touch detection device 30 outputs the detection signal Vdet1 from the touch detection electrode TDL. In this way, the touch detection device 30 performs the touch detection of one detection block.

The number of lines in the display output with respect to the detection block is arbitrary. However, in the present embodiment, a touch detection region corresponding to the display region Ad of two lines is the one detection block. In other words, although the relationship between the detection block and any of the pixel electrode, the scanning signal line, and the pixel signal line facing the detection block is arbitrary, two pixel electrodes or two scanning signal lines face one drive electrode COML in the present embodiment.

The shape of the touch detection electrodes TDL or the drive electrode COML (drive electrode blocks B) is not limited to a shape with which the touch detection electrodes TDL or the drive electrode COML (drive electrode blocks B) is divided into the plurality of strip-shaped patterns. For example, each of the touch detection electrodes TDL or the drive electrode COML (drive electrode blocks B) may be formed into a comb teeth shape. Alternatively, each of the touch detection electrodes TDL or the drive electrode COML (drive electrode blocks B) may have any shape that just enables the touch detection electrodes TDL or the drive electrode COML to be divided into a plurality of patterns, and the shape of the slit that divides the drive electrode COML may be a straight line or a curved line.

As an example of a method of operating the display apparatus 1 with a touch detection function, the display apparatus 1 with a touch detection function performs the touch detection operation (touch detection period) and the display operation (display operation period) in a time division manner. The touch detection operation and the display operation can be performed in any division manner.

Figure 15:
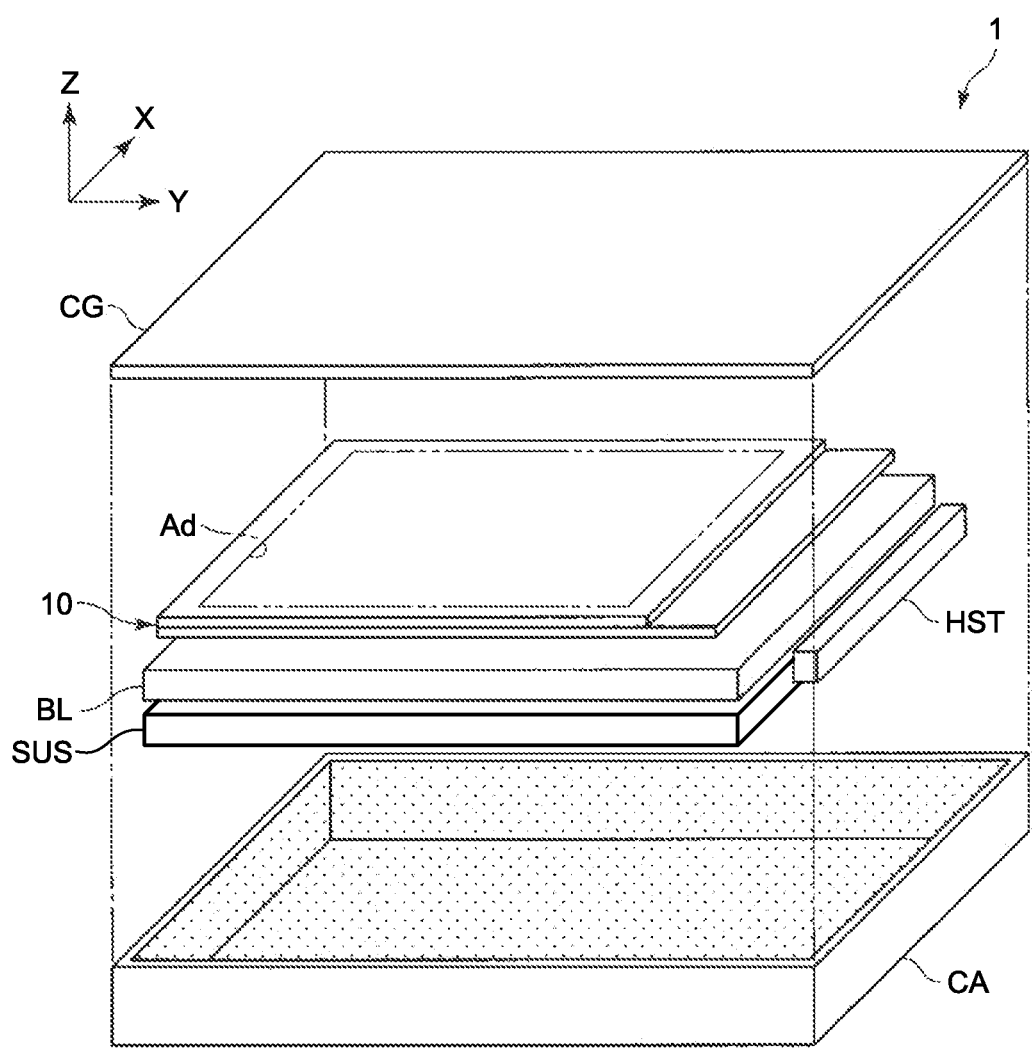
FIG. 15 is an exploded perspective view illustrating a configuration example of the display apparatus with a touch detection function according to the embodiment.

FIG. 15 is an exploded perspective view illustrating a configuration example of the display apparatus with a touch detection function according to the embodiment. As illustrated in FIG. 15, the display apparatus 1 with a touch detection function includes the display device 10 with a touch detection function, a lighting device (for example, a backlight device BL), an electrode SUS, the host HST, a casing CA, and the cover member CG. The lighting device illuminates the display device 10 with a touch detection function. The host HST controls the display device 10 with a touch detection function and the backlight device BL.

The display device 10 with a touch detection function includes a plane parallel to an X-Y plane defined by an X direction as a first direction and a Y direction as a second direction, the first direction and the second direction being perpendicular to each other. In the present configuration example, the X direction as the first direction and the Y direction as the second direction are perpendicular to each other. However, the first direction and the second direction may intersect with each other at an angle other than 90°. A Z direction as a third direction is perpendicular to the X direction as the first direction and the Y direction as the second direction. The Z direction as the third direction is a thickness direction of the display device 10 with a touch detection function.

The casing CA has a box shape having an opening in an upper portion, and houses the display device 10 with a touch detection function, the backlight device BL, and the host HST. The casing CA may be formed of a conductor such as metal. Alternatively, the casing CA may be formed of a resin and a surface layer of the casing CA is formed of a conductor such as metal.

The cover member CG blocks the opening of the casing CA, and covers the display device 10 with a touch detection function, the backlight device BL, and the host HST.

A dimension of the cover member CG is larger than a dimension of the second substrate and a dimension of the first substrate in X-Y plan view. Examples of the cover member CG include substrates having light transmission properties such as a glass substrate and a resin substrate.

When the cover member CG is the glass substrate, the cover member CG may be referred to as cover glass.

The display device 10 with a touch detection function, the backlight device BL, and the electrode SUS are positioned between a bottom surface of the casing CA and the cover member CG, and the backlight device BL and the electrode SUS are positioned between the casing CA and the display device 10 with a touch detection function, in the Z direction as the third direction. The backlight device BL and the electrode SUS may be arranged with a space from the display device 10 with a touch detection function. The backlight device BL and the electrode SUS may be arranged with a space from the casing CA.

A force detection region where the force detector SE2 detects force may be the same as the display region Ad.

Figure 16:
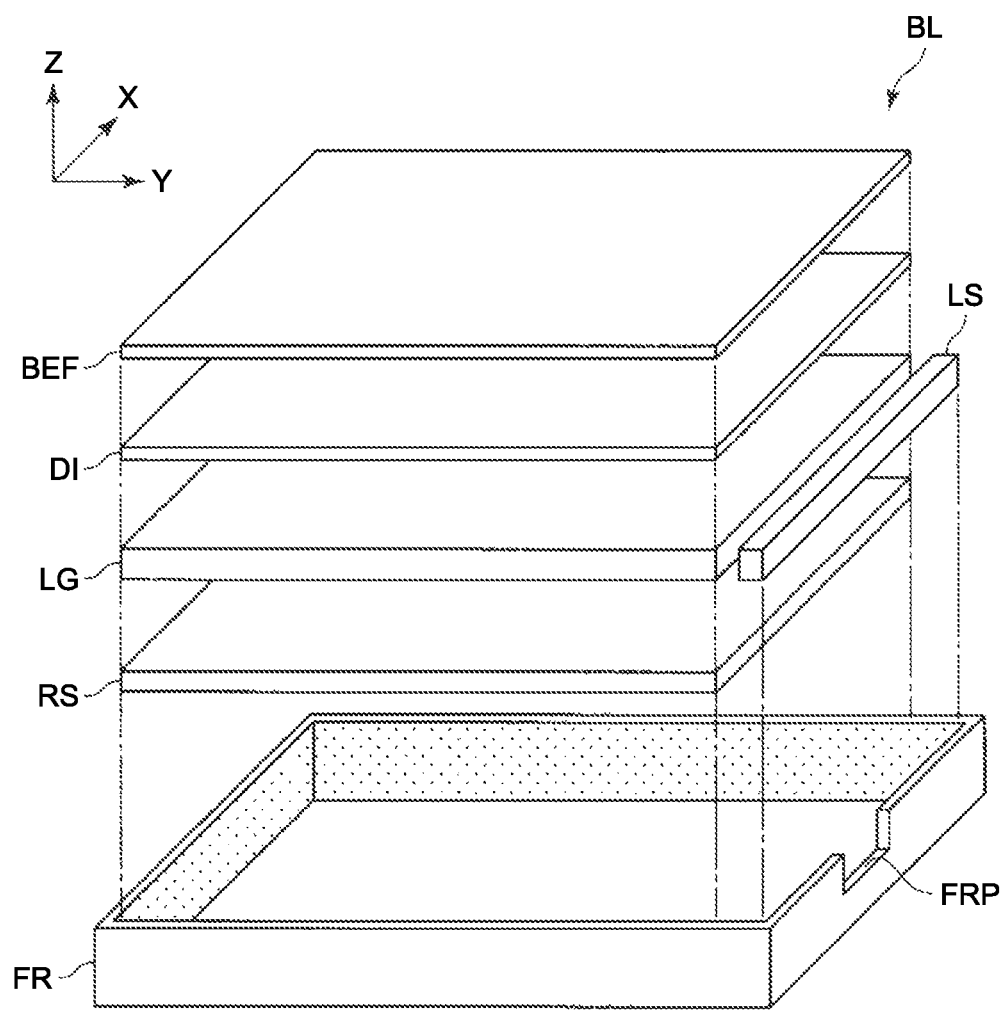
FIG. 16 is an exploded perspective view illustrating a backlight device.

FIG. 16 is an exploded perspective view illustrating a backlight device. The backlight device BL includes a light guide LG, a light source LS, a light reflector RS, a light diffusion sheet DI, a brightness enhancement film BEF, and a frame FR. The backlight device BL has shape and size corresponding to the display device 10 with a touch detection function.

The light guide LG is arranged between the display device 10 with a touch detection function and the casing CA. In the present configuration example, the light guide LG is formed into a flat rectangular shape. The light source LS emits light to the light guide LG. In the present configuration example, a light-emitting diode (LED) is used as the light source LS, and is arranged to face one side surface of the light guide LG.

The light reflector RS is arranged between the light guide LG and the casing CA. The light reflector RS reflects the light emitted from a first side of the light guide LG to cause the light to travel toward the display device 10 with a touch detection function. The first side of the light guide LG is a side opposite to a second side of the light guide LG facing the display device 10 with a touch detection function. The light reflector RS can decrease a loss of light to improve a brightness level of a display image. In the present configuration example, the light reflector RS is formed into a rectangular sheet shape. The area of the light reflector RS is substantially the same as the area of the light guide LG in the X-Y plane. For example, the light reflector RS may have a multilayer film structure using a polyester-based resin.

The light diffusion sheet DI is arranged between the light guide LG and the display device 10 with a touch detection function. The light diffusion sheet DI diffuses the light incident from the light guide LG side and causes the diffused light to travel toward the display device 10 with a touch detection function. That is, the light that passes through the light diffusion sheet DI is diffused. Therefore, the light diffusion sheet DI can reduce unevenness in brightness in the X-Y plane of the light emitted from the backlight device BL. In the present configuration example, the light diffusion sheet DI is formed into a rectangular sheet shape. The area of the light diffusion sheet DI is substantially the same as the area of the light guide LG in the X-Y plane.

The brightness enhancement film BEF is arranged between the light diffusion sheet DI and the display device 10 with a touch detection function. The brightness enhancement film BEF has a function to improve the brightness level of the light emitted from the backlight device BL. In the present configuration example, the brightness enhancement film BEF is formed into a rectangular film shape. The area of the brightness enhancement film BEF is substantially the same as the area of the light guide LG in the X-Y plane.

The frame FR is used for modularization of the backlight device BL. The light guide LG, the light source LS, the light reflector RS, the light diffusion sheet DI, and the brightness enhancement film BEF are attached to the frame FR. With this modularization, relative positions of the light guide LG and the light source LS are fixed.

In the present configuration example, the frame FR is formed into a rectangular frame shape. The frame FR surrounds aggregate of the light guide LG and the light source LS in whole in the X-Y plane. A path FRP, through which the flexible printed substrate T coupled with the light source LS passes, is arranged in the frame FR. The frame FR may be formed of a conductive material such as metal.

The frame FR in the X-Y plane can be deformed into any shape that does not disturb the illumination of the display device 10 with a touch detection function. For example, examples of the shape of the frame FR in the X-Y plan include an L shape in which the frame FR faces two adjacent sides of the light guide LG, an H shape in which the frame FR faces three adjacent sides of the light guide LG, and a II shape in which the frame FR faces two facing sides of the light guide LG.

Although the backlight device BL is exemplarily illustrated in FIG. 16, various forms are applicable as the backlight device BL. For example, the backlight device BL may be formed excluding at least a part of the light reflector RS, the light diffusion sheet DI, and the brightness enhancement film BEF. Alternatively, the backlight device BL may be formed adding an optical member not illustrated in FIG. 16. The backlight device BL may just be configured to emit light to the display device 10 with a touch detection function.

Figure 17:
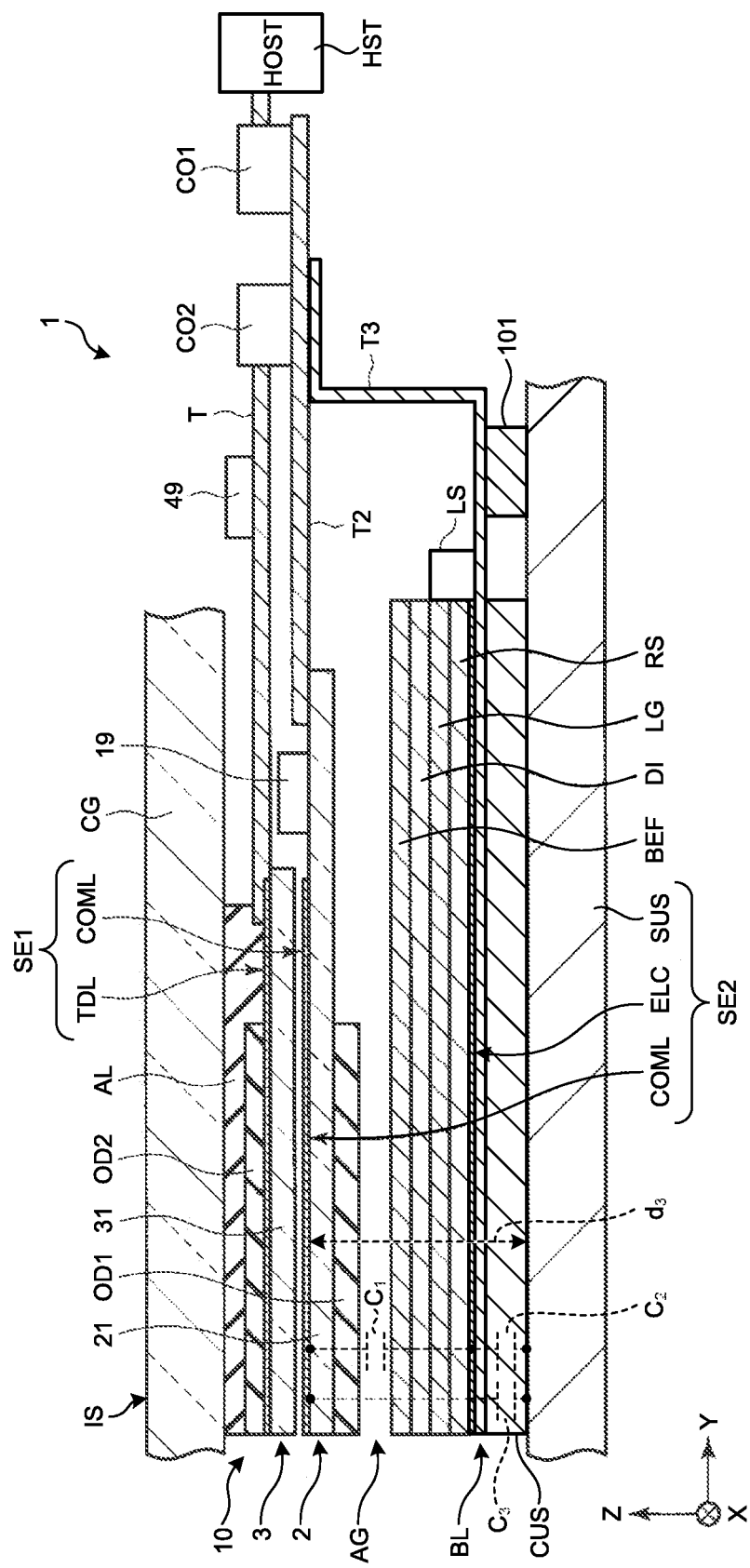
FIG. 17 is a sectional view illustrating a configuration example of the display apparatus with a touch detection function according to the embodiment.

FIG. 17 is a sectional view illustrating a configuration example of the display apparatus with a touch detection function according to the embodiment. As illustrated in FIG. 16, the display apparatus 1 with a touch detection function includes the display device 10 with a touch detection function, the COG 19, the cover member CG, a first optical element OD1, a second optical element OD2, the touch IC 49, the backlight device BL, a first printed substrate, a second printed substrate, and a third printed substrate (for example, flexible printed substrates T, T2, and T3), a cushion layer CUS, and the electrode SUS.

An air layer (air gap) AG is provided between the display device 10 with a touch detection function and the backlight device BL.

The COG 19 is mounted on the pixel substrate 2 of the display device 10 with a touch detection function. The flexible printed substrate T2 is coupled with the pixel substrate 2. A connector CO1 and a connector CO2 are mounted on the flexible printed substrate T2. The flexible printed substrate T2 is coupled with the host HST through the connector CO1.

The flexible printed substrate T couples the touch detection electrode TDL with the connector CO2. The COG 19 is coupled with the touch IC 49 through the flexible printed substrate T2, the connector CO2, and the flexible printed substrate T. Exemplarily illustrating an arrangement of the touch IC 49, the touch IC 49 may be mounted on any one of the flexible printed substrates T, T2, and T3, and the counter substrate 3, or may be divided and mounted on any two of the aforementioned substrates.

The flexible printed substrate T3 couples the light source LS with the flexible printed substrate T2. The host HST is coupled with the light source LS through the connector CO1 and the flexible printed substrate T3, supplies power to the light source LS, and controls driving of the light source LS.

The light source LS may be coupled with the COG 19 through the flexible printed substrate T3 and the flexible printed substrate T2, and controlled by the COG 19. In other words, the display controller 11 may include a light source controller that controls the light source.

The flexible printed substrate T3 extends to a back surface side (a side in a direction opposite to the Z direction) of the backlight device BL and covers the back surface side of the backlight device BL. The intermediate electrode ELC is arranged on the flexible printed substrate T3. The intermediate electrode ELC is arranged in a position corresponding to the display region Ad.
The cushion layer CUS is provided between the flexible printed substrate T3 and the electrode SUS. The cushion layer CUS is a nonconductor and may be made of polyurethane.

When weak force is applied to the input surface IS, only the air layer AG becomes thin and the cushion layer CUS is not deformed, and thus the display apparatus 1 with a touch detection function can favorably detect the weak force. When strong force is applied to the input surface IS, the air layer AG reaches zero and the cushion layer CUS is elastically deformed according to the force, and thus the display apparatus 1 with a touch detection function can favorably detect the strong force.

The intermediate electrode ELC is coupled with the touch IC 49 through the flexible printed substrate T3, the connector CO2, and the flexible printed substrate T. The intermediate electrode ELC is caused to have a reference potential (for example, a ground potential) by the touch IC 49, or is supplied with a signal having the same phase and the same amplitude as the drive signal Vcomts2. The COG 19 or the host HST may cause the intermediate electrode ELC to have the reference potential, or may supply the signal having the same phase and the same amplitude as the drive signal Vcomts2 to the intermediate electrode ELC. In this disclosure, "the same phase" is the same phase or substantially the same phase, and "the same amplitude" is the same amplitude or substantially the same amplitude.

A conductive tape 101 is provided between the electrode SUS and the flexible printed substrate T3. The electrode SUS is coupled with the COG 19, the touch IC 49, or the host HST through the conductive tape 101, the flexible printed substrate T3, the connector CO2, and the flexible printed substrate T. The electrode SUS is caused to have the reference potential by the COG 19, the touch IC 49, or the host HST. The electrode SUS may be caused to have the reference potential through a member other than the flexible printed substrate T3.

Means to couple the host HST, the display device 10 with a touch detection function, the touch detection electrode TDL, the light source LS, the intermediate electrode ELC, and the electrode SUS are not limited to the above, and other means may be employed.

For example, one flexible printed substrate may be used in place of the above-described three independent flexible printed substrates T, T2, and T3 and the connectors CO1 and CO2. In this case, the one flexible printed substrate can be coupled with the host HST, a first branch portion of the one flexible printed substrate can be coupled with the display device 10 with a touch detection function, a second branch portion of the one flexible printed substrate can be coupled with the touch detection electrode TDL, and a third branch portion of the one flexible printed substrate can be coupled with the light source LS, the intermediate electrode ELC, and the electrode SUS. The flexible printed substrates, or the flexible printed substrate and the host HST or the substrate may be coupled with one another through connectors such as the connectors CO1 and CO2, or may be coupled by soldering in place of the connectors.

The host HST, the COG 19, and the touch IC 49 function as the controller CTRL that controls the touch detector SE1 including the drive electrode COML and the touch detection electrode TDL of the display device 10 with a touch detection function.

The host HST, the COG 19, and the touch IC 49 function as the controller CTRL that controls the force detector SE2 including the drive electrode COML, the intermediate electrode ELC, and the electrode SUS of the display device 10 with a touch detection function.

The host HST can be rephrased as application processor. The touch IC 49 can provide a timing signal, which gives drive timing of the touch detector SE1 and the force detector SE2, to the COG 19. Alternatively, the COG 19 can provide a timing signal, which gives drive timing of the drive electrode COML, to the touch IC 49. Alternatively, the host HST can provide a timing signal to the COG 19 and the touch IC 49. With this timing signal, driving of the COG 19 and driving of the touch IC 49 can be synchronized.

The cover member CG is positioned outside the display device 10 with a touch detection function and faces the counter substrate 3. In this configuration example, the input surface IS of the display apparatus 1 with a touch detection function is a surface of the cover member CG. The display apparatus 1 with a touch detection function can detect a position and a contact area of the object to be detected OBJ when the object to be detected OBJ comes in contact with the input surface IS.

The force detector SE2 of the display apparatus 1 with a touch detection function can output a signal according to force to the controller CTRL when the object to be detected OBJ applies the force to the input surface IS. The signal according to force is a signal according to the force of the object to be detected OBJ that presses the input surface IS, and is a signal changed according to the magnitude of the force.

The first optical element OD1 is arranged between the pixel substrate 2 and the backlight device BL. The first optical element OD1 is bonded to the pixel substrate 2.

The second optical element OD2 is arranged between the display device 10 with a touch detection function and the cover member CG. The second optical element OD2 is bonded to the counter substrate 3 and the touch detection electrode TDL.

Each of the first optical element OD1 and the second optical element OD2 includes at least a polarizing plate and may include a phase difference plate, as needed. An absorption axis of the polarizing plate included in the first optical element OD1 and an absorption axis of the polarizing plate included in the second optical element OD2 intersect with each other. For example, the absorption axis of the polarizing plate included in the first optical element OD1 and the absorption axis of the polarizing plate included in the second optical element OD2 are perpendicular to each other.

The cover member CG is bonded to the second optical element OD2 with an adhesive layer AL. Examples of the adhesive layer AL include an optically clear resin (OCR). The display device 10 with a touch detection function detects force, and thus the adhesive layer AL may be elastically deformed as long as the adhesive layer AL can transfer the force applied from the cover member CG to the second optical element OD2.

The touch detection electrode TDL is arranged between the drive electrode COML and the cover member CG. In this configuration example, the touch detection electrode TDL is provided on the upper side of a surface of the counter substrate 3, the surface facing the second optical element OD2. The touch detection electrode TDL may be in contact with the counter substrate 3 or may be separated from the counter substrate 3. When touch detection electrode TDL is separated from the counter substrate 3, a member such as an insulating film (not illustrated) lies between the counter substrate 3 and the touch detection electrode TDL. The touch detection electrode TDL extends in the Y direction as the second direction.

The drive electrode COML and the touch detection electrode TDL configure the mutual-capacitive and/or self-capacitive touch detectors SE1. The drive electrode COML functions as a display electrode and also functions as a sensor drive electrode. The touch detector SE1 is used to detect the position and the contact area of the object to be detected OBJ.

In the present configuration example, the electrode SUS is formed of a conductor (for example, aluminum). The potential of the electrode SUS is the reference potential. As the reference potential, the ground potential GND is exemplified. Any of the touch IC 49, the COG 19, and the host HST is electrically coupled with the electrode SUS by wiring or the like, and the reference potential may be supplied from any of the touch IC 49, the COG 19, and the host HST to the electrode SUS.

The electrode SUS is arranged with a space from the display device 10 with a touch detection function. In the present configuration example, the cushion layer CUS is provided between the display device 10 with a touch detection function and the electrode SUS. That is, the display apparatus 1 with a touch detection function includes the air layer AG between the display device 10 with a touch detection function and the backlight device BL, and the cushion layer CUS between the backlight device BL and the electrode SUS.

The air layer AG and the cushion layer CUS are provided between the electrode SUS and the drive electrode COML. With the existence of the air layer AG and the cushion layer CUS, the thickness of the space between the electrode SUS and the drive electrode COML is changeable according to the magnitude of the force applied to the input surface IS. When the force applied to the input surface IS is removed, the thickness of the space between the electrode SUS and the drive electrode COML returns to the original thickness as time proceeds.

The drive electrode COML is an example of a "first electrode" of the present invention. The intermediate electrode ELC is an example of "second and third electrodes" of the present invention. The electrode SUS is an example of a "conductor" of the present invention. The air layer AG is an example of a "first dielectric layer" of the present invention. The cushion layer CUS is an example of a "second dielectric layer" of the present invention. The force detector SE2 is an example of a "force detection apparatus" of the present invention. The liquid crystal layer 6 is an example of a "liquid crystal layer" of the present invention. The display apparatus 1 with a touch detection function is an example of a "liquid crystal display apparatus" of the present invention.

In the present configuration example, the air layer AG is provided between the display device 10 with a touch detection function and the backlight device BL. However, the embodiment is not limited thereto. A resin layer having high transmittance of light emitted from the backlight device BL may be provided between the display device 10 with a touch detection function and the backlight device BL, in place of the air layer AG. In this case, the degree of change of the thickness of the resin layer with respect to the force may be larger than the degree of change of the thickness of the cushion layer CUS with respect to the force. That is, the resin layer may be softer than the cushion layer CUS. In this case, the resin layer is an example of a "first dielectric layer" of the present invention.

A distance $d_3$ from the electrode SUS to the drive electrode COML is a distance in the Z direction as the third direction, and is a distance from a surface of the electrode SUS to a surface of the drive electrode COML. The surface of the electrode SUS is a surface facing the drive electrode COML, and the surface of the drive electrode COML is a surface facing the electrode SUS. The distance $d_3$ is changed according to the magnitude of the force applied to the cover member CG and the position where the force is applied.

Capacitance $C_3$ exists between the drive electrode COML and the electrode SUS. Capacitance $C_1$ exists between the drive electrode COML and the intermediate electrode ELC, and capacitance $C_2$ exists between the intermediate electrode ELC and the electrode SUS. The capacitance $C_3$ is synthetic capacitance of the capacitance $C_1$ and the capacitance $C_2$. The capacitance $C_1$, $C_2$, and $C_3$ are changed according to the distance $d_3$. Therefore, the COG 19 detects the change of the capacitance $C_1$, $C_2$, and $C_3$ to detect force information. A principle of the force detection will be described below in detail.

The capacitance $C_1$ is an example of "first capacitance" of the present invention. The capacitance $C_2$ is an example of "second capacitance" of the present invention.

The force detection controller 50 drives the drive electrode COML to obtain the force information based on the change of the capacitance $C_1$, $C_2$, and $C_3$ from the drive electrode COML. For example, the force detection controller 50 is included in the COG 19, and the COG 19 outputs a signal to the drive electrode COML and reads a signal based on the change of the capacitance $C_1$, $C_2$, and $C_3$ from the drive electrode COML. The force detection controller 50 may be included in the touch IC 49 or the host HST. The display controller 11, the touch detection controller 40, the force detection controller 50, and the host HST may control the touch detector SE1, the display device DP, and the force detector SE2 in cooperation with one another.

In the present configuration example, the drive electrode COML is shared among the touch detector SE1, the display device DP, and the force detector SE2.

Figure 18:
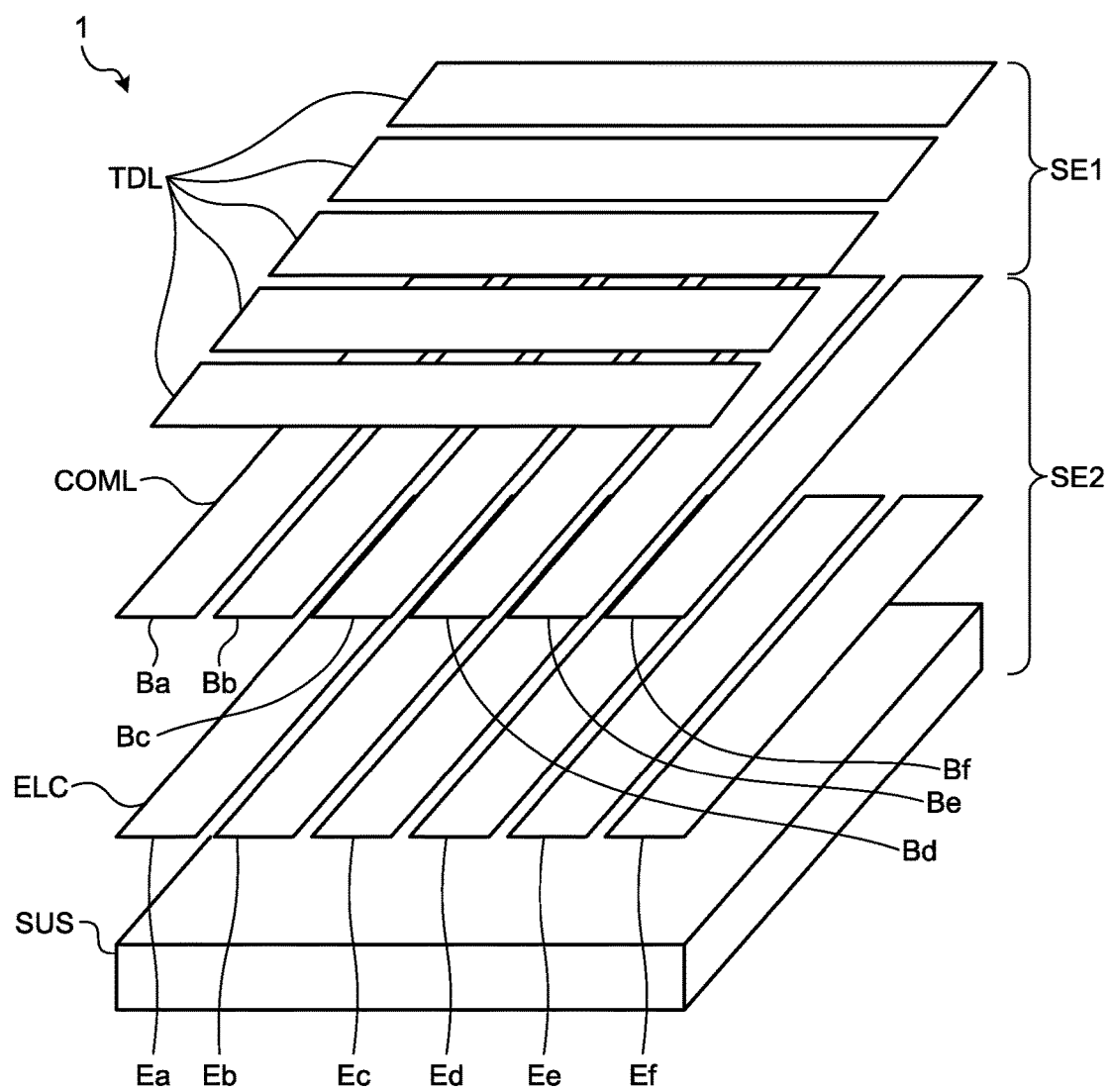
FIG. 18 is a perspective view illustrating the touch detection electrodes, drive electrode blocks, an intermediate electrode, and an electrode of the display apparatus with a touch detection function according to the embodiment.

FIG. 18 is a perspective view illustrating the touch detection electrodes, the drive electrode blocks, intermediate electrodes, and an electrode of the display apparatus with a touch detection function according to the embodiment. A plurality of the touch detection electrodes TDL and drive electrode blocks Ba, Bb, Bc, Bd, Be, and Bf form the touch detector SE1 of FIG. 1. Each of the drive electrode blocks Ba, Bb, Bc, Bd, Be, and Bf may be made up of one electrode or a plurality of electrodes.

The drive electrode blocks Ba, Bb, Bc, Bd, Be, and Bf, the intermediate electrode ELC, and the electrode SUS form the force detector SE2 in FIG. 1.

In the embodiment of the present invention, the unit of the drive electrode blocks driven in the touch detector SE1 and the unit of drive electrode blocks driven in the force detector SE2 are the same. However, the embodiment is not limited thereto. For example, the touch detector SE1 may individually drive the drive electrode blocks, and the force detector SE2 may drive all the drive electrode blocks or two or more drive electrode blocks at the same time. FIG. 18 illustrates the six drive electrode blocks Ba, Bb, Bc, Bd, Be, and Bf as the drive electrode blocks included in the drive electrode COML. However, the number of the drive electrode blocks is not limited to six. The number of the drive electrode blocks is arbitrary. As illustrated in FIG. 18, spaces are provided between adjacent blocks of the drive electrode blocks Ba, Bb, Bc, Bd, Be, and Bf of the drive electrode COML according to the embodiment.

As illustrated in FIG. 18, the intermediate electrode ELC according to the embodiment includes a plurality of intermediate electrode blocks Ea, Eb, Ec, Ed, Ee, and Ef, each of which has a strip shape. The intermediate electrode blocks Ea, Eb, Ec, Ed, Ee, and Ef extend in the X direction. The intermediate electrode blocks Ea, Eb, Ec, Ed, Ee, and Ef respectively overlap with the drive electrode blocks Ba, Bb, Bc, Bd, Be, and Bf when viewed from the Z direction. Spaces are provided between adjacent blocks of the intermediate electrode blocks Ea, Eb, Ec, Ed, Ee, and Ef.

FIG. 18 illustrates the six intermediate electrode blocks Ea, Eb, Ec, Ed, Ee, and Ef as the intermediate electrode ELC. However, the number of the intermediate electrode blocks is not limited to six. The number of the intermediate electrode blocks making up the intermediate electrode ELC is arbitrary. In the embodiment, for example, the intermediate electrode blocks making up the intermediate electrode ELC are the same number as the number of the drive electrode blocks making up the drive electrode COML.

The size of the electrode SUS in plan view may be the same as the size of the intermediate electrode ELC, or may be larger than the size of the intermediate electrode ELC.

Figure 19:
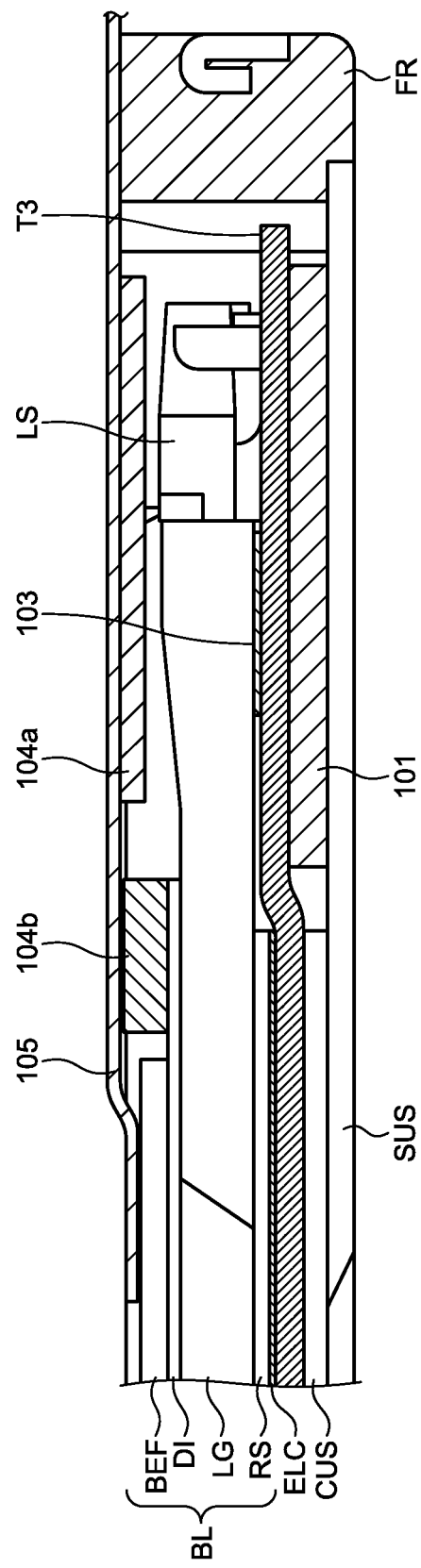
FIG. 19 is a sectional view illustrating an example of a configuration in the vicinity of a light source of the display apparatus with a touch detection function according to the embodiment.

FIG. 19 is a sectional view illustrating an example of a part of a configuration in the vicinity of the light source of the display apparatus with a touch detection function according to the embodiment. In the configuration example illustrated in FIG. 19, the conductive tape 101 and the cushion layer CUS are arranged on the electrode SUS. Further, the flexible printed substrate T3 is arranged on the conductive tape 101 and the cushion layer CUS. The reference potential is supplied from the COG 19, the touch IC 49, or the host HST to the electrode SUS through the conductive tape 101 and the flexible printed substrate T3.

The intermediate electrode ELC is arranged above the cushion layer CUS and on the flexible printed substrate T3. With this configuration, the intermediate electrode ELC is coupled with the COG 19, the touch IC 49, or the host HST through the flexible printed substrate T3.

The light reflector RS of the backlight device BL is arranged on the intermediate electrode ELC. The light guide LG of the backlight device BL is arranged above the conductive tape 101 and on the flexible printed substrate T3 across a tape 103. The light source LS is arranged on the flexible printed substrate T3 to come in contact with a side surface of the light guide LG. A spacer 104a is arranged above the light guide LG and the light source LS, and a spacer 104b is arranged on the light diffusion sheet DI of the backlight device BL. A tape 105 is arranged on the spacers 104a and 104b and the luminance enhancement film BEF of the backlight device BL.

According to the configuration example illustrated in FIG. 19, the flexible printed substrate T3 for supplying the power to the light source LS extends to the back surface side of the backlight device BL, and thus the intermediate electrode ELC can be arranged on the flexible printed substrate T3. With this configuration, simplification of the display apparatus and reduction of the parts count can be achieved.

Figure 20:
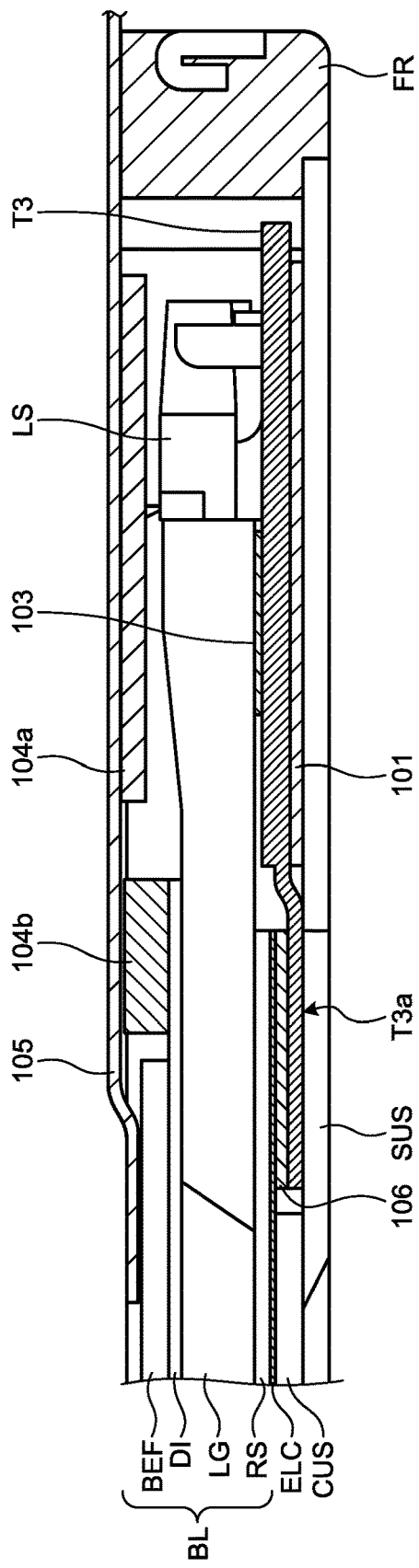
FIG. 20 is a sectional view illustrating another example of a configuration in the vicinity of the light source of the display apparatus with a touch detection function according to the embodiment.

FIG. 20 is a sectional view illustrating another example of a part of a configuration in the vicinity of the light source of the display apparatus with a touch detection function according to the embodiment. In the configuration example illustrated in FIG. 20, the intermediate electrode ELC is arranged on a lower surface of the light reflector RS of the backlight device BL.

A tip end portion T3a of the flexible printed substrate T3 is arranged on the electrode SUS and between the conductive tape 101 and the cushion layer CUS. A conductive tape 106 is arranged on the tip end portion T3a, and is coupled with the intermediate electrode ELC. With this configuration, the intermediate electrode ELC is coupled with the COG 19, the touch IC 49, or the host HST through the conductive tape 106 and the flexible printed substrate T3.

According to the configuration example illustrated in FIG. 20, the flexible printed substrate T3 for supplying the power to the light source LS can be coupled with the intermediate electrode ELC arranged on the lower surface of the light reflector RS. With this configuration, simplification of the display apparatus and reduction of the parts count can be achieved.

Figure 21:
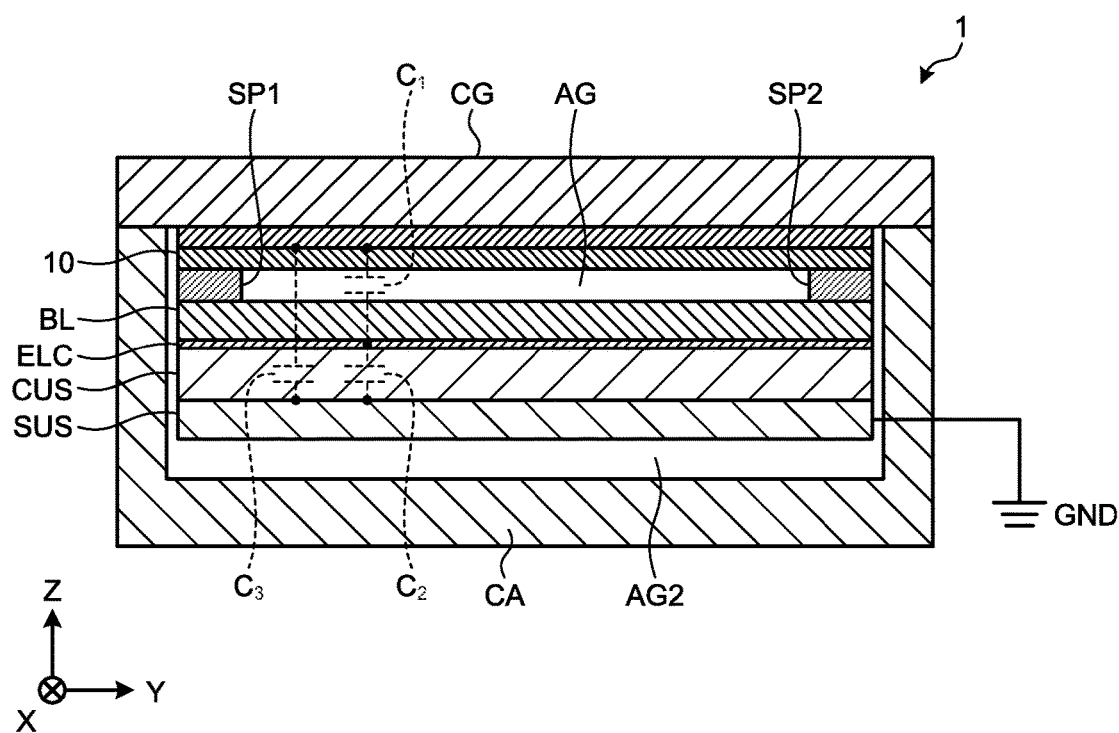
FIG. 21 is a sectional view illustrating an example of an overall configuration of the display apparatus with a touch detection function according to the embodiment.

FIG. 21 is a sectional view illustrating an example of an overall configuration of the display apparatus with a touch detection function according to the embodiment. In the configuration example illustrated in FIG. 21, end portions of the display device 10 with a touch detection function and the backlight device BL are coupled by spacers SP1 and SP2, and the air layer AG is arranged between the display device 10 with a touch detection function and the backlight device BL. The cushion layer CUS is arranged between the backlight device BL and the electrode SUS. In the configuration example illustrated in FIG. 21, the frame FR illustrated in FIG. 16 is not included. An air layer AG2 is arranged between the electrode SUS and the casing CA.

Comparative Example

Figure 22:
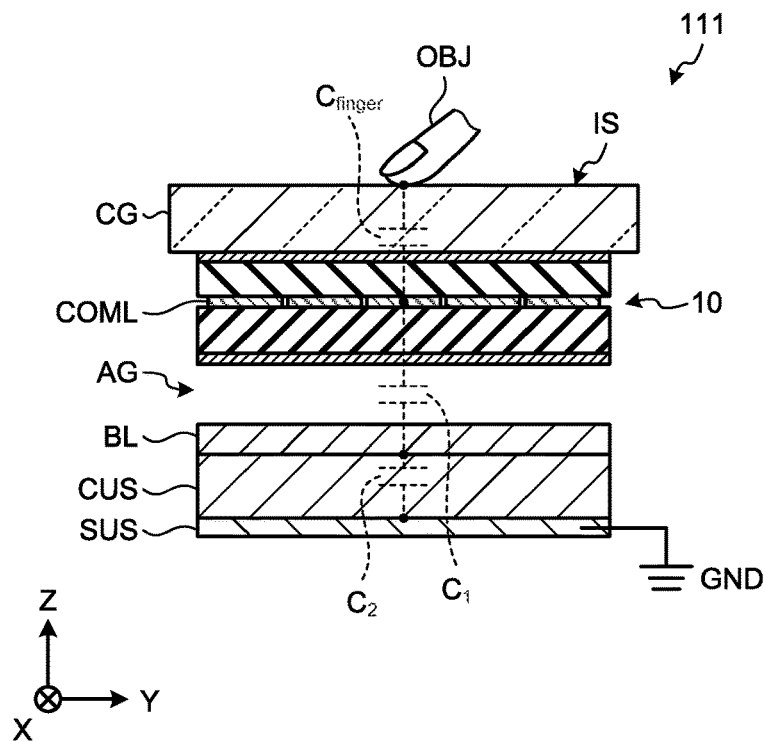
FIG. 22 is a sectional view illustrating a configuration of a display apparatus with a touch detection function according to a comparative example.

FIG. 22 is a sectional view illustrating a configuration of a display apparatus with a touch detection function according to a comparative example. A display apparatus 111 with a touch detection function according to the comparative example does not include an intermediate electrode ELC included in the display apparatus 1 with a touch detection function (see FIG. 18) according to the present embodiment.

The capacitance $C_1$ exists between the drive electrode COML and the cushion layer CUS, and the capacitance $C_2$ exists between the cushion layer CUS and the electrode SUS. The boundary between the capacitance $C_1$ and the capacitance $C_2$ may be the boundary between the air layer AG and the backlight device BL or may be the boundary between the backlight device BL and the cushion layer CUS.

As illustrated in FIG. 22, capacitance $C_{finger}$ occurs between the drive electrode COML and the object to be detected OBJ when the object to be detected (for example, the finger of the user) OBJ comes in contact with the input surface IS.

Figure 23:
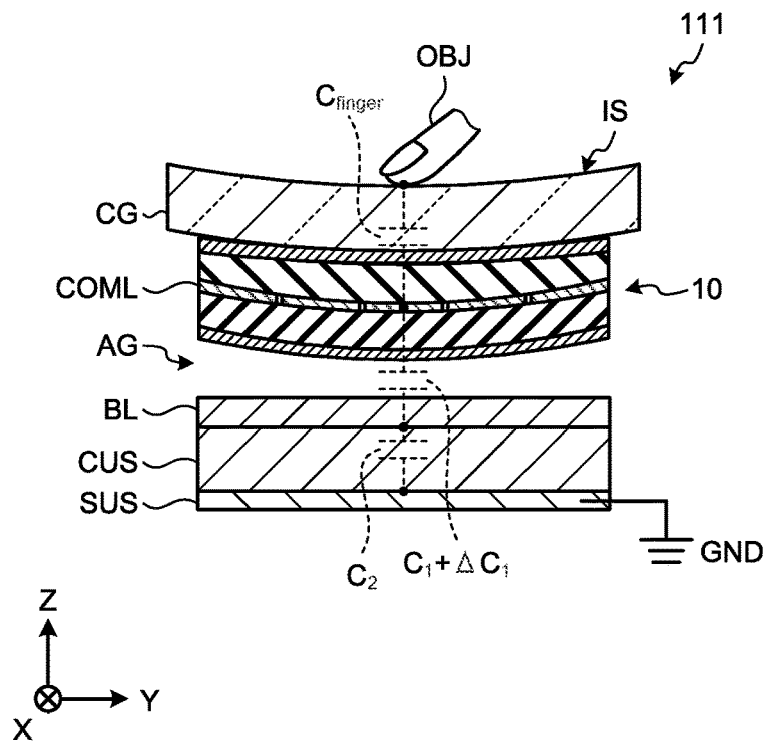
FIG. 23 is a sectional view illustrating the configuration of the display apparatus with a touch detection function according to the comparative example.

FIG. 23 is a sectional view illustrating the configuration of the display apparatus with a touch detection function according to the comparative example. As illustrated in FIG. 23, when the object to be detected OBJ applies force to the input surface IS, the display device 10 with a touch detection function is bent. When the display device 10 with a touch detection function is bent, the air layer AG becomes thin and the distance between the drive electrode COML and the cushion layer CUS becomes short. Therefore, the capacitance between the drive electrode COML and the cushion layer CUS is increased by $\Delta C_1$ to become $(C_1+\Delta C_1)$. Therefore, the capacitance between the drive electrode COML and the electrode SUS becomes the capacitance $C_3=1/(1/(C_1+$ $\Delta C_1)+1/C_2)$. The display apparatus 111 with a touch detection function detects the force on the basis of the capacitance $C_3$ between the drive electrode COML and the electrode SUS.

Figure 24:
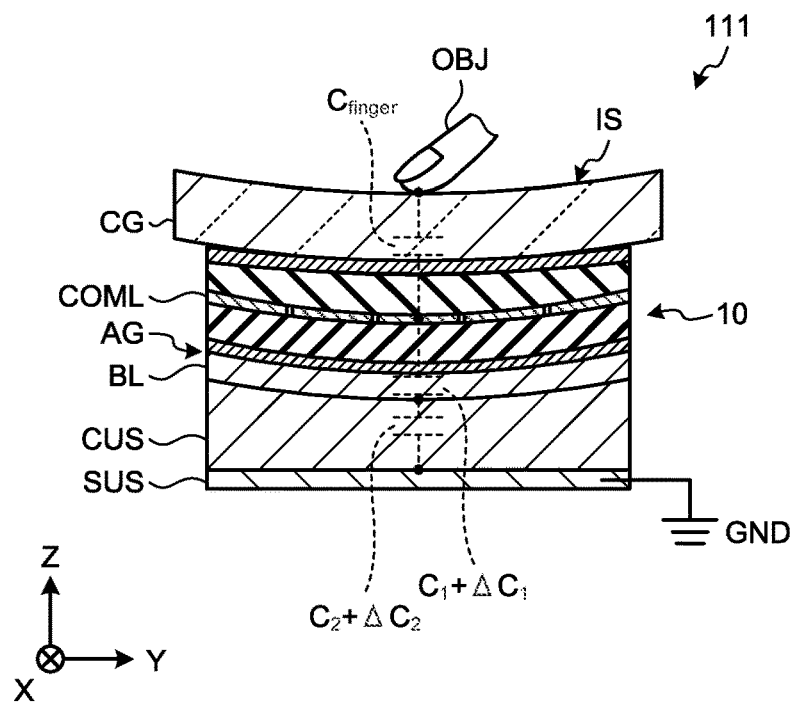
FIG. 24 is a sectional view illustrating the configuration of the display apparatus with a touch detection function according to the comparative example.

FIG. 24 is a sectional view illustrating the configuration of the display apparatus with a touch detection function according to the comparative example. As illustrated in FIG. 24, when the object to be detected OBJ further applies strong force to the input surface IS, the display device 10 with a touch detection function is bent, the thickness of the air layer AG reaches zero, the display device 10 with a touch detection function comes in contact with the backlight device BL, and the cushion layer CUS is compressed and elastically deformed.

When the cushion layer CUS is compressed and elastically deformed, the distance between the cushion layer CUS and the electrode SUS becomes short, and thus the capacitance between the cushion layer CUS and the electrode SUS is increased by $\Delta C_2$ to become $(C_2+\Delta C_2)$. Therefore, the capacitance between the drive electrode COML and the electrode SUS becomes the capacitance $C_3=1/(1/(C_1+\Delta C_1)+1/(C_2+\Delta C_2))$. The display apparatus 111 with a touch detection function detects the force on the basis of the capacitance $C_3$ between the drive electrode COML and the electrode SUS.

Figure 25:
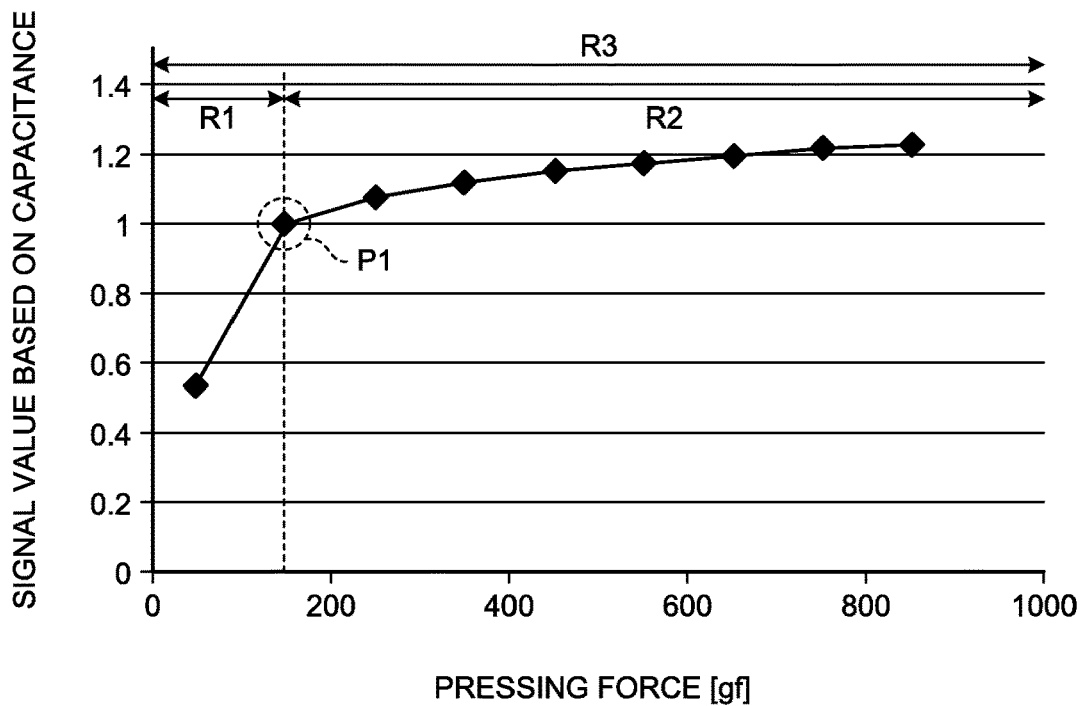
FIG. 25 is a graph illustrating a relationship between force applied to an input surface of the display apparatus with a touch detection function according to the comparative example, and a signal value based on capacitance.

FIG. 25 is a graph illustrating a relationship between force applied to an input surface of the display apparatus with a touch detection function according to the comparative example and a force signal value. In FIG. 25, the horizontal axis represents force [gf] applied to the input surface IS. The vertical axis represents a signal value based on the capacitance between the drive electrode COML and the electrode SUS. Hereinafter, the signal value based on the capacitance between the drive electrode COML and the electrode SUS is also referred to as force signal value. The force signal value is a signal value based on a voltage output from the drive electrode COML according to the basic principle of self-capacitive touch detection.

In a first range R1 of force in which only the air layer AG becomes thin and the cushion layer CUS is not deformed, the relationship between the force and the force signal value becomes linear.

Similarly, in second range R2 of force in which the thickness of the air layer AG reaches zero and the cushion layer CUS is elastically deformed according to force, the relationship between the force and the force signal value becomes linear.

However, permittivity of the air layer AG and permittivity of the cushion layer CUS are different. The degree of change of the thickness of the air layer AG with respect to the force and the degree of change of the thickness of the cushion layer CUS with respect to the force are different. Calculations of examples of the degree of change of the thickness of the cushion layer CUS with respect to the force include Young's modulus. The cushion layer CUS is less easily deformed than the air layer AG. Therefore, in a boundary between the first range R1 and the second range R2, an inflection point P1 occurs in the relationship between the force and the force signal value. Therefore, in the entire range R3 that is a combination of the first range R1 and the second range R2, the relationship between the force and the force signal value is not linear. Therefore, the display apparatus 111 with a touch detection function cannot favorably detect the force. That is, the display apparatus 111 with a touch detection function cannot improve detection accuracy of the force.

In FIG. 25, the scales of the vertical axis are normalized, where the force signal value at the inflection point P1 is "1".

Configuration of Display Apparatus with Touch Detection Function According to First Embodiment Next, a first embodiment will be described as an example of an embodiment of the present invention.

Figure 26:
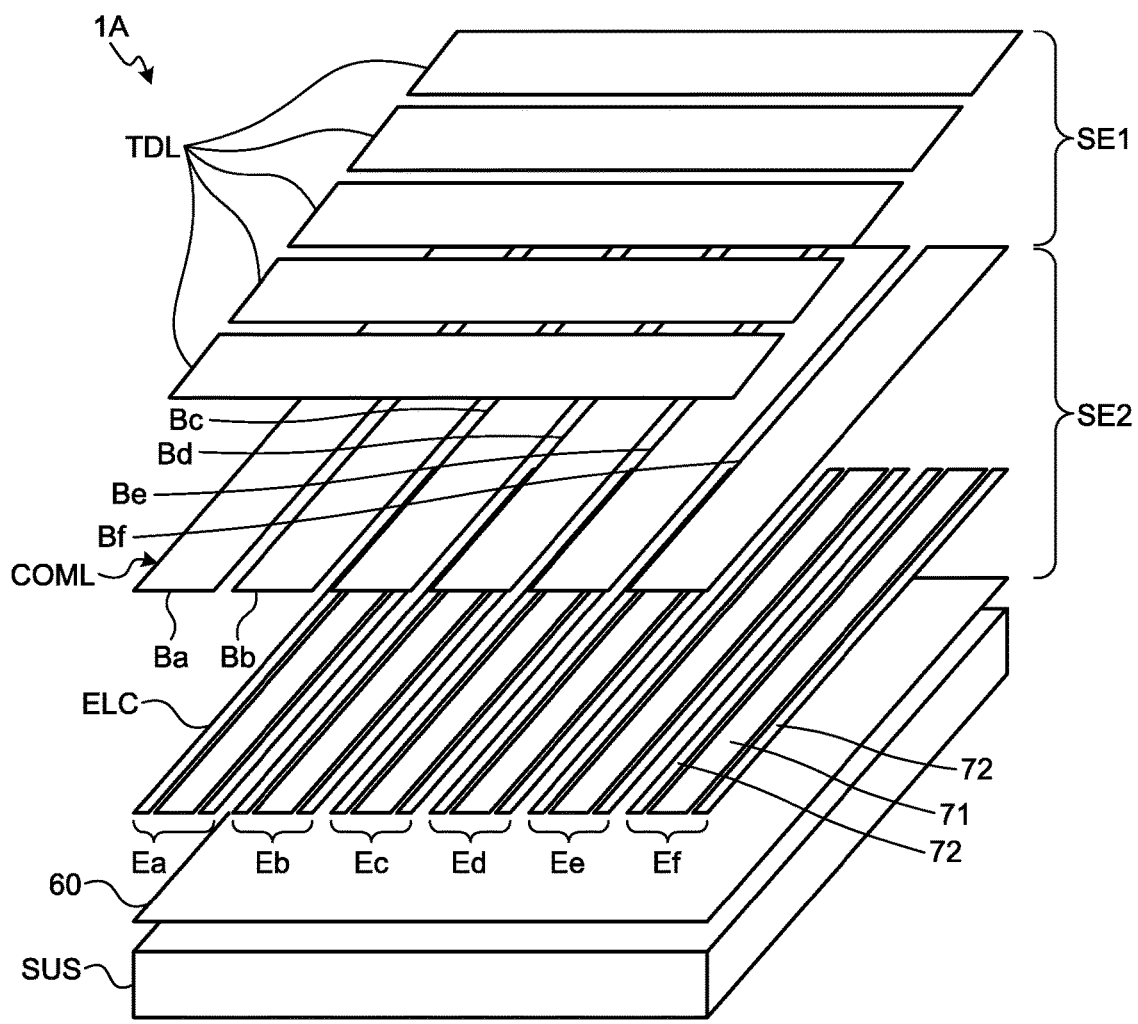
FIG. 26 is a perspective view illustrating touch detection electrodes, drive electrode blocks, an intermediate electrode, and an electrode of a display apparatus with a touch detection function according to a first embodiment.

FIG. 26 is a perspective view illustrating touch detection electrodes, drive electrode blocks, an intermediate electrode, and an electrode of a display apparatus with a touch detection function according to the first embodiment.

As illustrated in FIG. 26, an intermediate electrode ELC according to the first embodiment includes a plurality of intermediate electrode blocks Ea, Eb, Ec, Ed, Ee, and Ef. The intermediate electrode blocks Ea, Eb, Ec, Ed, Ee, and Ef have a strip shape as viewed from a Z direction, and extend in an X direction. Each of the intermediate electrode blocks Ea, Eb, Ec, Ed, Ee, and Ef includes a first intermediate electrode 71 and second intermediate electrodes 72. The first intermediate electrode 71 and the second intermediate electrodes 72 have a strip shape as viewed from the Z direction, and extend in the X direction. Spaces are provided between the first intermediate electrode 71 and the corresponding second intermediate electrodes 72.

Figure 27:
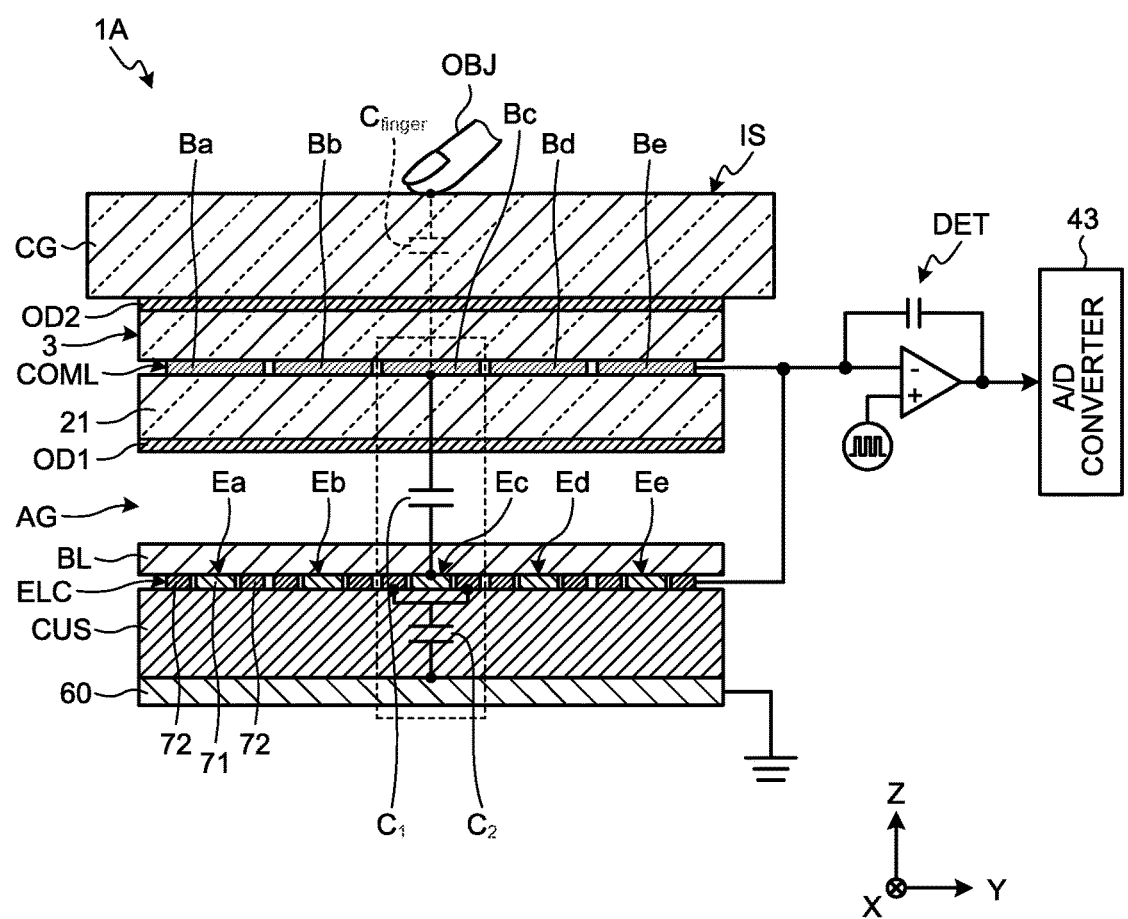
FIG. 27 is a sectional view illustrating a configuration example of the display apparatus with a touch detection function according to the first embodiment.
Figure 28:
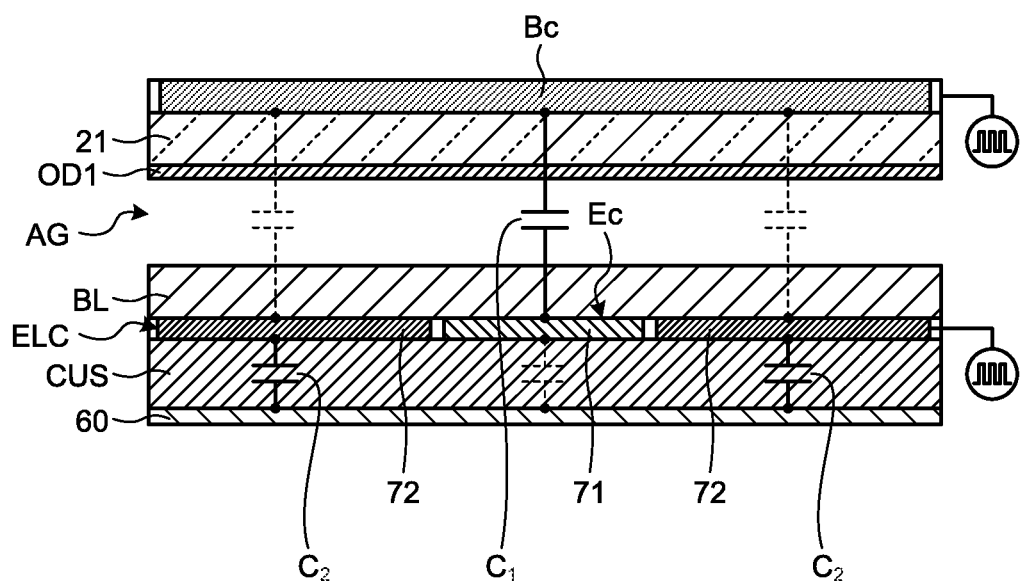
FIG. 28 is an enlarged sectional view of a portion surrounded by the broken line in FIG. 27.

FIG. 27 is a sectional view illustrating a configuration example of the display apparatus with a touch detection function according to the first embodiment. FIG. 28 is an enlarged sectional view of a portion surrounded by the broken line in FIG. 27. FIGS. 27 and 28 illustrate a display apparatus 1A with a touch detection function when an object to be detected OBJ (for example, a finger of a user) does not apply force to an input surface IS.

As illustrated in FIGS. 27 and 28, the display apparatus 1A with a touch detection function according to the first embodiment includes, in order from the side of the input surface IS, a cover member CG, a second optical element OD2, a counter substrate 3, a TFT substrate 21 including a drive electrode COML, a first optical element OD1, a backlight device BL, an intermediate electrode ELC, a cushion layer CUS, and a conductive film 60. Although not illustrated, a liquid crystal layer 6 (see FIG. 12) is arranged between the counter substrate 3 and the drive electrode COML. An air layer AG is arranged between the first optical element OD1 and the backlight device BL.

The drive electrode COML faces the input surface IS to which the object to be detected OBJ applies the force, and is arranged closer to the input surface IS than are the conductive film 60, the cushion layer CUS, and the intermediate electrode ELC. For example, a plurality of drive electrode blocks Ba, Bb, Bc, Bd, and Be included in the drive electrode COML are coupled with a drive electrode driver 14 (see FIG. 2). The drive electrode blocks Ba, Bb, Bc, Bd, and Be are coupled with a voltage detector DET. The drive electrode blocks Ba, Bb, Bc, Bd, and Be have the same shape and the same size.

The conductive film 60 is arranged in a position facing the drive electrode COML. The conductive film 60 is supplied with the reference potential (for example, the ground potential). The conductive film 60 is formed of a conductive material such as copper or stainless steel. Note that the material of the conductive film 60 is not limited and may be any material having conductivity.

The intermediate electrode ELC is provided between the drive electrode COML and the conductive film 60. The intermediate electrode ELC faces the drive electrode COML across the air layer AG deformable by the force applied from the input surface IS side. The intermediate electrode ELC faces the conductive film 60 across the cushion layer CUS deformable by the force applied from the input surface IS side. Deformation by the force is different between the air layer AG and the cushion layer CUS, and the air layer AG is more easily deformed than the cushion layer CUS, for example.

The intermediate electrode ELC includes the intermediate electrode blocks Ea, Eb, Ec, Ed, and Ee corresponding to the drive electrode blocks Ba, Bb, Bc, Bd, and Be included in the drive electrode COML. For example, the intermediate electrode block Ea overlaps with the drive electrode block Ba when viewed from the Z direction. The intermediate electrode block Eb overlaps with the drive electrode block Bb when viewed from the Z direction. Similarly, the intermediate electrode blocks Ec, Ed, and Ee respectively overlap with the drive electrode blocks Bc, Bd, and Be when viewed from the Z direction.

Each of the intermediate electrode blocks Ea, Eb, Ec, Ed, and Ee includes the first intermediate electrode 71 and the two second intermediate electrodes 72. When the force detector SE2 (see FIG. 1) performs the force detection, the first intermediate electrode 71 is supplied with the reference potential (for example, the ground potential), and the second intermediate electrode 72 receives a signal that is the same signal as a force detection drive signal (for example, a signal having the same phase and the same amplitude as the force detection drive signal). In this disclosure, "the same signal" is the same signal or substantially the same signal. Hereinafter, the signal having the same phase and the same amplitude as the force detection drive signal is referred to as a guard signal. The first intermediate electrode 71 and the second intermediate electrode 72 are coupled with the drive electrode driver 14. The second intermediate electrode 72 is coupled with the voltage detector DET.

When the force detector SE2 (see FIG. 1) performs the force detection, the drive electrode driver 14 sequentially selects one or more of drive electrode blocks Ba, Bb, Bc, Bd, and Be along a scanning direction (for example, a Y direction) in the display apparatus 1A with a touch detection function. Then, the drive electrode driver 14 supplies an alternating-current rectangular wave Sg (drive signal Vcomts2) as the force detection drive signal to the selected one or more of the drive electrode blocks Ba, Bb, Bc, Bd, and Be. The drive electrode driver 14 supplies the guard signal in synchronization with the force detection drive signal to the second intermediate electrodes 72 of one or more of the intermediate electrode blocks Ea, Eb, Ec, Ed, and Ee corresponding to the selected one or more of the drive electrode blocks Ba, Bb, Bc, Bd, and Be. The voltage detector DET detects voltage signals output from the second intermediate electrodes 72 of the intermediate electrode blocks Ea, Eb, Ec, Ed, and Ee, and voltage signals output from the drive electrode blocks Ba, Bb, Bc, Bd, and Be.

For example, as illustrated in FIG. 28, the drive electrode driver 14 supplies the drive signal Vcomts2 to the drive electrode block Bc, and supplies the guard signal in synchronization with the drive signal Vcomts2 to the second intermediate electrodes 72 of the intermediate electrode block Ec.

When the drive signal Vcomts2 is supplied to the drive electrode block Bc, a potential difference is generated between the drive electrode block Bc and the first intermediate electrode 71, and the capacitance $C_1$ is generated, because the first intermediate electrode 71 of the intermediate electrode block Ec is supplied with the reference potential (for example, the ground potential). When the guard signal is supplied to the second intermediate electrodes 72 of the intermediate electrode block Ec, a potential difference is generated between the second intermediate electrodes 72 and the conductive film 60, and the capacitance $C_2$ is generated, because the conductive film 60 is supplied with the reference potential (for example, the ground potential).

Meanwhile, the capacitance as illustrated by the broken line in FIG. 28 is not generated between the drive electrode block Bc and the second intermediate electrodes 72 of the intermediate electrode block Ec. The reason is that the guard signal is supplied to the second intermediate electrodes 72 in synchronization with the drive signal Vcomts2 to be supplied to the drive electrode block Bc, and thus the drive electrode block Bc and the second intermediate electrodes 72 have the same potential. The capacitance as illustrated by the broken line in FIG. 27 is not generated between the first intermediate electrode 71 and the conductive film 60. The reason is that the first intermediate electrode 71 and the conductive film 60 are supplied with the reference potential (for example, the ground potential), and thus the first intermediate electrode 71 and the conductive film 60 have the same potential.

In the first embodiment, the drive electrode COML coupled with the voltage detector DET and the second intermediate electrodes 72 of the intermediate electrode ELC function as a force detection sensor. In the first embodiment, the drive electrode COML and the second intermediate electrodes 72 of the intermediate electrode ELC output a detection signal Vdet3 through the voltage detector DET.

Figure 29:
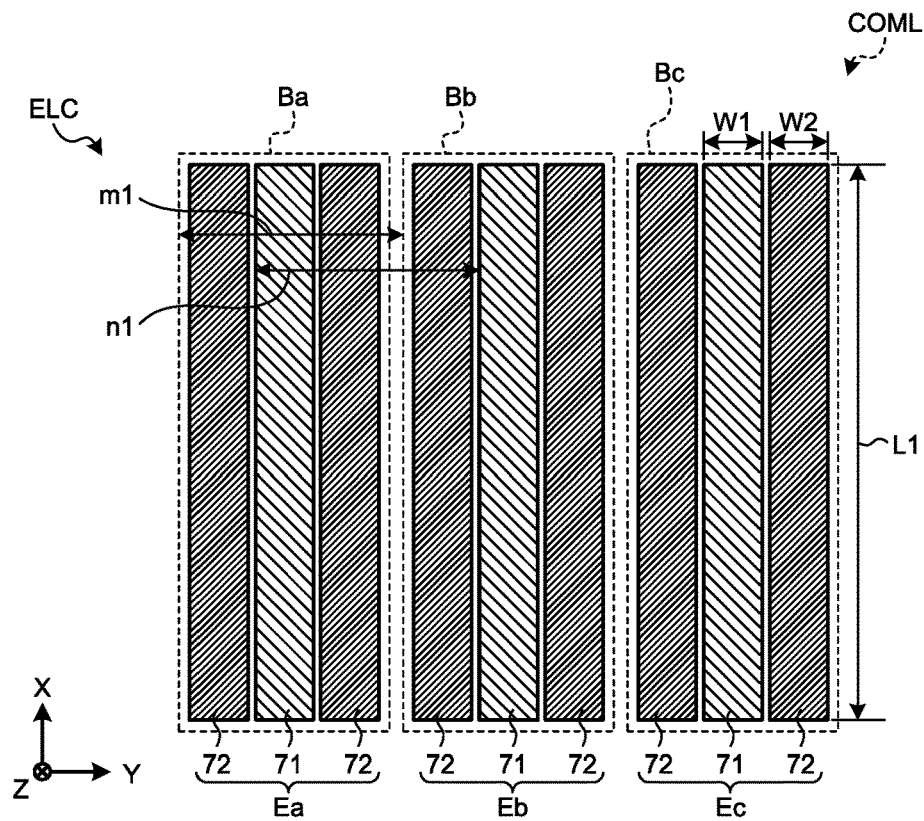
FIG. 29 is a plan view illustrating a first configuration example of the intermediate electrode.

FIG. 29 is a plan view illustrating a first configuration example of the intermediate electrode. FIG. 29 illustrates the three intermediate electrode blocks Ea, Eb, and Ec as the intermediate electrode blocks included in the intermediate electrode ELC. FIG. 29 illustrates the drive electrode blocks Ba, Bb, and Bc of the drive electrode COML by the broken lines to illustrate the positional relationship between the drive electrode blocks of the drive electrode COML and the intermediate electrode blocks of the intermediate electrode ELC when viewed from the Z direction.

In FIG. 29 and FIGS. 34 to 37 described below, the broken lines that indicate the drive electrode blocks Ba, Bb, and Bc or the electrodes EL are illustrated outside the solid lines that indicate the intermediate electrode blocks Ea, Eb, and Ec or intermediate electrodes Ex and Ey. However, this illustration is made to easily distinguish the broken lines and solid lines in the drawings, and does not define the sizes of the electrodes. In FIG. 29 and FIGS. 34 to 37 described below, the spaces between the intermediate electrode blocks Ea, Eb, and Ec or the electrodes EL are illustrated larger than the spaces between the electrodes in the intermediate electrode blocks Ea, Eb, and Ec and the electrodes EL. However, this illustration is also made to easily distinguish the spaces between the intermediate electrode blocks Ea, Eb, and Ec or the electrodes EL and the spaces between the electrodes in the intermediate electrode blocks Ea, Eb, and Ec and the electrodes EL in the drawings, and does not define the sizes of the spaces.

As illustrated in FIG. 29, the intermediate electrode blocks Ea, Eb, and Ec respectively overlap with the drive electrode blocks Ba, Bb, and Bc when viewed from the Z direction. The intermediate electrode blocks Ea, Eb, and Ec have a strip shape and extend in the X direction. The intermediate electrode blocks Ea, Eb, and Ec are arranged in the Y direction. Outer peripheral shapes of the intermediate electrode blocks Ea, Eb, and Ec in plan view are the same as outer peripheral shapes of the drive electrode blocks Ba, Bb, and Bc in plan view, respectively. Outer peripheral sizes of the intermediate electrode blocks Ea, Eb, and Ec in plan view are the same as outer peripheral sizes of the drive electrode blocks Ba, Bb, and Bc in plan view, respectively.

As illustrated in FIG. 29, each of the intermediate electrode blocks Ea, Eb, and Ec includes one first intermediate electrode 71 and two second intermediate electrodes 72 arranged one on each side of the first intermediate electrode 71 in the Y direction. The first intermediate electrode 71 has a strip shape and extends in the X direction. The second intermediate electrodes 72 also have a strip shape and extend in the X direction. The first intermediate electrode 71 and the second intermediate electrodes 72 are adjacent to each other in the Y direction. A space between the first intermediate electrode 71 and the second intermediate electrode 72 adjacent to each other in the Y direction, and a space between the second intermediate electrodes 72 adjacent to each other in the Y direction have the same width.

In the example illustrated in FIG. 29, the length of the first intermediate electrode 71 in the X direction and the length of the second intermediate electrode 72 in the X direction are the same. In FIG. 29, one first intermediate electrode 71 overlaps with one drive electrode block when viewed from the Z direction, and an area S1 of the first intermediate electrode 71 is calculated by S1=W1×L1. L1 is the length of the first intermediate electrode 71 in the X direction and is also the length of the second intermediate electrode 72 in the X direction. W1 is the width of the first intermediate electrode 71 in the Y direction. In FIG. 29, an area S2 of the second intermediate electrodes 72 overlapping with one drive electrode block when viewed from the Z direction is calculated by S2=W2×L1×2. W2 is the width of the second intermediate electrodes 72 in the Y direction. A ratio of the areas S1 and S2 can be expressed by a ratio of the widths W1 and W2 obtained by dividing the areas S1 and S2 by the length L1. In the example illustrated in FIG. 29, an arrangement interval n1 of the first intermediate electrodes 71 is the same as an arrangement interval m1 of the drive electrode blocks Ba, Bb, and Bc.

In this way, in the example illustrated in FIG. 29, the length of the first intermediate electrode 71 in the X direction and the length of the second intermediate electrode 72 in the X direction are the same length L1, and thus the area ratio of the first intermediate electrode 71 and the second intermediate electrode 72 is determined by the ratio of the widths W1 and W2.

In the first embodiment, the drive electrode blocks Ba, Bb, Bc, Bd, Be, and Bf of the drive electrode COML are examples of "first electrode" of the present invention. The "intermediate electrode blocks Ea, Eb, Ec, Ed, and Ee, Ef" of the intermediate electrode ELC are examples of "second electrode and third electrode" of the present invention. The conductive film 60 is an example of a "conductor" of the present invention. The air layer AG is an example of a "first dielectric layer" of the present invention. The cushion layer CUS is an example of a "second dielectric layer" of the present invention. The capacitance $C_1$ is an example of "first capacitance" of the present invention. The capacitance $C_2$ is an example of "second capacitance" of the present invention. The first intermediate electrode 71 is an example of a "second electrode" of the present invention. The second intermediate electrode 72 is an example of a "third electrode" of the present invention. The X direction is an example of a "first direction" of the present invention. The Y direction is an example of a "second direction" of the present invention. The force detector SE2 is an example of a "force detection apparatus" of the present invention. The liquid crystal layer is an example of a "liquid crystal layer" of the present invention. The display apparatus 1A with a touch detection function is an example of a "liquid crystal display apparatus" of the present invention.

Detection Example of Capacitance Change in First Embodiment

Next, a detection example of capacitance change per unit force in the first embodiment will be described.

Figure 30:
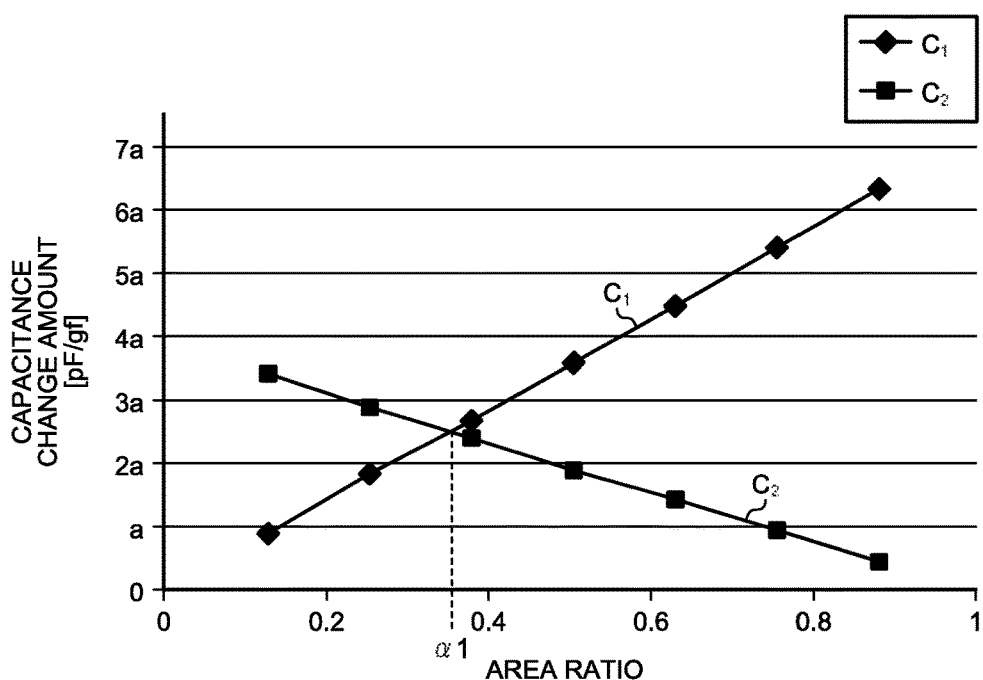
FIG. 30 is a graph illustrating a relationship between area ratios of first and second intermediate electrodes, and a capacitance change amount per unit force according to the first embodiment.

FIG. 30 is a graph illustrating a relationship between area ratios of first and second intermediate electrodes, and a capacitance change amount per unit force according to the first embodiment. The horizontal axis in FIG. 30 represents an area ratio S1/(S1+S2) of the first intermediate electrode 71 and the second intermediate electrode 72. The area S1 is an area, as viewed from the Z direction, of the first intermediate electrode 71 overlapping with one drive electrode block (for example, the drive electrode block Bc) when viewed from the Z direction. The area S2 is an area, as viewed from the Z direction, of the second intermediate electrodes 72 overlapping with one drive electrode block when viewed from the Z direction. The vertical axis in FIG. 30 represents capacitance change amount per unit force [pF/gf], the force being applied from the input surface IS side. The "a" in the vertical axis is a constant.

A straight line $C_1$ illustrated in FIG. 30 indicates a relationship between the capacitance change amount per unit force and the area ratio S1/(S1+S2) pertaining to the capacitance $C_1$ illustrated in FIG. 28. A straight line $C_2$ in FIG. 30 indicates a relationship between the capacitance change amount per unit force and the area ratio S1/(S1+S2) pertaining to the capacitance $C_2$ illustrated in FIG. 28.

The change amount per unit force of the capacitance $C_1$ is given by $\varepsilon 1 \times S1 \times \Delta d1/(d1 \times (d1 - \Delta d1))$, where $\varepsilon 1$ is permittivity of the air layer AG, d1 is the thickness of the air layer AG when no force is applied, and $\Delta d1$ is a change amount of the thickness when unit force is applied to the air layer AG.

The change amount per unit force of the capacitance $C_2$ is given by $\varepsilon 2 \times S2 \times \Delta d2/(d2 \times (d2 - \Delta d2))$, where $\varepsilon 2$ is permittivity of the cushion layer CUS, d2 is the thickness of the cushion layer CUS when no force is applied, and $\Delta d2$ is a change amount of the thickness when unit force is applied to the cushion layer CUS.

As illustrated in FIG. 30, the change amount per unit force of the capacitance $C_1$ becomes larger and the change amount per unit force of the capacitance $C_2$ becomes smaller as the area ratios S1/(S1+S2) are closer to 1. The change amount per unit force of the capacitance $C_1$ becomes smaller and the change amount per unit force of the capacitance $C_2$ becomes larger as the area ratios S1/(S1+S2) are closer to 0. The inclination of the straight line $C_1$ is positive and the inclination of the straight line $C_2$ is negative, and the straight line $C_1$ and the straight line $C_2$ intersect between 0 and 1 of the area ratios S1/(S1+S2).

As illustrated in FIG. 30, the area ratio obtained when the straight line $C_1$ and the straight line $C_2$ intersect is $\alpha 1$ in the first embodiment. When the area ratio S1/(S1+S2) equals $\alpha 1$, the change amount per unit force of the capacitance $C_1$ and the change amount per unit force of the capacitance $C_2$ equal each other, and Expression (1) is established. Here, $\alpha 1$ is larger than 0 and smaller than 1.

$$\varepsilon 1 \times S1 \times \Delta d1/(d1 \times (d1 - \Delta d1)) = \varepsilon 2 \times S2 \times \Delta d2/(d2 \times (d2 - \Delta d2)) \quad \text{Expression (1)}$$

The area ratio α1 illustrated in FIG. 30, that is, the ratio of the areas S1 and S2 when Expression (1) is established can be calculated by assigning the values ε1, ε2, d1, d2, Δd1, and Δd2 to Expression (1). The area ratio α1 can be obtained through simulation.

The area ratio S1/(S1+S2) is the same as the ratio of the width W1 of the first intermediate electrode 71 in the Y direction to the width W2 of the second intermediate electrode 72 in the Y direction in the example illustrated in FIG. 29. Therefore, a designer of the display apparatus 1A with a touch detection function can set the area ratio S1/(S1+S2) to be the area ratio α1 by adjusting the ratio of the widths W1 and W2 when designing the display apparatus 1A with a touch detection function.

Figure 31:
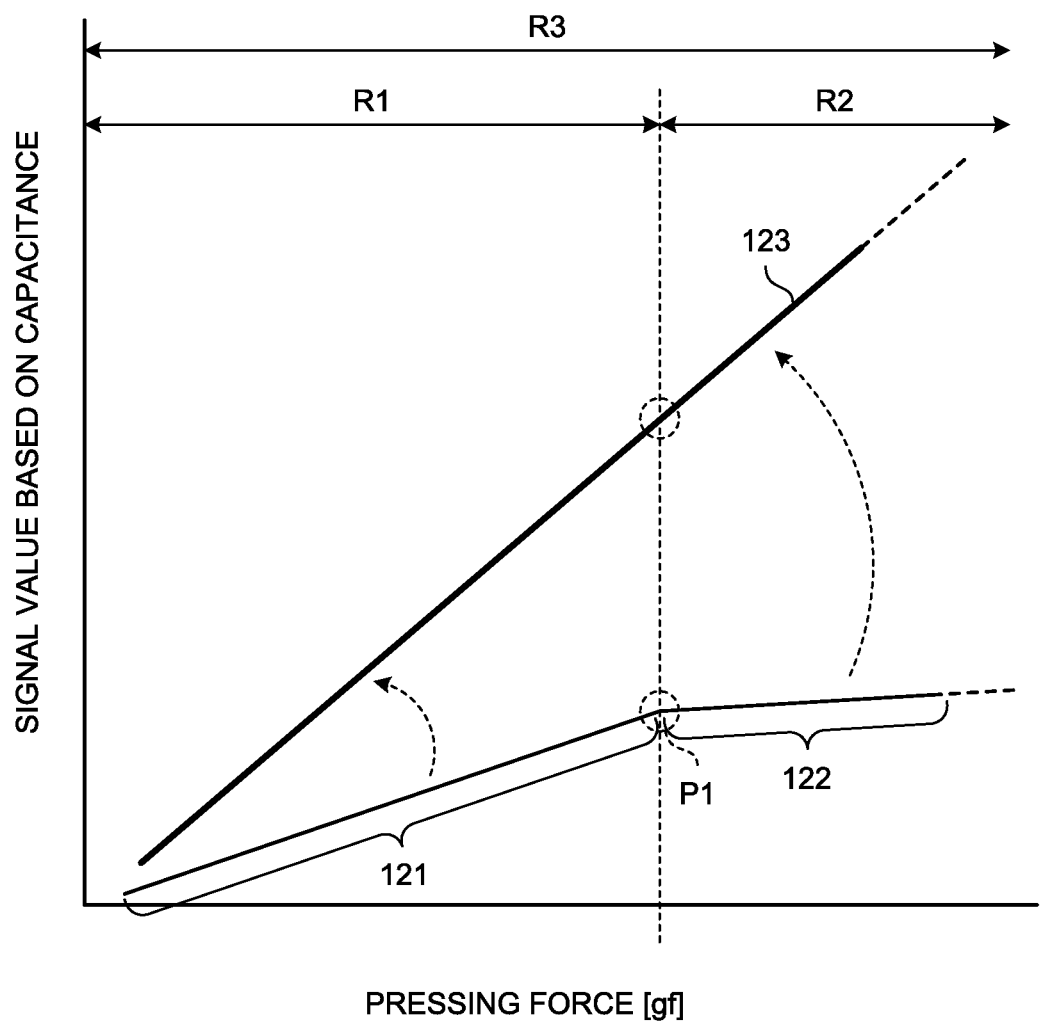
FIG. 31 is a diagram comparing the first embodiment and the comparative example with respect to the relationship between force applied to an input surface of the display apparatus with a touch detection function and the signal value based on capacitance.

FIG. 31 is a diagram comparing the first embodiment and the comparative example with respect to the relationship between force applied to an input surface of the display apparatus with a touch detection function and the signal value based on capacitance. The horizontal axis in FIG. 31 represents force [gf] applied to the input surface. The vertical axis in FIG. 31 represents the signal value based on the capacitance.

As illustrated in FIG. 31, in the comparative example, the inclination of a straight line that indicates the relationship between the force and the force signal value is different between the first range R1 and the second range R2. The first range R1 is a range of force in which only the air layer AG becomes thin and the cushion layer CUS is not deformed, and the second range R2 is a range of force in which the thickness of the air layer AG reaches zero and the cushion layer CUS is elastically deformed according to the force. In the comparative example, the inflection point P1 at which the inclination is changed exists between a straight line 121 and a straight line 122. The straight line 121 indicates the relationship between the force and the force signal value in the first range R1, and the straight line 122 indicates the relationship between the force and the force signal value in the second range R2.

In contrast, in the force detector SE2 according to the first embodiment, the area ratio S1/(S1+S2) of the first intermediate electrode 71 and the second intermediate electrode 72 is α1 as illustrated in FIG. 30 in each of the intermediate electrode blocks Ea, Eb, Ec, Ed, Ee, and Ef. That is, the change amount per unit force of the first capacitance C1 obtained when the thickness of the air layer AG is decreased by the force is the same as the change amount per unit force of the second capacitance C2 obtained when the thickness of the cushion layer CUS is decreased by the force. From this, the change amount per unit force of the capacitance $C_1$ and the change amount per unit force of the capacitance $C_2$ are the same in regions where the first and second intermediate electrodes 71 and 72 overlap with the respective intermediate electrode blocks Ea, Eb, Ec, Ed, Ee, and Ef when viewed from the Z direction.

Therefore, as illustrated in FIG. 31, in the first embodiment, the inclination in the first range R1 and the inclination in the second range R2 in the straight line that indicates the relationship between the force and the force signal value become the same. The straight line that indicates the relationship between the force and the force signal value becomes a straight line 123 in the entire range R3 that is a combination of the first range R1 and the second range R2, and the inclination change at the inflection point P1 between the lines of the first range R1 and the second range R2 becomes small. In the display apparatus 1A with a touch detection function, a calculation amount of inclination correction of the straight line is reduced because the inclination change at the inflection point P1 becomes small in the straight line that indicates the relationship between the force and the force signal value.

Force Detection Operation in First Embodiment

Next, a force detection operation in the first embodiment will be described.

Figure 32:
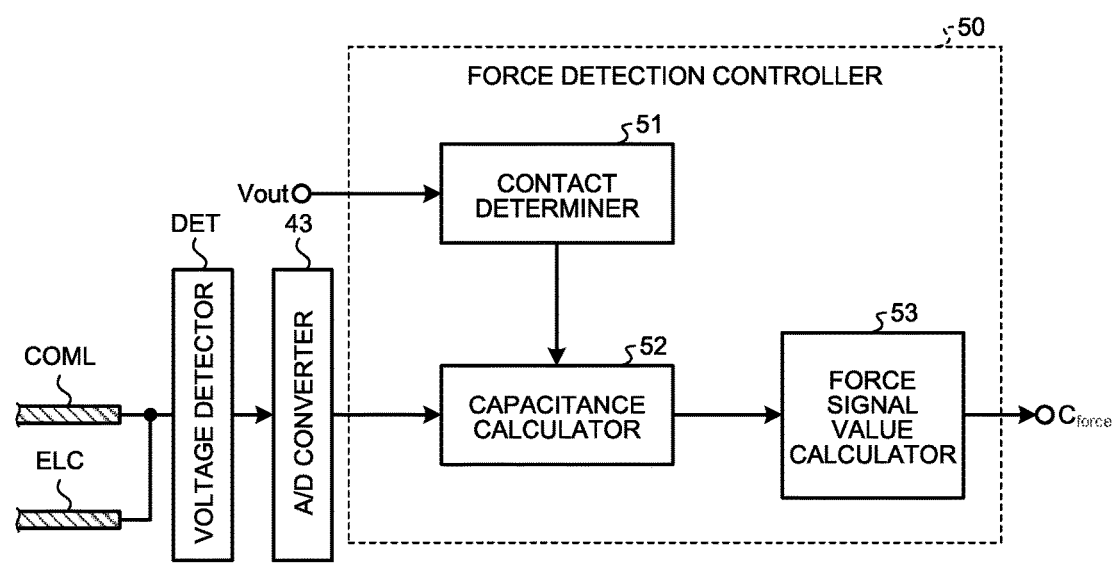
FIG. 32 is a functional block diagram illustrating of a force detection controller of the display apparatus with a touch detection function according to the first embodiment.

FIG. 32 is a functional block diagram illustrating a force detection controller of the display apparatus with a touch detection function according to the first embodiment. The force detection controller 50 includes a contact determiner 51, a capacitance calculator 52, and a force signal value calculator 53. The force detection controller 50 is coupled with the voltage detector DET through an A/D converter 43.

The contact determiner 51, the capacitance calculator 52, and the force signal value calculator 53 can be realized by execution of programs by the COG 19, the touch IC 49, or the host HST. Alternatively, the contact determiner 51, the capacitance calculator 52, and the force signal value calculator 53 can be realized by execution of the programs by two or more of the COG 19, the touch IC 49, and the host HST in cooperation with one another.

The contact determiner 51 determines whether the object to be detected OBJ is in contact with or in proximity to the input surface IS on the basis of a signal Vout output from the touch detection controller 40 (see FIG. 2).

The voltage detector DET detects a voltage signal Vdet3, when the drive signal Vcomts2 is supplied to the drive electrode COML, the first intermediate electrode 71 of the intermediate electrode ELC and the conductive film 60 are supplied with the reference potential (for example, the ground potential), and the guard signal is supplied to the second intermediate electrode 72 of the intermediate electrode ELC. The A/D converter 43 performs analog-to-digital conversion on the voltage signal Vdet3 detected by the voltage detector DET, and outputs the converted signal Vdet3 to the capacitance calculator 52.

The capacitance calculator 52 calculates capacitance $C_3$ generated between the drive electrode COML and the conductive film 60 on the basis of the signal Vdet3 on which the analog-to-digital conversion has been performed by the A/D converter 43. The capacitance $C_3$ is synthetic capacitance of the capacitance $C_1$ generated between the drive electrode COML and the first intermediate electrode 71 and the capacitance $C_2$ generated between the second intermediate electrode 72 and the conductive film 60. The capacitance calculator 52 outputs the calculated capacitance $C_3$ to the force signal value calculator 53.

The force signal value calculator 53 calculates a force signal value $C_{force}$ on the basis of the capacitance $C_3$.

Figure 33:
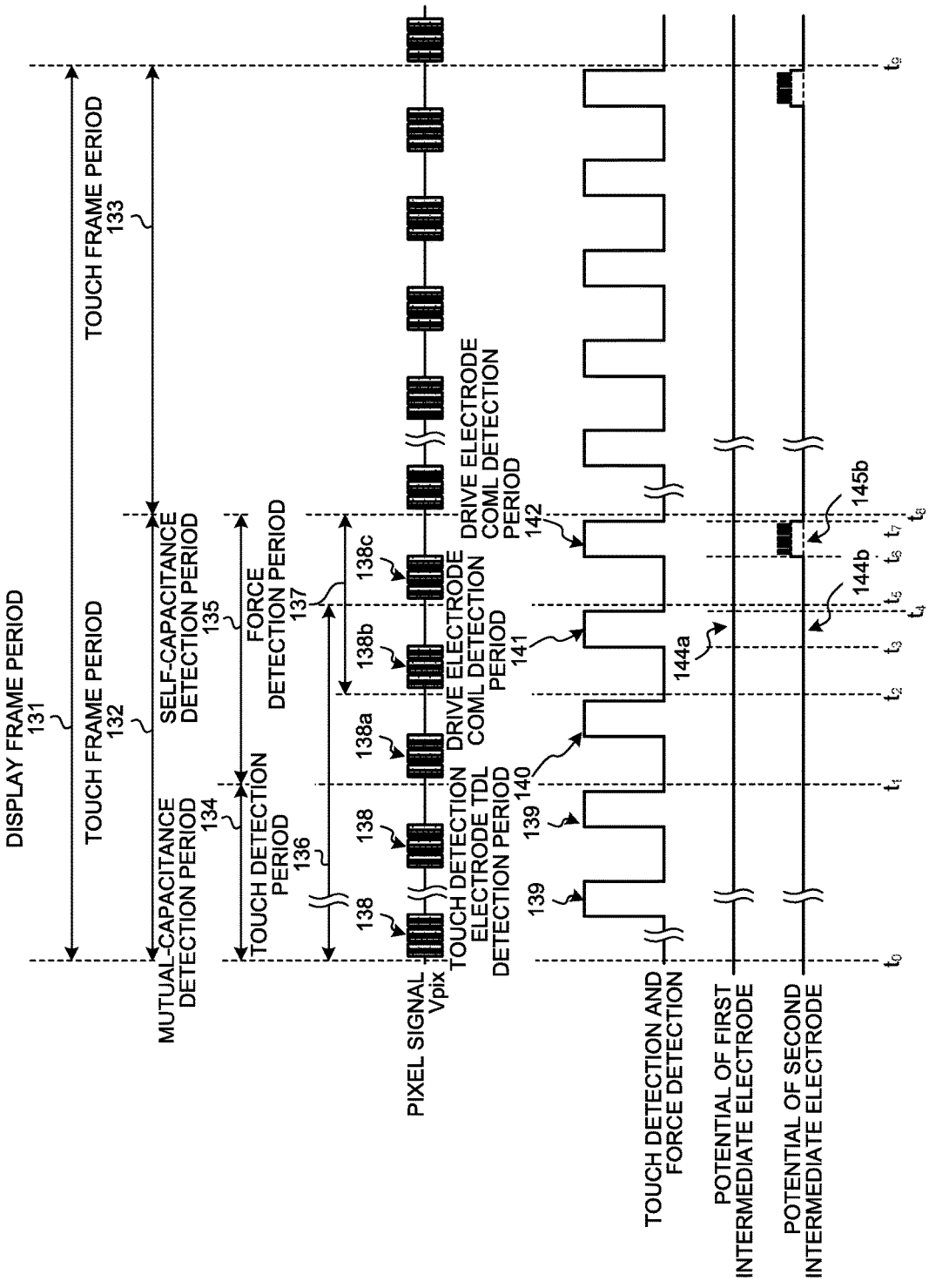
FIG. 33 is a timing chart illustrating an example of operation timing of the display apparatus with a touch detection function according to the first embodiment.

FIG. 33 is a timing chart illustrating an example of operation timing of the display apparatus with a touch detection function according to the first embodiment.

A display frame period 131 is a period in which one image (one frame) is displayed. The display frame period 131 starts at timing $t_0$ and ends at timing $t_9$. The display frame period 131 includes two touch frame periods 132 and 133 in which touch detection and force detection are performed. The display frame period 131 may include one touch frame period only, or may include three or more touch frame periods.

The touch frame period 132 starts at the timing $t_0$ and ends at timing $t_8$. The touch frame period 133 starts at the timing $t_8$ and ends at timing $t_9$. The operation timing in the touch frame period 133 is the same as the operation timing in the touch frame period 132, and thus description will be given about the touch frame period 132 only.

The touch frame period 132 includes a mutual-capacitance detection period 134 and/or a self-capacitance detection period 135. The mutual-capacitance detection period 134 is a period in which the mutual-capacitance between the drive electrode COML and the touch detection electrode TDL is detected on the basis of the basic principle of mutual-capacitive touch detection, and the self-capacitance detection period 135 is a period in which the self-capacitance of the drive electrode COML and the touch detection electrode TDL is detected on the basis of the basic principle of self-capacitive touch detection. The mutual-capacitance detection period 134 starts at the timing $t_0$ and ends at timing $t_1$. The self-capacitance detection period 135 starts at the timing $t_1$ and ends at the timing $t_8$.

The touch frame period 132 includes a touch detection period 136 and a force detection period 137. The touch detection period 136 is a period in which the object to be detected OBJ being in contact with or in proximity to the input surface IS is detected, and the force detection period 137 is a period in which the force supplied by the object to be detected OBJ to the input surface IS is detected. A part of the touch detection period 136 and a part of the force detection period 137 overlap with each other.

The touch detection period 136 starts at the timing $t_0$ and ends at timing $t_5$ beyond the timing $t_1$. The timing $t_0$ is the same as the start timing of the mutual-capacitance detection period 134, and the timing $t_1$ is the start timing of the self-capacitance detection period 135. That is, the touch detection period 136 extends over the mutual-capacitance detection period 134 and the self-capacitance detection period 135.

The force detection period 137 starts at timing $t_2$ during the self-capacitance detection period 135 and during the touch detection period 136. The force detection period 137 ends at the timing $t_8$ beyond the timing $t_5$. The timing $t_8$ is the same as the end timing of the self-capacitance detection period 135, and the timing $t_5$ is the end timing of the touch detection period 136.

In the mutual-capacitance detection period 134, a display period 138 and a capacitance detection period 139 are alternately repeated. The display period 138 is a period in which a pixel signal Vpix is supplied to a display device DP such that the display device DP displays an image. The capacitance detection period 139 is a period in which the mutual-capacitance between the drive electrode COML and the touch detection electrode TDL is detected. The mutual-capacitance between the drive electrode COML and the touch detection electrode TDL detected in the capacitance detection period 139 is used for the touch detection in the touch detection controller 40.

After the self-capacitance detection period 135 starts at the timing $t_1$, the self-capacitance of the touch detection electrode TDL is detected in a touch detection electrode TDL detection period 140 after the next display period 138a ends. The self-capacitance of the touch detection electrode TDL detected in the touch detection electrode TDL detection period 140 is used for the touch detection in the touch detection controller 40.

After the force detection period 137 starts at the timing $t_2$, the self-capacitance of the drive electrode COML is detected in a drive electrode COML detection period 141 after the next display period 138b ends. The drive electrode COML detection period 141 starts at timing $t_3$ and ends at timing $t_4$. The self-capacitance of the drive electrode COML detected in the drive electrode COML detection period 141 is used for the touch detection in the touch detection controller 40 and for the force detection in the force detection controller 50.

The touch detection controller 40 performs the touch detection on the basis of the mutual-capacitance between the drive electrode COML and the touch detection electrode TDL detected in a plurality of the capacitance detection periods 139, the self-capacitance of the touch detection electrode TDL detected in the touch detection electrode TDL detection period 140, and the self-capacitance of the drive electrode COML detected in the drive electrode COML detection period 141. The touch detection controller 40 can favorably reduce an influence of moisture beads and the like and can favorably detect a stylus pen or the like, by considering the self-capacitance of the touch detection electrode TDL and the self-capacitance of the drive electrode COML, in addition to the mutual-capacitance between the drive electrode COML and the touch detection electrode TDL.

The force detection controller 50 (see FIG. 1) causes the potential of the first intermediate electrode 71 and the potential of the second intermediate electrode 72 of the intermediate electrode ELC to be the reference potential in reference potential periods 144a and 144b in time with the drive electrode COML detection period 141. The reference potential periods 144a and 144b start at the timing $t_3$ and end at the timing $t_4$. The timing $t_3$ is the same as the start timing of the drive electrode COML detection period 141, and the timing $t_4$ is the same as the end timing of the drive electrode COML detection period 141.

After the drive electrode COML detection period 141 ends, the self-capacitance of the drive electrode COML and the self-capacitance of the second intermediate electrodes 72 are detected in a drive electrode COML detection period 142 after the next display period 138c ends. The drive electrode COML detection period 142 starts at timing $t_6$ and ends at timing $t_7$.

The force detection controller 50 outputs the guard signal having the same phase and the same amplitude as the drive signal Vcomts2 to the second intermediate electrodes 72 in a drive signal period 145b in time with the drive electrode COML detection period 142. The drive signal period 145b starts at the timing $t_6$ and ends at the timing $t_7$. The timing $t_6$ is the same as the start timing of the drive electrode COML detection period 142, and the timing $t_7$ is the same as the end timing of the drive electrode COML detection period 142.

The display apparatus 1A with a touch detection function can have a linear relationship between the force and the force signal value $C_{force}$ in the entire range. For example, the host HST can receive the force signal value $C_{force}$ having a linear relationship with the force in the entire range. Therefore, the display apparatus 1 with a touch detection function can favorably detect the force. That is, the display apparatus 1 with a touch detection function can improve the detection accuracy of the force.

Modifications of First Embodiment

In the first embodiment, the configuration of the intermediate electrode ELC is not limited to that in FIG. 29. There are various modifications of the intermediate electrode ELC.

Figure 34:
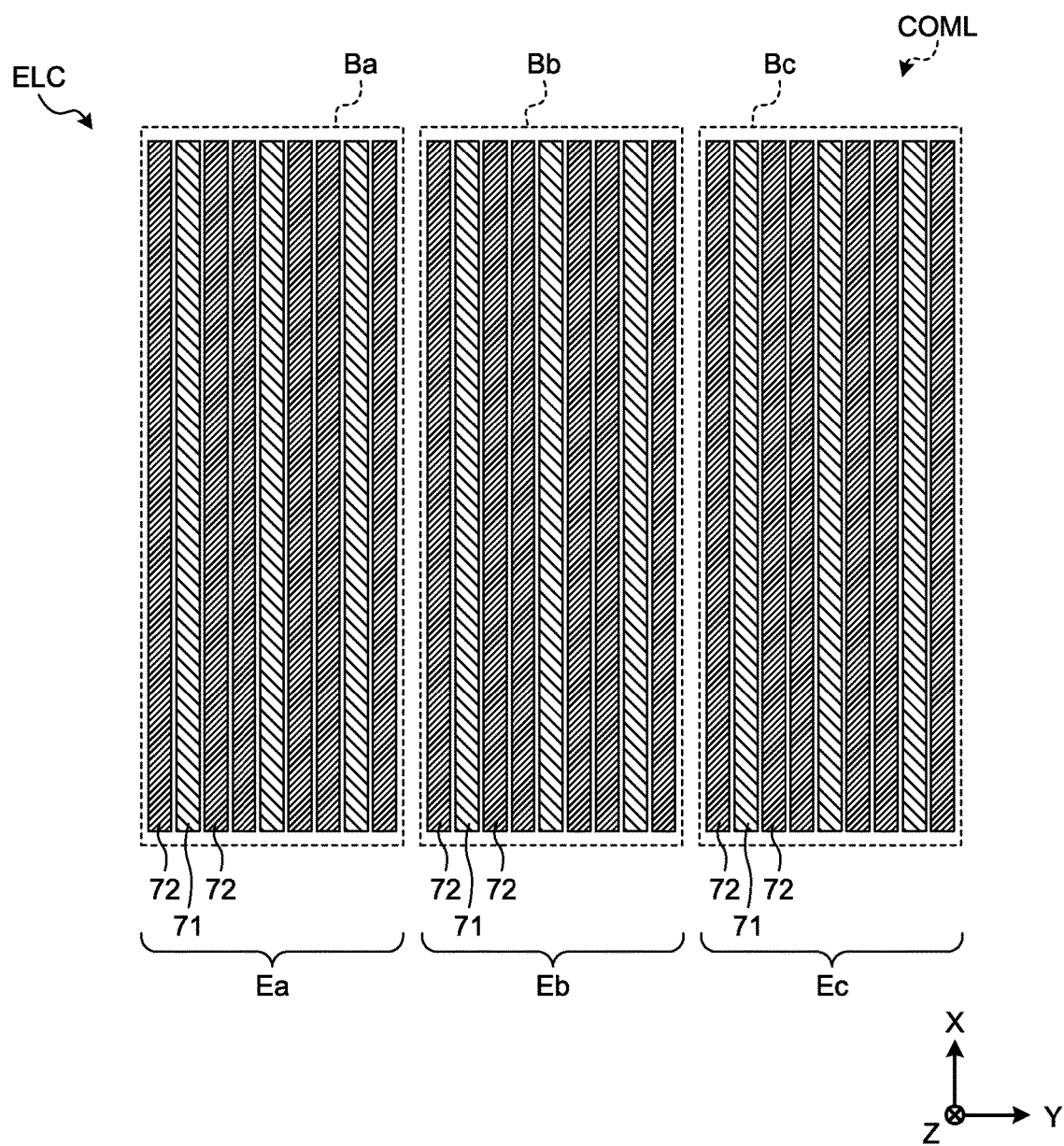
FIG. 34 is a plan view illustrating a first modification of the intermediate electrode.

FIG. 34 is a plan view illustrating a first modification of the intermediate electrode. As illustrated in FIG. 34, intermediate electrode blocks Ea, Eb, and Ec included in an intermediate electrode ELC may be finely divided in a Y direction, and may include a plurality of first intermediate electrodes 71 and a plurality of second intermediate electrodes 72. Alternatively, the first intermediate electrodes 71 may be arranged on both sides of the second intermediate electrode 72 in the Y direction. In FIG. 34, the width of the first intermediate electrode 71 in the Y direction is ⅓×W1, and the width of the second intermediate electrode 72 in the Y direction is ⅓×W2. Both the width of the first intermediate electrode 71 in the Y direction and the width of the second intermediate electrode 72 in the Y direction are ⅓ the example illustrated in FIG. 29.

As illustrated in FIG. 34, if the first intermediate electrode 71 and the second intermediate electrode 72 are finely divided in the Y direction, misregistration of the intermediate electrode ELC with respect to a drive electrode COML in the Y direction can be accommodated by redundancy. For example, in assembling a display apparatus 1A with a touch detection function, even if attachment of the intermediate electrode ELC to the drive electrode COML is shifted in the Y direction, the first intermediate electrode 71 and the second intermediate electrode 72 are alternately arranged at narrow intervals in the Y direction. Therefore, variation of an area ratio of an area S1 of the first intermediate electrode 71 and an area S2 of the second intermediate electrode 72 can be made small.

Figure 35:
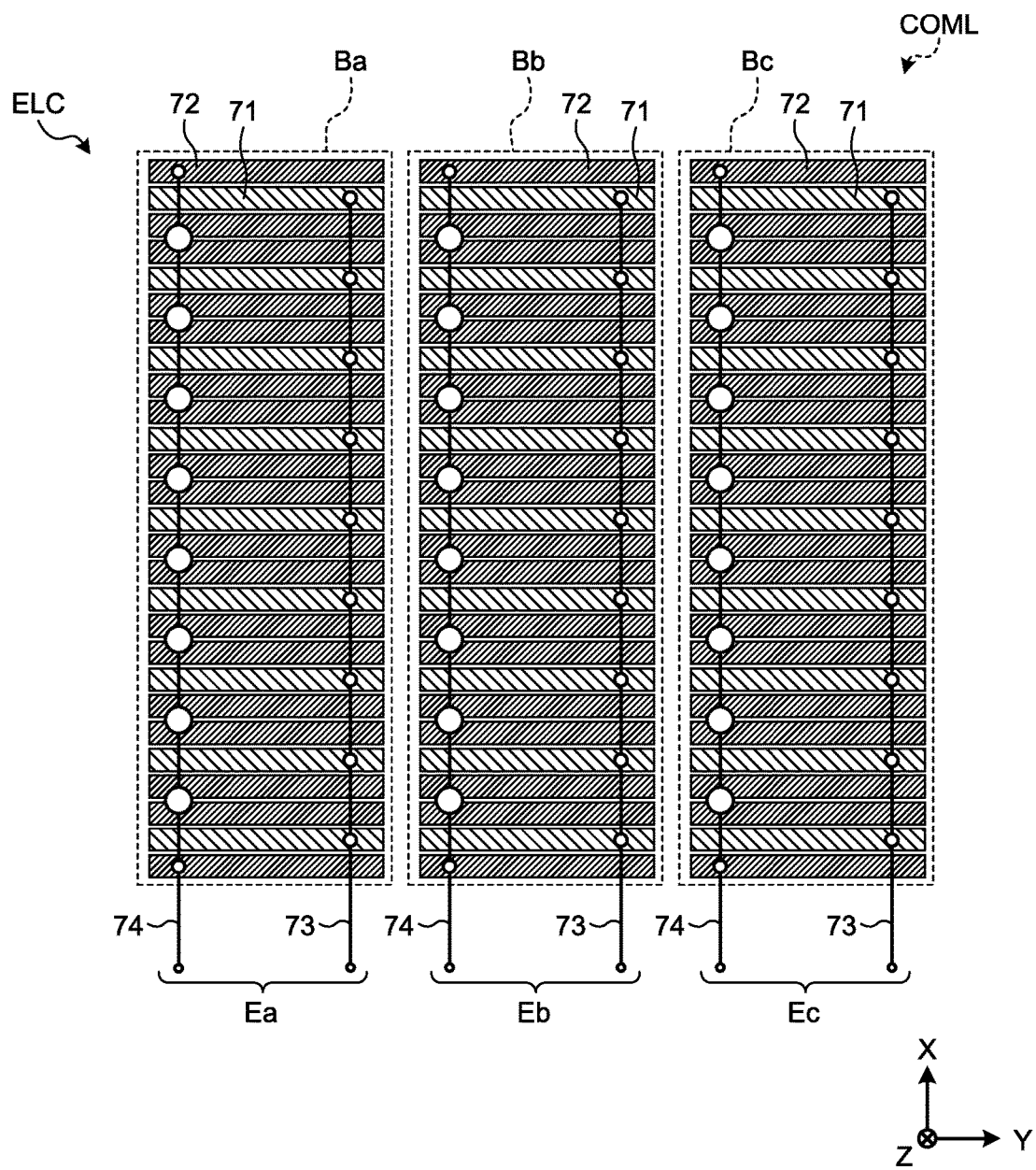
FIG. 35 is a plan view illustrating a second modification of the intermediate electrode.

FIG. 35 is a plan view illustrating a second modification of the intermediate electrode. As illustrated in FIG. 35, a direction into which first intermediate electrodes 71 and second intermediate electrodes 72 extend may be a Y direction, instead of an X direction. A direction into which the first intermediate electrodes 71 and the second intermediate electrodes 72 are arranged may be the X direction, instead of the Y direction. Wiring 73 extending in the X direction may be coupled with a plurality of the first intermediate electrodes 71. Wiring 74 extending in the X direction may be coupled with the second intermediate electrodes 72.

With this configuration, the potentials of the first intermediate electrodes 71 and the second intermediate electrodes 72 can be taken out along the X direction. Further, with this configuration, a voltage (potential) can be applied to the first intermediate electrodes 71 and the second intermediate electrodes 72 along the X direction so as to drive the first intermediate electrodes 71 and the second intermediate electrodes 72. Although not illustrated, an insulating film is provided between the first and second intermediate electrodes 71 and 72 and the wiring 73 and 74 in a Z direction. With the insulating film, the first intermediate electrode 71 and the wiring 74 are mutually insulated, and the second intermediate electrodes 72 and the wiring 73 are mutually insulated.

FIG. 35 illustrates a case in which a space is provided between every adjacent two of the intermediate electrode blocks Ea, Eb, and Ec in the Y direction. However, the first intermediate electrode 71 may not have the space between every adjacent two of the intermediate electrode blocks Ea, Eb, and Ec. That is, the first intermediate electrodes 71 may be continuous over the intermediate electrode blocks Ea, Eb, and Ec. The reason is that the first intermediate electrode 71 is supplied with a reference potential during a force detection period 137 (see FIG. 33), and thus no problem occurs even if the intermediate electrode blocks Ea, Eb, and Ec are used in force detection at different timings. When the first intermediate electrode 71 continues over the intermediate electrode blocks Ea, Eb, and Ec, the number of pieces of the wiring 73 coupled with the first intermediate electrode 71 can be reduced.

Figure 36:
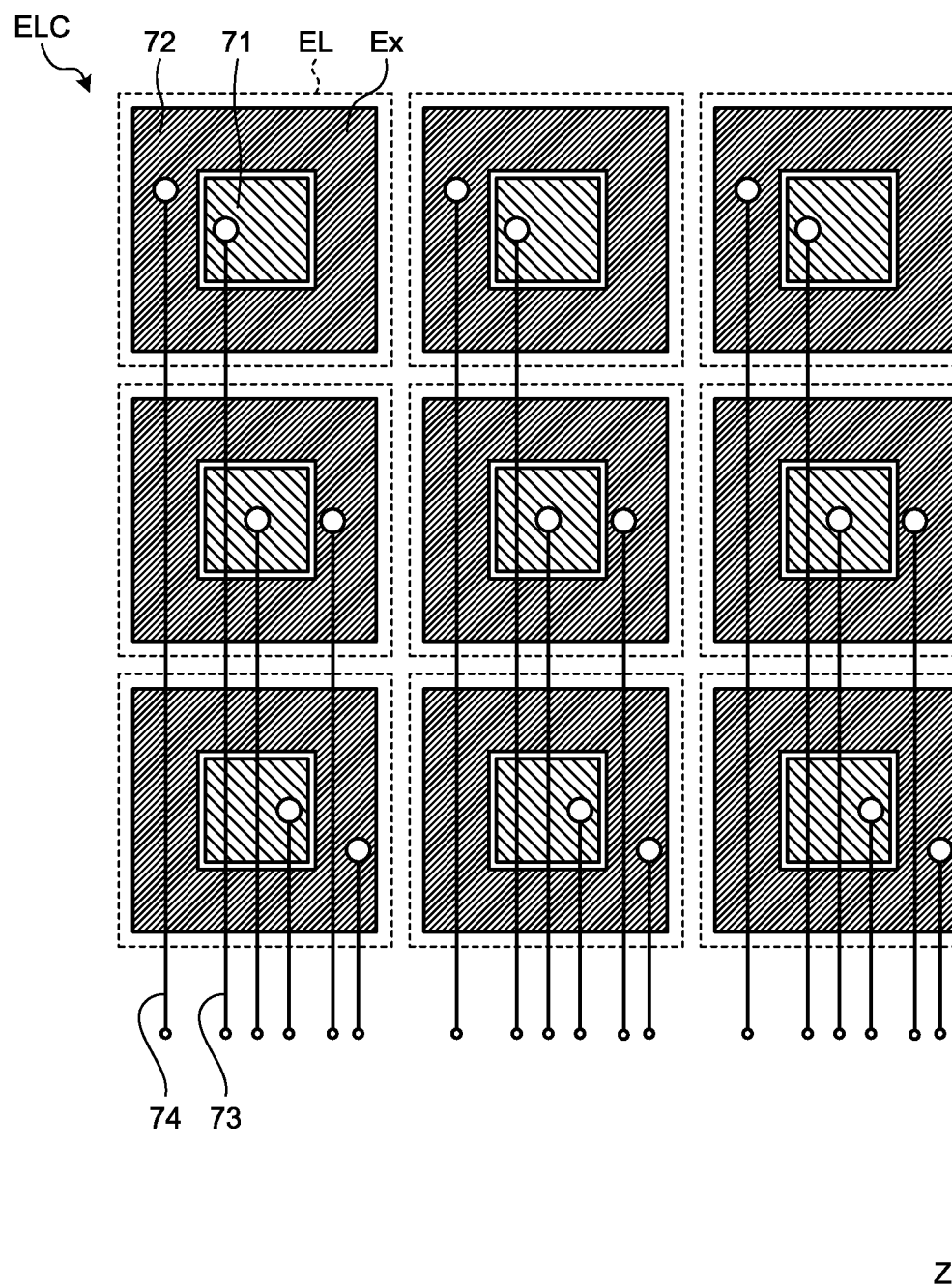
FIG. 36 is a plan view illustrating a third modification of the intermediate electrode.

FIG. 36 is a plan view illustrating a third modification of the intermediate electrode. As illustrated in FIG. 11, a display apparatus 1 with a touch detection function may use a plurality of electrodes EL provided in a matrix (row-column configuration), as electrodes that function as both the touch detection electrodes TDL and the drive electrode COML. In this case, an intermediate electrode ELC may include a plurality of electrodes Ex provided in a matrix (row-column configuration), as illustrated in FIG. 36.

Each of the electrodes Ex includes a first intermediate electrode 71 and a second intermediate electrode 72. The first intermediate electrode 71 is provided in a central portion of the electrode Ex and the second intermediate electrode 72 is provided outside the first intermediate electrode 71 in plan view. Outer peripheral shapes in plan view of the first intermediate electrode 71 and the second intermediate electrode 72 are rectangular. A space is provided between the first intermediate electrode 71 and the second intermediate electrode 72.

Wiring 73 and 74 extending in an X direction or in a Y direction may be coupled with each of the electrodes Ex. For example, as illustrated in FIG. 36, the wiring 73 is electrically coupled with the first intermediate electrode 71. The potential of the first intermediate electrode 71 is taken out along the X direction through the wiring 73. Further, with this configuration, a voltage (potential) can be applied to the first intermediate electrodes 71 along the X direction so as to drive the first intermediate electrodes 71. Similarly, the wiring 74 is electrically coupled with the second intermediate electrode 72. The potential of the second intermediate electrode 72 is taken out along the X direction through the wiring 74. Further, with this configuration, a voltage (potential) can be applied to the second intermediate electrodes 72 along the X direction so as to drive the second intermediate electrodes 72.

Figure 37:
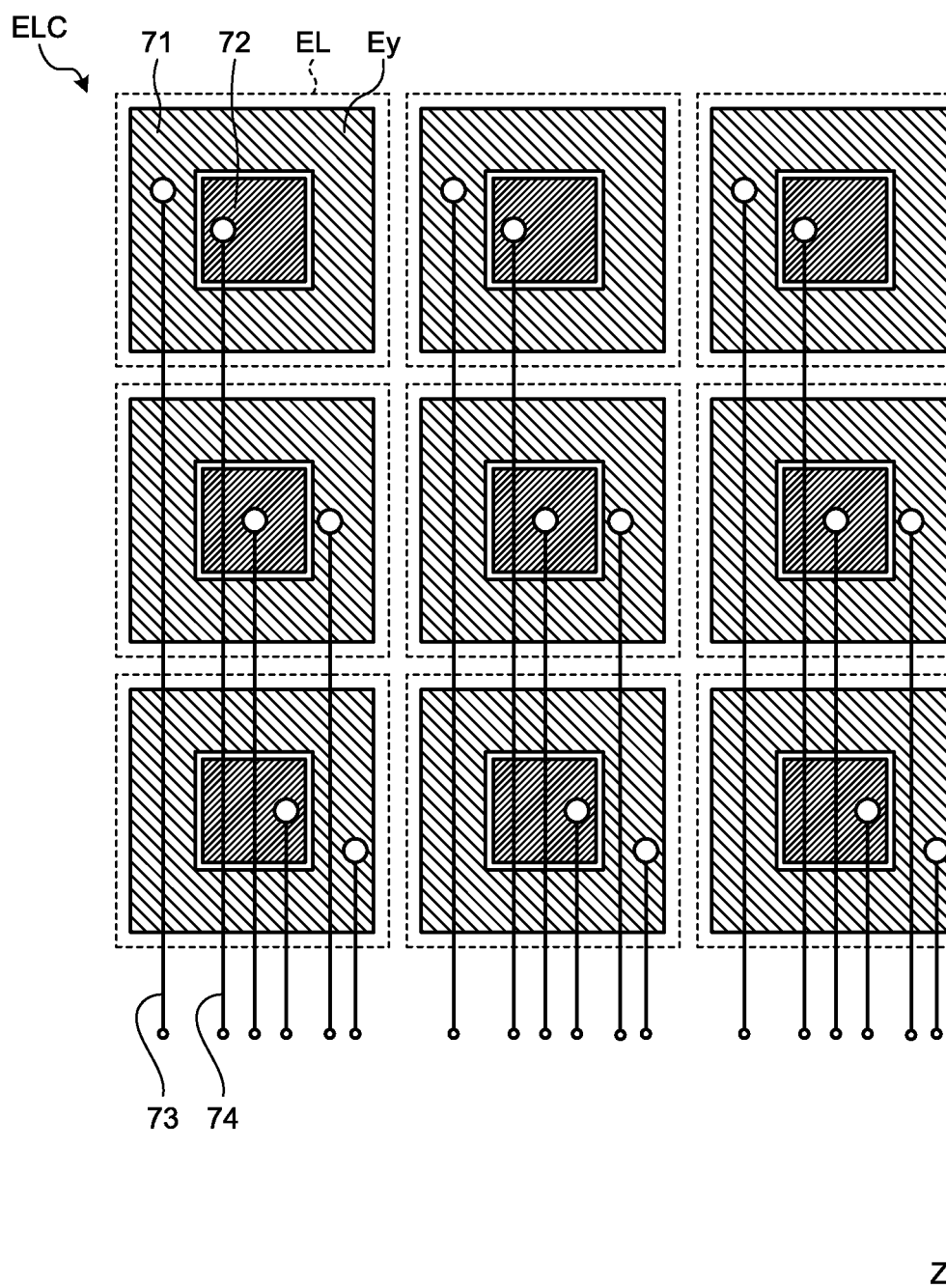
FIG. 37 is a plan view illustrating a fourth modification of the intermediate electrode.

FIG. 37 is a plan view illustrating a fourth modification of the intermediate electrode. As illustrated in FIG. 37, an intermediate electrode ELC may include a plurality of electrodes Ey provided in a matrix (row-column configuration). The electrode Ey includes a first intermediate electrode 71 and a second intermediate electrode 72, and arrangements of the first intermediate electrode 71 and the second intermediate electrode 72 are switched with the electrode Ex illustrated in FIG. 36. That is, the second intermediate electrode 72 is provided in a central portion of the electrode Ey, and the first intermediate electrode 71 is provided in an outer peripheral portion in the electrode Ey.

In both examples in FIGS. 36 and 37, if an area ratio of the first intermediate electrode 71 and the second intermediate electrode 72 is a specific area ratio $\alpha1$ as illustrated in FIG. 30, a change amount per unit force of capacitance $C_1$ and a change amount per unit force of capacitance $C_2$ become the same. Therefore, as illustrated in FIG. 31, a straight line that indicates a relationship between force and a force signal value becomes the straight line 123 in the entire range R3 that is a combination of the first range R1 and the second range R2.

Figure 38:
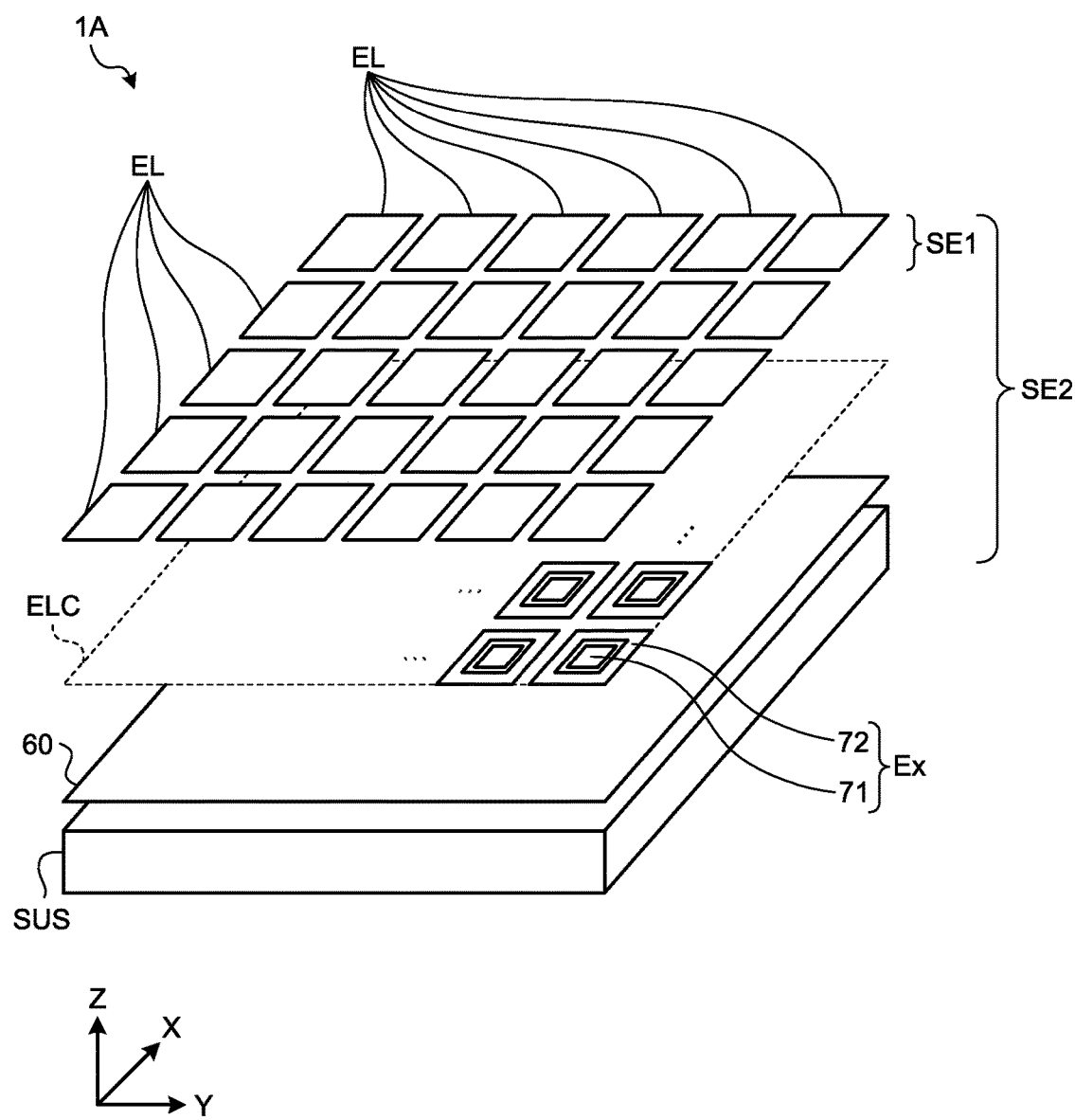
FIG. 38 is a perspective view illustrating a configuration of the display apparatus with a touch detection function according to a first modification of the first embodiment.

FIG. 38 is a perspective view illustrating a configuration of the display apparatus with a touch detection function according to a first modification of the first embodiment. As illustrated in FIG. 38, a plurality of electrodes EL make up the touch detector SE1 in FIG. 1. The electrodes EL, the intermediate electrode ELC, and a conductive film 60 make up the force detector SE2 in FIG. 1. The intermediate electrode ELC overlaps with the electrodes EL in plan view. The size of the intermediate electrode ELC is the same as a touch detection region made up of the electrodes EL or may be larger than the touch detection region.

In FIG. 38, the conductive film 60 overlaps the intermediate electrode ELC in plan view. The size of an electrode SUS may be the same as the size of the intermediate electrode ELC or may be larger than the size of the intermediate electrode ELC.

In the first embodiment, a transparent cushion layer may be arranged in place of the air layer AG.

Figure 39:
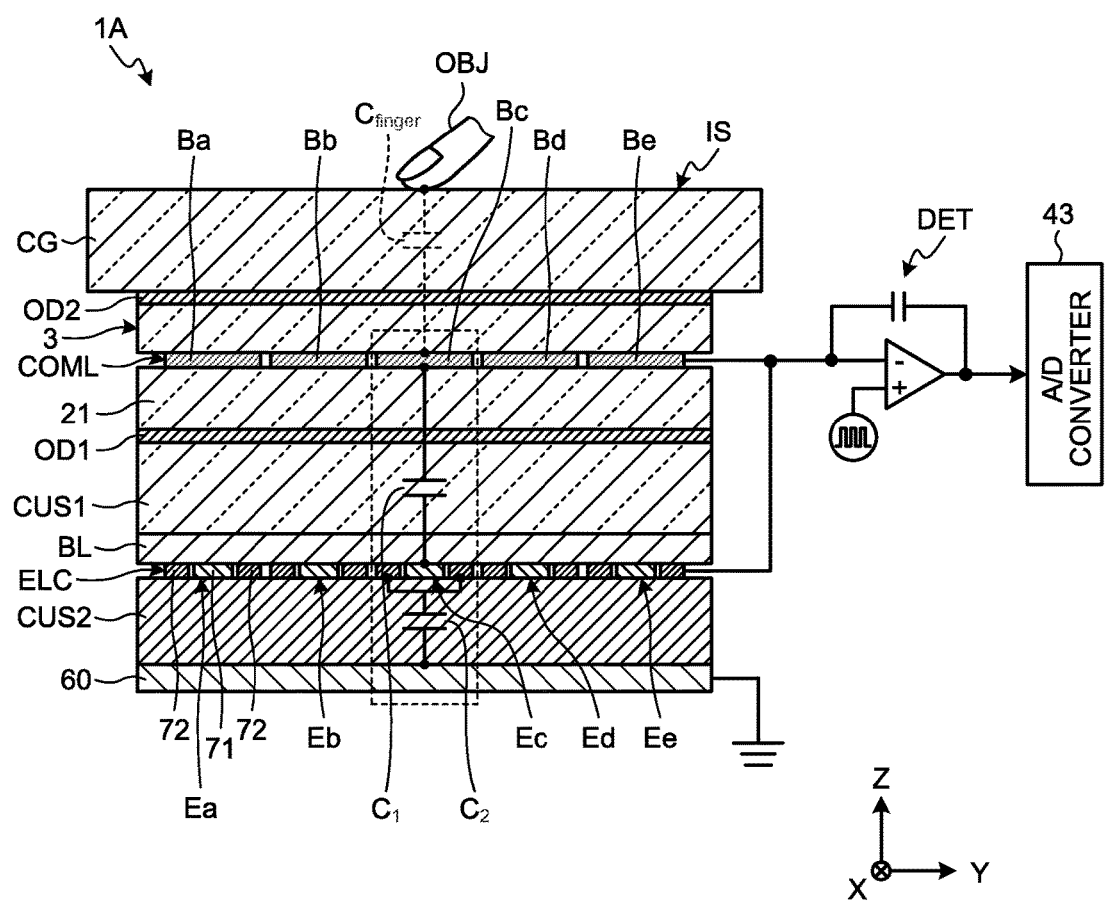
FIG. 39 is a sectional view illustrating a configuration of the display apparatus with a touch detection function according to a second modification of the first embodiment.

FIG. 39 is a sectional view illustrating a configuration of the display apparatus with a touch detection function according to a second modification of the first embodiment. As illustrated in FIG. 39, a first cushion layer CUS1 may be arranged between a first optical element OD1 and a backlight device BL. A second cushion layer CUS2 may be arranged between the intermediate electrode ELC and a conductive film 60. The second cushion layer CUS2 has the same configuration as the cushion layer CUS (see FIG. 27) described in the first embodiment. The first cushion layer CUS1 is colorless and transparent, or colored and transparent, and is fabricated from a material that can transmit light from the backlight device BL toward an input surface IS side. The first cushion layer CUS1 is a nonconductor. The first cushion layer CUS1 is fabricated from a material more easily deformed (having lower Young's modulus) than the second cushion layer CUS2, for example. Examples of the material of the first cushion layer CUS1 include polyurethane. In the example illustrated in FIG. 39, the first cushion layer CUS1 is an example of a "first dielectric layer" of the present invention, and the second cushion layer CUS2 is an example of a "second dielectric layer" of the present invention.

Even in the example illustrated in FIG. 39, if an area ratio S1/(S1+S2) of the first intermediate electrode 71 and the second intermediate electrode 72 is a specific area ratio $\alpha 1$ illustrated in FIG. 30, a change amount per unit force of capacitance $C_1$ and a change amount per unit force of capacitance $C_2$ become the same. With this configuration, as illustrated in FIG. 31, a straight line that indicates a relationship between force and a force signal value becomes a straight line 123 in an entire range R3 that is a combination of a first range R1 and a second range R2.

Although not illustrated, the air layer AG and the cushion layer CUS locations may be switched in the first embodiment. In this case, the cushion layer is an example of a "first dielectric layer" of the present invention, and the air layer AG is an example of a "second dielectric layer" of the present invention. Even in such a configuration, the air layer AG first becomes thin and the thickness thereof reaches zero, and then the cushion layer CUS becomes thin. Therefore, if the area ratio of the first and second intermediates electrode 71 and 72 is the specific area ratio $\alpha 1$ illustrated in FIG. 30, the change amount per unit force of capacitance $C_1$ and the change amount per unit force of capacitance $C_2$ become the same. With this configuration, as illustrated in FIG. 31, the straight line that indicates the relationship between force and a force signal value becomes the straight line 123 in the entire range R3 that is a combination of the first range R1 and the second range R2.

Configuration of Display Apparatus with Touch Detection Function According to Second Embodiment Next, a second embodiment will be described as an example of an embodiment of the present invention.

Figure 40:
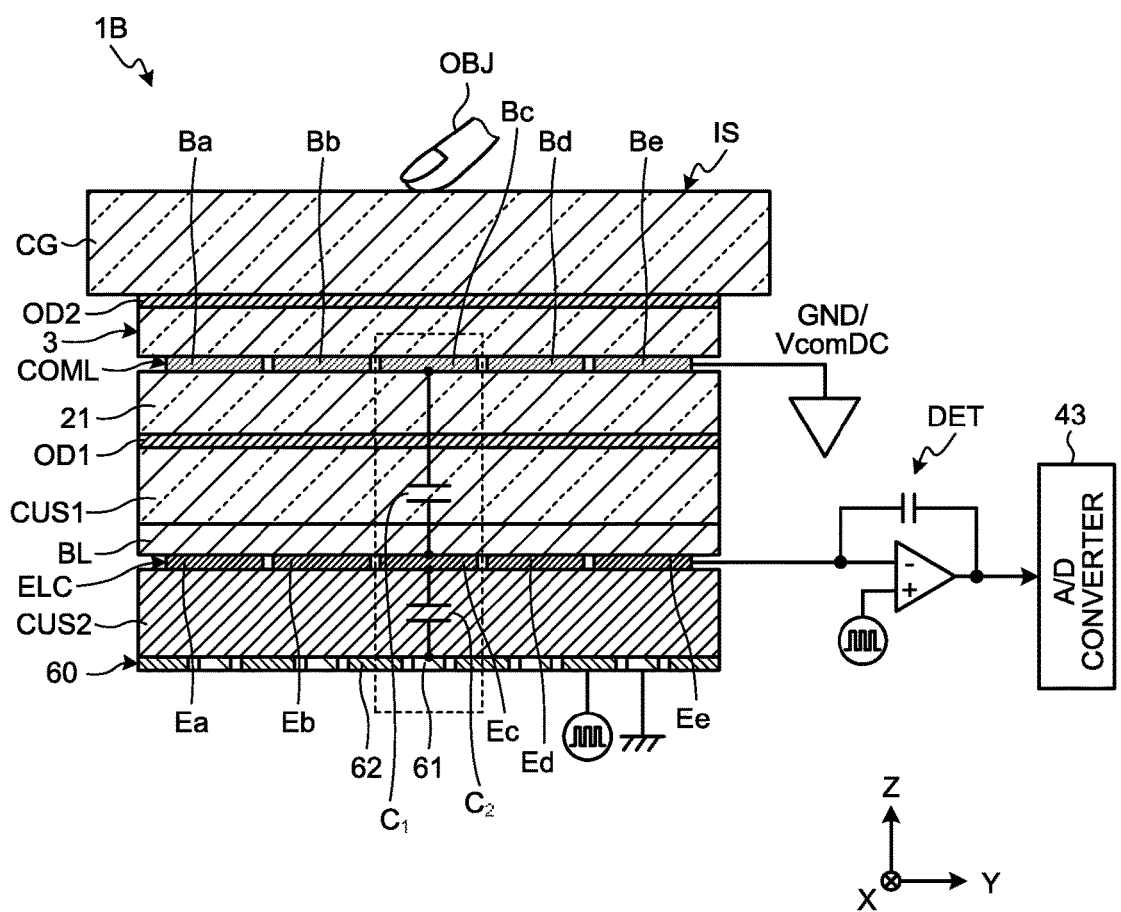
FIG. 40 is a sectional view illustrating a configuration of a display apparatus with a touch detection function according to a second embodiment.
Figure 41:
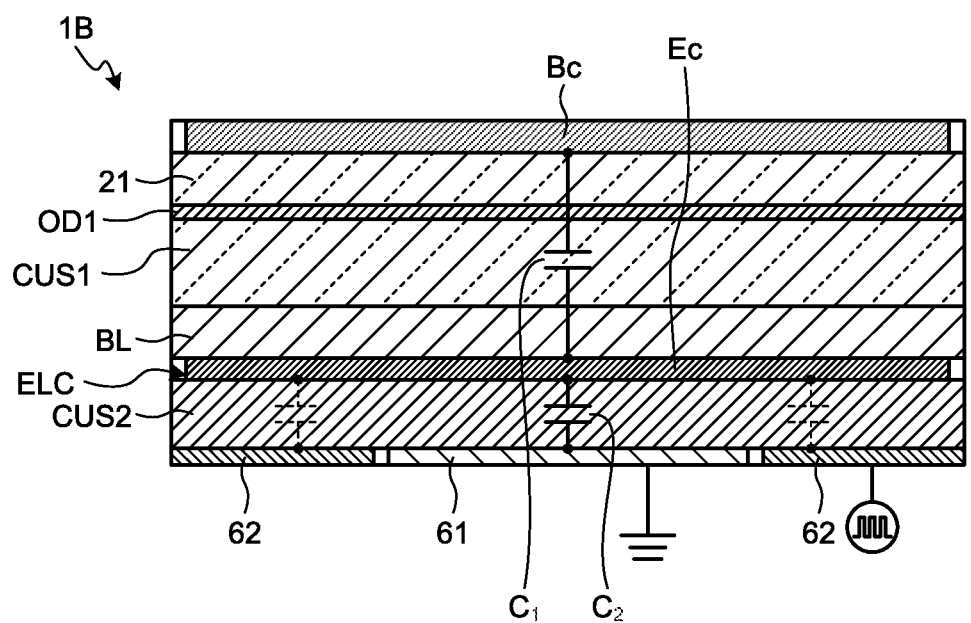
FIG. 41 is an enlarged sectional view of a portion surrounded by the broken line in FIG. 40.

FIG. 40 is a sectional view illustrating a configuration of a display apparatus with a touch detection function according to the second embodiment. FIG. 41 is an enlarged sectional view of a portion surrounded by the broken line in FIG. 40.

As illustrated in FIGS. 40 and 41, a display apparatus 1B with a touch detection function according to the second embodiment includes, in order from the side of an input surface IS, a cover member CG, a second optical element OD2, a counter substrate 3, a TFT substrate 21 including a drive electrode COML, a first optical element OD1, a first cushion layer CUS1, a backlight device BL, an intermediate electrode ELC, a second cushion layer CUS2, and a conductive film 60. Although not illustrated, a liquid crystal layer is arranged between the counter substrate 3 and the drive electrode COML.

The drive electrode COML includes a plurality of drive electrode blocks Ba, Bb, Bc, Bd, and Be. In the second embodiment, the drive electrode blocks Ba, Bb, Bc, Bd, and Be are supplied with a reference potential (for example, a ground potential). Alternatively, a display drive voltage VcomDC may be supplied from a drive electrode driver 14 to the drive electrode blocks Ba, Bb, Bc, Bd, and Be, instead of the reference potential (for example, the ground potential). The display drive voltage VcomDC is a DC constant voltage.

The intermediate electrode ELC is provided between the drive electrode COML and the conductive film 60. The intermediate electrode ELC faces the drive electrode COML across the first cushion layer CUS1 deformable by force applied from the input surface IS side. The intermediate electrode ELC faces the conductive film 60 across the second cushion layer CUS2 deformable by the force applied from the input surface IS side.

The intermediate electrode ELC includes a plurality of intermediate electrode blocks Ea, Eb, Ec, Ed, and Ee corresponding to the drive electrode blocks Ba, Bb, Bc, Bd, and Be included in the drive electrode COML. Note that, in the second embodiment, none of the intermediate electrode blocks Ea, Eb, Ec, Ed, and Ee is divided into a first intermediate electrode and second intermediate electrodes, unlike the first embodiment. Each of the intermediate electrode blocks Ea, Eb, Ec, Ed, and Ee is a single electrode.

In the second embodiment, a drive signal Vcomts2 as a force detection drive signal is supplied to the intermediate electrode ELC, instead of to the drive electrode COML. For example, the intermediate electrode blocks Ea, Eb, Ec, Ed, and Ee of the intermediate electrode ELC are coupled with the drive electrode driver 14, and are supplied with the drive signal Vcomts2 from the drive electrode driver 14. The intermediate electrode blocks Ea, Eb, Ec, Ed, and Ee are coupled with a voltage detector DET.

Configurations of the first cushion layer CUS1 and the second cushion layer CUS2 are the same as those of the second modification of the first embodiment (see FIG. 39). For example, the first cushion layer CUS1 is colorless and transparent, or colored and transparent, and is fabricated from a material that can transmit light from the backlight device BL toward the input surface IS side. The first cushion layer CUS1 and the second cushion layer CUS2 are nonconductors. The first cushion layer CUS1 is fabricated from a material more easily deformed (having lower Young's modulus) than the second cushion layer CUS2.

The conductive film 60 is provided on a surface of the second cushion layer CUS2, the surface being on an opposite side of a surface facing the drive electrode COML. In the second embodiment, the conductive film 60 includes a first conductive film pattern 61 and a second conductive film pattern 62.

In the display apparatus 1B with a touch detection function, the drive electrode driver 14 sequentially selects one or more of intermediate electrode blocks Ea, Eb, Ec, Ed, and Ee along a scanning direction (for example, a Y direction) when a force detector SE2 (see FIG. 1) performs a force detection operation. Then, the drive electrode driver 14 inputs the drive signal Vcomts2 as the force detection drive signal to the selected one or more of the intermediate electrode blocks Ea, Eb, Ec, Ed, and Ee.

The drive electrode driver 14 supplies a guard signal in synchronization with the force detection drive signal to the second conductive film pattern 62 corresponding to the selected one or more of the intermediate electrode blocks Ea, Eb, Ec, Ed, and Ee.

The drive electrode driver 14 drives the drive electrode blocks Ba, Bb, Bc, Bd, and Be corresponding to the selected one or more of the intermediate electrode blocks Ea, Eb, Ec, Ed, and Ee, to a reference potential (for example, a ground potential). Alternatively, the drive electrode driver 14 supplies the display drive voltage VcomDC to the drive electrode blocks Ba, Bb, Bc, Bd, and Be corresponding to the selected one or more of the intermediate electrode blocks Ea, Eb, Ec, Ed, and Ee. The first conductive film pattern 61 is supplied with the reference potential (for example, the ground potential).

For example, as illustrated in FIG. 41, the drive electrode driver 14 supplies the drive signal Vcomts2 to the intermediate electrode block Ec, and supplies the guard signal in synchronization with the drive signal Vcomts2 to the second conductive film pattern 62 overlapping with the intermediate electrode block Ec when viewed from the Z direction. The drive electrode driver 14 drives the drive electrode block Bc overlapping with the intermediate electrode block Ec when viewed from the Z direction, to the reference potential (for example, the ground potential). With this configuration, a potential difference is generated between the intermediate electrode block Ec and the drive electrode block Bc, and capacitance $C_1$ is generated. The potential difference is generated between the intermediate electrode block Ec and the first conductive film pattern 61 overlapping with the intermediate electrode block Ec when viewed from the Z direction, and capacitance $C_2$ is generated.

Meanwhile, capacitance as illustrated by the broken lines in FIG. 41 is not generated between the intermediate electrode block Ec and the second conductive film pattern 62 overlapping with the intermediate electrode block Ec when viewed from the Z direction. The reason is that the guard signal is supplied to the second conductive film pattern 62, and thus the intermediate electrode block Ec and the second conductive film pattern 62 have the same potential.

In this way, in the second embodiment, the intermediate electrode ELC coupled with the voltage detector DET functions as a force detection sensor. In the second embodiment, the intermediate electrode ELC outputs a detection signal Vdet3 through the voltage detector DET.

Figure 42:
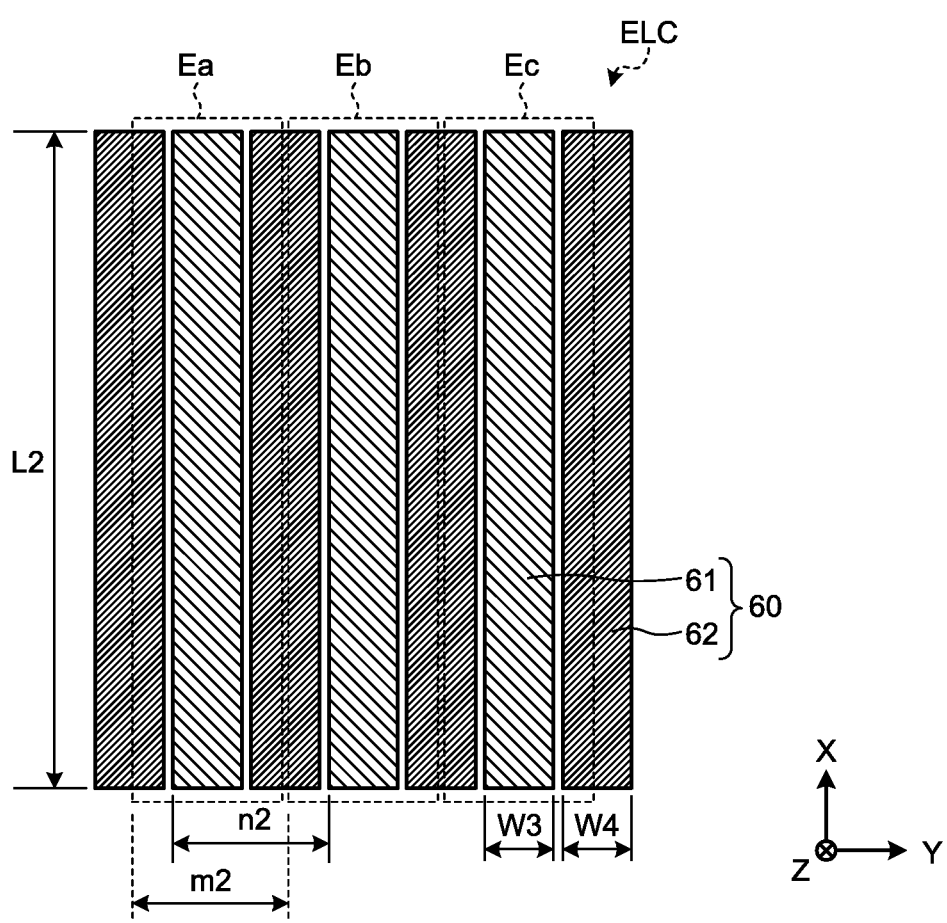
FIG. 42 is a plan view illustrating a configuration example of a conductive film according to the second embodiment.

FIG. 42 is a plan view illustrating a configuration example of a conductive film according to the second embodiment. FIG. 42 illustrates the intermediate electrode blocks Ea, Eb, and Ec of the intermediate electrode ELC by broken lines to illustrate the positional relationship between the conductive film 60 and the intermediate electrode ELC when viewed from the Z direction. As illustrated in FIG. 42, the first conductive film pattern 61 has a strip shape in plan view and extends in the X direction. The second conductive film pattern 62 also has a strip shape in plan view and extends in the X direction. In the Y direction, the first conductive film pattern 61 and the second conductive film pattern 62 are alternately arranged, and a space is provided between the first conductive film pattern 61 and the second conductive film pattern 62.

An arrangement interval n2 of the first conductive film patterns 61 in the Y direction is the same as an arrangement interval m2 of the intermediate electrode blocks Ea, Eb, and Ec. Three first conductive film patterns 61 are arranged so as to overlap with respective intermediate electrode blocks Ea, Eb, and Ec when viewed from the Z direction.

The example of FIG. 42 illustrates a case in which the length of the first conductive film pattern 61 in the X direction and the length of the second conductive film pattern 62 in the X direction are the same.

In FIG. 42, one first conductive film pattern 61 overlaps with one intermediate electrode block when viewed from the Z direction, and an area S3 of the first conductive film pattern 61 is calculated by S3=W3×L2. L2 is the length of the first conductive film pattern 61 in the X direction, and is also the length of the second conductive film pattern 62 in the X direction. W3 is the width of the first conductive film pattern 61 in the Y direction. One second conductive film pattern 62 overlaps with one intermediate electrode block when viewed from the Z direction (=½×2), and an area S4 of the second conductive film pattern 62 is calculated by S4=W4×L2. W4 is the width of the second conductive film pattern 62 in the Y direction. A ratio of the areas S3 and S4 can be expressed by a ratio of the widths W3 and W4 by dividing the areas S3 and S4 by the length L2. In the example illustrated in FIG. 42, an arrangement interval n2 of the first conductive film patterns 61 is the same as an arrangement interval m2 of the intermediate electrode blocks Ea, Eb, and Ec.

Detection Example of Capacitance Change in Second Embodiment

Next, a detection example of capacitance change per unit force in the second embodiment will be described.

Figure 43:
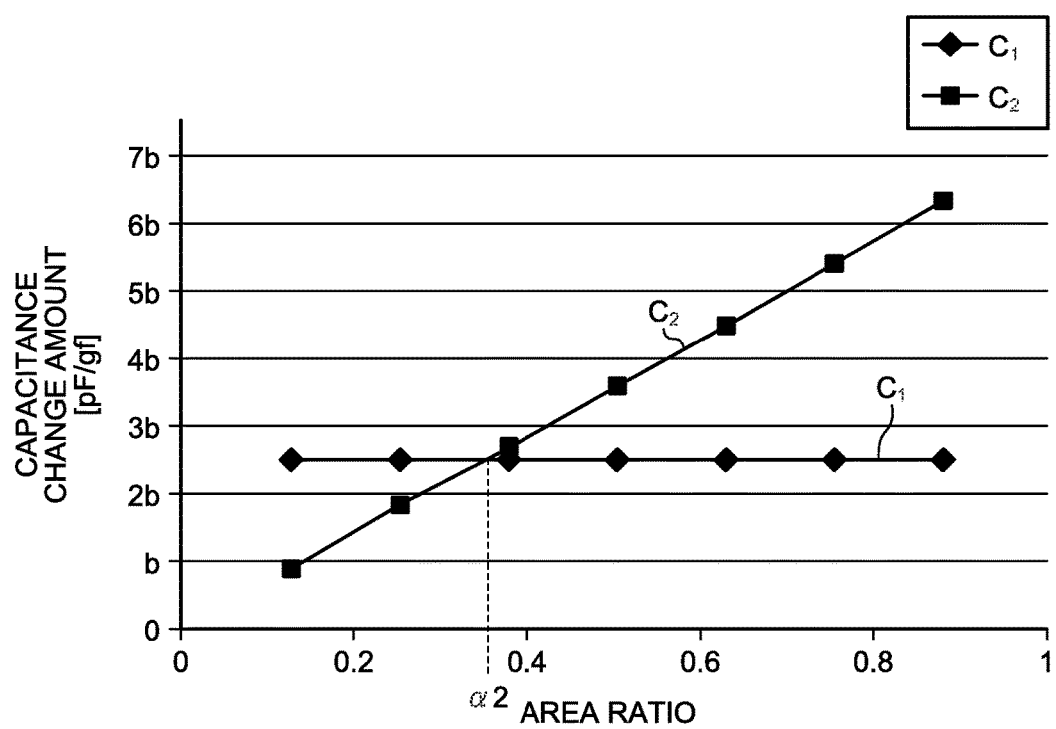
FIG. 43 is a graph illustrating a relationship between area ratios of first and second conductive film patterns and capacitance change amount per unit force according to the second embodiment.

FIG. 43 is a graph illustrating a relationship between area ratios of first and second conductive film patterns and capacitance change amount per unit force according to the second embodiment. The horizontal axis in FIG. 43 represents an area ratio S3/(S3+S4) of the first conductive film pattern 61 and the second conductive film pattern 62. An area S3 is an area, as viewed from the Z direction, of the first conductive film pattern 61 overlapping with one intermediate electrode block (for example, the intermediate electrode block Ec) when viewed from the Z direction. An area S4 is an area, as viewed from the Z direction, of the second conductive film pattern 62 overlapping with one intermediate electrode block when viewed from the Z direction. The vertical axis in FIG. 43 represents capacitance change amount per unit force [pF/gf], the force being applied from the input surface IS side, where "b" in the vertical axis is a constant.

A straight line $C_1$ in FIG. 43 indicates the change amount per unit force of the capacitance $C_1$. A straight line $C_2$ in FIG. 43 indicates the change amount per unit force of the capacitance $C_2$. In the second embodiment, the inclination of the straight line $C_1$ is substantially 0. The reason is that electrode plates of the capacitance $C_1$ are the drive electrode COML and the intermediate electrode ELC, and the influence of the area ratio of the conductive film 60, which is not the electrode plate, on the capacitance value of the capacitance $C_1$ is substantially 0.

In the second embodiment, a designer or the like obtains, in advance, an area ratio α2 when the change amount per unit force of the capacitance $C_1$ and the change amount per unit force of the capacitance $C_2$ are the same, similarly to the first embodiment. A method of obtaining the area ratio $\alpha 2$ is similar to that of the first embodiment, and examples of the method include a method using Expression (1) and a method of performing simulation, where $\alpha 2$ is larger than 0 and smaller than 1. In the display apparatus 1B with a touch detection function according to the second embodiment, if the area ratio S3/(S3+S4) of the first conductive film pattern 61 and the second conductive film pattern 62 is the specific area ratio $\alpha 2$ illustrated in FIG. 43, the change amount per unit force of the capacitance $C_1$ and the change amount per unit force of the capacitance $C_2$ become the same.

From this, in the second embodiment, the inclination of a line of a first range R1 and the inclination of a line of a second range R2 that indicate a relationship between force and a force signal value have become the same to form a straight line (see FIG. 31), similarly to the first embodiment. The first range R1 is a range of force in which only the first cushion layer CUS1 becomes thin and the second cushion layer CUS2 is not deformed, and the second range R2 is a range of force in which the thickness of the first cushion layer CUS1 reaches zero and the second cushion layer CUS2 is elastically deformed according to force. The straight line that indicates the relationship between the force and the force signal value becomes a straight line 123 in an entire range R3 that is a combination of the first range R1 and the second range R2, and the inclination change at an inflection point P1 between the lines of the first range R1 and the second range R2 becomes small. In the display apparatus 1B with a touch detection function, a calculation amount of inclination correction of the straight line is reduced because the inclination change at the inflection point P1 becomes small in the straight line that indicates the relationship between the force and the force signal value.

A material used for the first cushion layer CUS1 and a material used for the second cushion layer CUS2 have different values of Young's modulus and permittivity, and have different degrees of capacitance change even if the same force is applied. A larger degree of capacitance change has larger variation in detection of a capacitance value. Therefore, when the two materials are transparent, it is favorable that a material having smaller capacitance change is used for the first cushion layer CUS1, and a material having larger capacitance change is used for the second cushion layer CUS2. The reason is that the electrode area generating the capacitance $C_2$ is smaller than the electrode area generating the capacitance $C_1$. Typically, the capacitance is smaller and the degree of capacitance change is smaller as the electrode area is smaller. Therefore, by use of the material having larger capacitance change for the second cushion layer CUS2, the variation in detection of a capacitance value can be reduced.

Modifications of Second Embodiment

Figure 44:
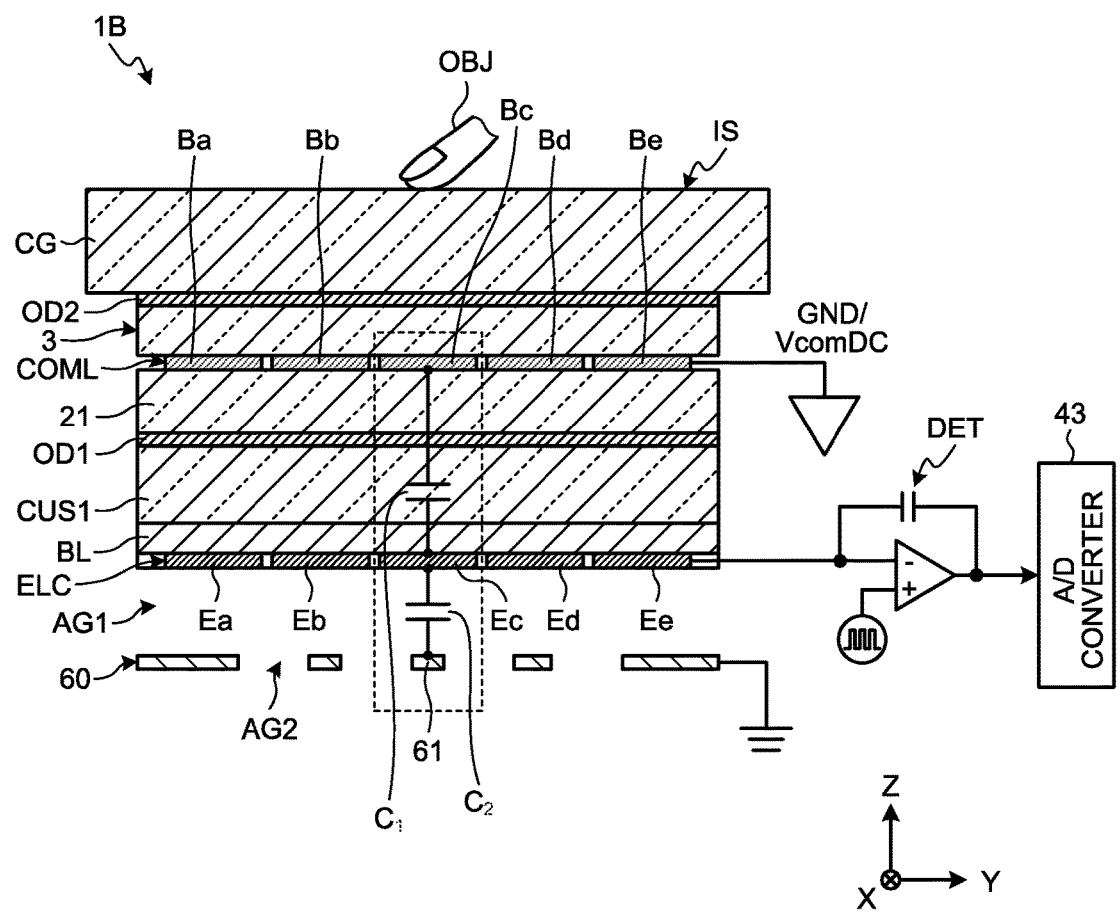
FIG. 44 is a sectional view illustrating a first modification of the second embodiment.
Figure 45:
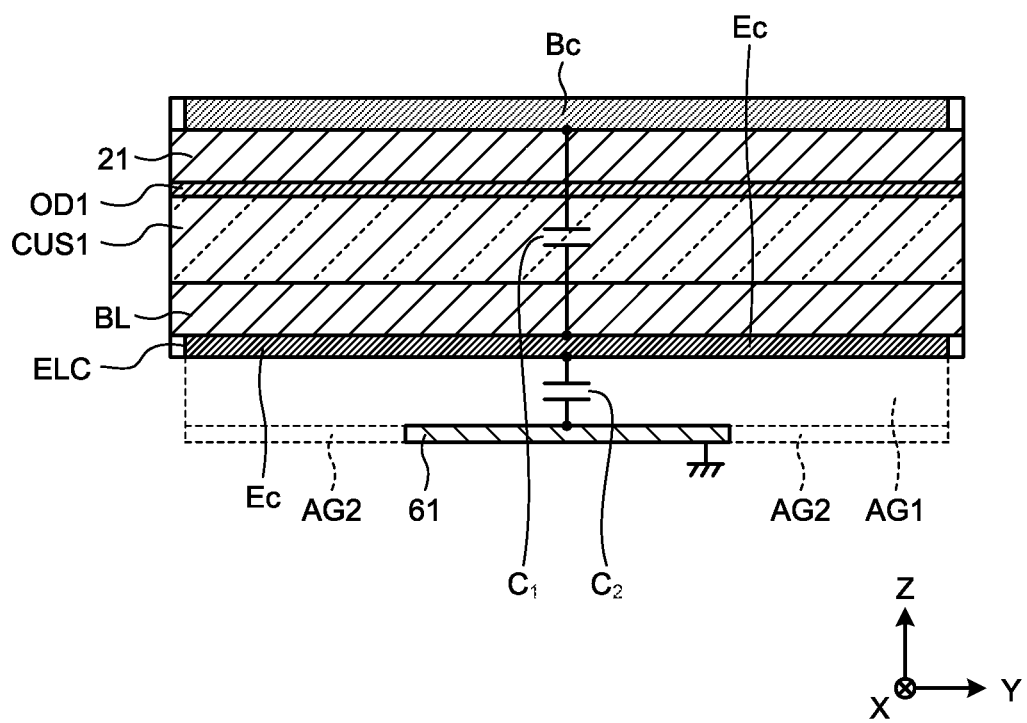
FIG. 45 is an enlarged sectional view of a portion surrounded by the broken line in FIG. 44.

FIG. 44 is a sectional view illustrating a first modification of the second embodiment. FIG. 45 is an enlarged sectional view of a portion surrounded by the broken line in FIG. 44.

In the display apparatus 1B with a touch detection function according to the second embodiment, one of the first cushion layer CUS1 and the second cushion layer CUS2 (see FIG. 40) may be replaced with an air layer AG1. FIGS. 44 and 45 illustrate a case in which the second cushion layer CUS2 is replaced with the air layer AG1. The second conductive film pattern 62 (see FIG. 40) of the conductive film 60 may be replaced with an air layer AG2.

For example, as illustrated in FIG. 45, an area, as viewed from a Z direction, of the air layer AG2 overlapping with an intermediate electrode block Ec when viewed from the Z direction, is S'4. In the example illustrated in FIGS. 44 and 45, if an area ratio S3/(S3+S'4) of the second conductive film pattern 62 and the air layer AG2 is a specific area ratio a2 illustrated in FIG. 43, a change amount per unit force of capacitance $C_1$ and a change amount per unit force of capacitance $C_2$ become the same. With this configuration, as illustrated in FIG. 31, a straight line that indicates a relationship between force and a force signal value becomes a straight line 123 in an entire range R3 that is a combination of a first range R1 and a second range R2.

Figure 46:
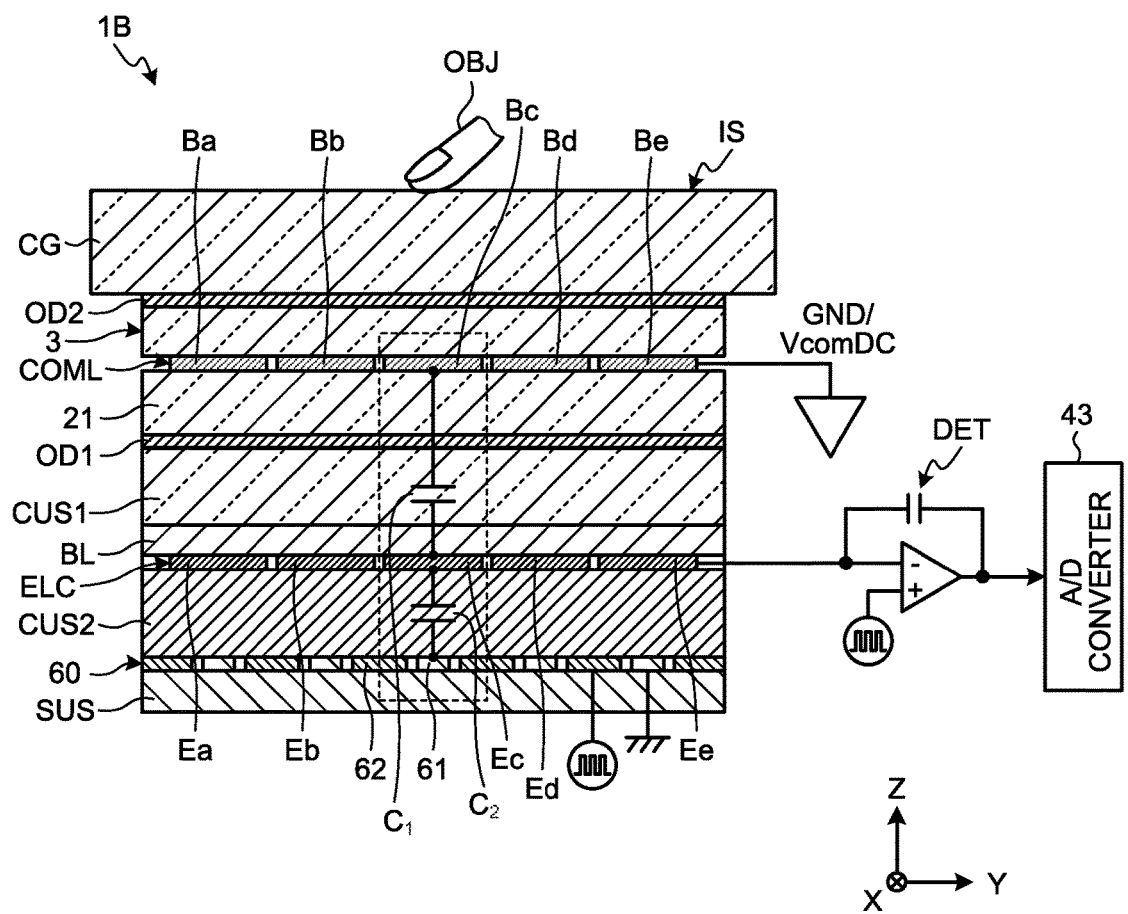
FIG. 46 is a sectional view illustrating a second modification of the second embodiment.
Figure 47:
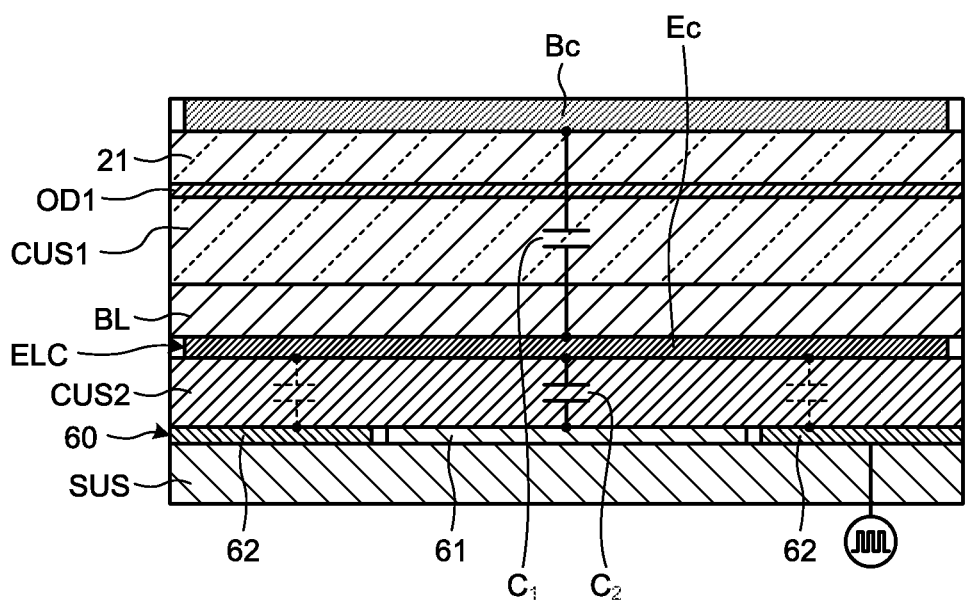
FIG. 47 is an enlarged sectional view of a portion surrounded by the broken line in FIG. 46.

FIG. 46 is a sectional view illustrating a second modification of the second embodiment. FIG. 47 is an enlarged sectional view of a portion surrounded by the broken line in FIG. 46. As illustrated in FIGS. 46 and 47, the display apparatus 1B with a touch detection function according to the second embodiment may include an electrode SUS. A conductive film 60 may be arranged on a surface of the electrode SUS through an insulating film (not illustrated). In assembling the display apparatus 1B with a touch detection function, the surface of the electrode SUS, on which the conductive film 60 is arranged, may just be bonded to a surface of the second cushion layer CUS2.

In the example illustrated in FIGS. 46 and 47, if an area ratio S3/(S3+S4) of a first conductive film pattern 61 and a second conductive film pattern 62 is a specific area ratio a2 illustrated in FIG. 43, a change amount per unit force of capacitance $C_1$ and a change amount per unit force of capacitance $C_2$ become the same. With this configuration, as illustrated in FIG. 31, a straight line that indicates a relationship between force and a force signal value becomes a straight line 123 in an entire range R3 that is a combination of a first range R1 and a second range R2.

The electrode SUS is made of metal, and is harder than the second cushion layer CUS2 and has an excellent heat-resisting property. Therefore, in the example illustrated in FIGS. 46 and 47, the conductive film 60 is arranged on the surface of electrode SUS more easily than a case where the conductive film 60 is arranged on the surface of the second cushion layer CUS2.

Figure 48:
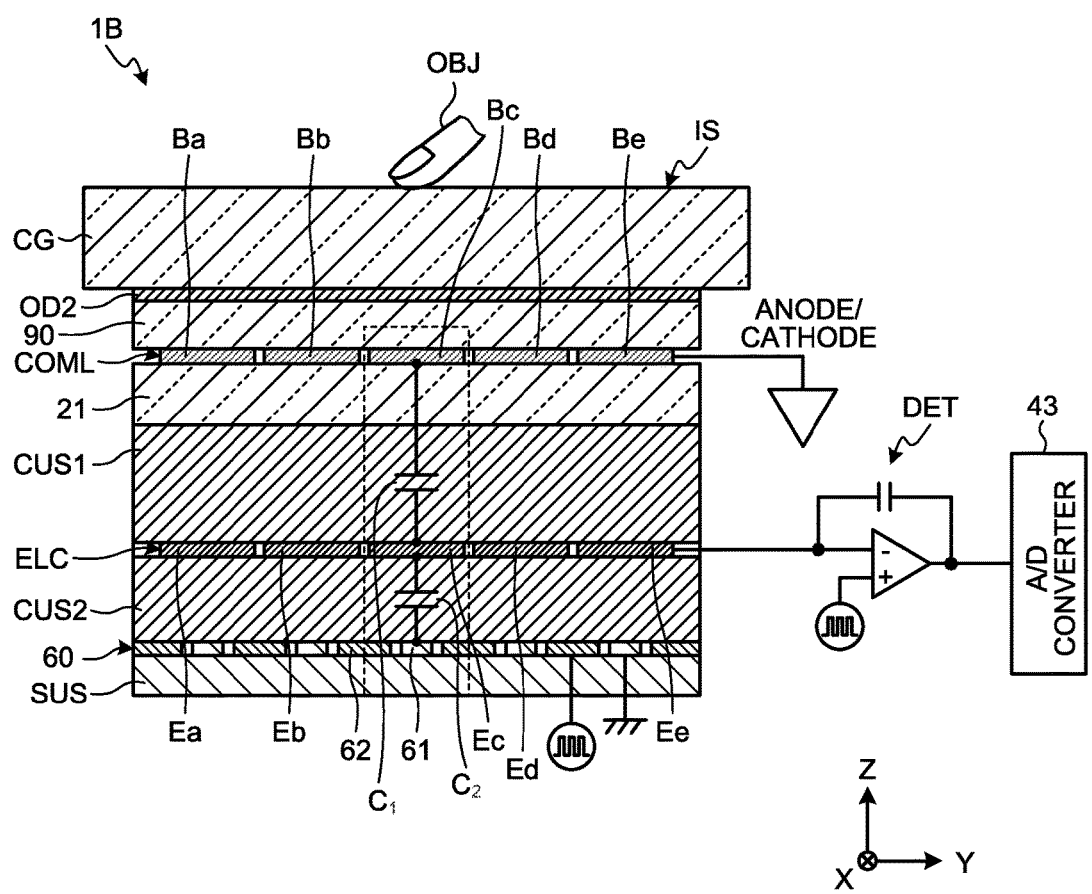
FIG. 48 is a sectional view illustrating a third modification of the second embodiment.

FIG. 48 is a sectional view illustrating a third modification of the second embodiment. FIG. 49 is an enlarged sectional view of a portion surrounded by the broken line in FIG. 48. The display apparatus 1B with a touch detection function according to the second embodiment may include an organic electro-luminescence display device 90 as a display device DP (see FIG. 1). A drive electrode COML is coupled with one of an anode and a cathode of the organic electro-luminescence element. For example, the drive electrode COML may be one of an anode electrode and a cathode electrode of the organic electro-luminescence element. When a force detector SE2 of the display apparatus 1B with a touch detection function detects force, the drive electrode COML is maintained to have a DC constant voltage.

In the example illustrated in FIGS. 48 and 49, if an area ratio S3/(S3+S4) of a first conductive film pattern 61 and a second conductive film pattern 62 is a specific area ratio a2 illustrated in FIG. 43, a change amount per unit force of capacitance $C_1$ and a change amount per unit force of capacitance $C_2$ become the same. With this configuration, as illustrated in FIG. 31, a straight line that indicates a relationship between force and a force signal value becomes a straight line 123 in an entire range R3 that is a combination of a first range R1 and a second range R2.

The organic electro-luminescence display device 90 is a self-light emitting display device in which the organic electro-luminescence element itself emits light. Therefore, the display apparatus 1B with a touch detection function illustrated in FIGS. 48 and 49 does not need a backlight device BL. Meanwhile, the display apparatus 1B with a touch detection function may include a frontlight device that irradiates the organic electro-luminescence display device 90 with light from the side of a cover member CG.

In the example illustrated in FIGS. 48 and 49, the organic electro-luminescence display device 90 is an example of an "organic electro-luminescence display device" of the present invention. The display apparatus 1B with a touch detection function is an example of an "organic electro-luminescence display apparatus" of the present invention.

Figure 50:
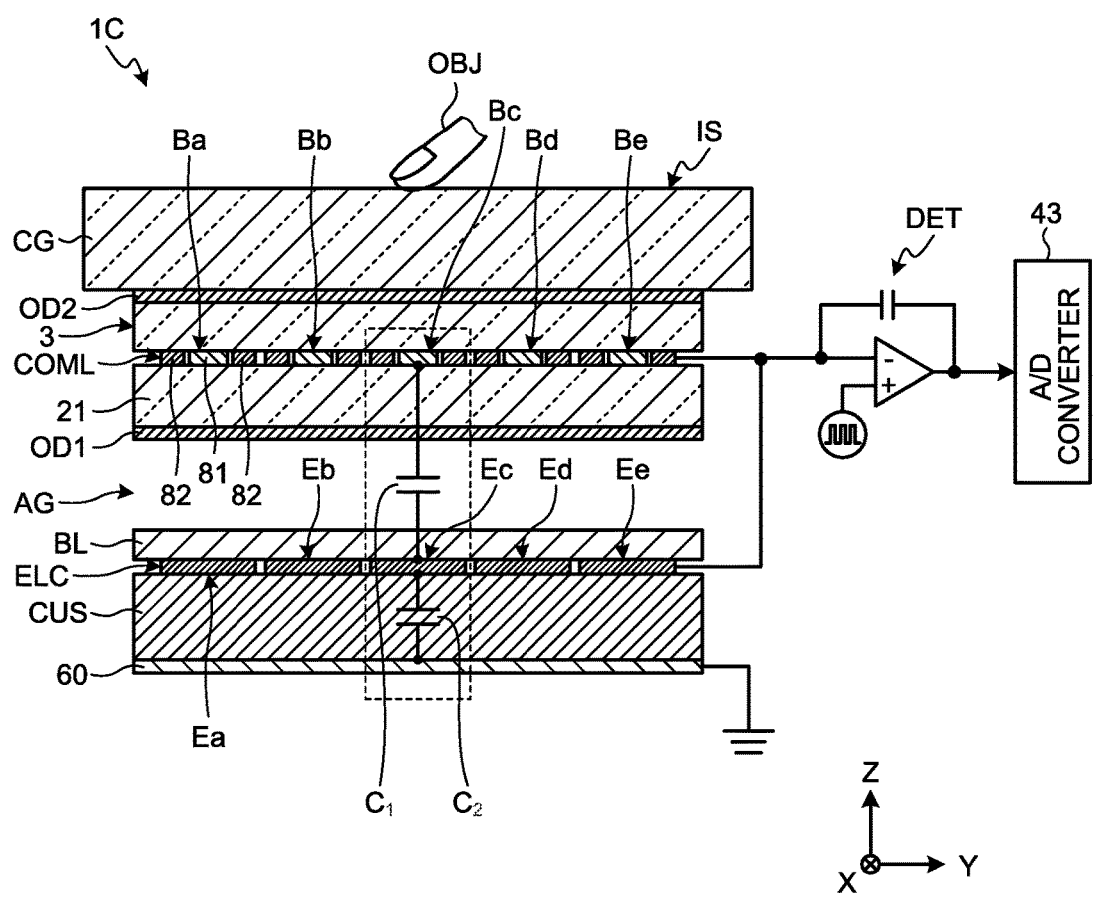
FIG. 50 is a sectional view illustrating a configuration of a display apparatus with a touch detection function according to a third embodiment.
Figure 51:
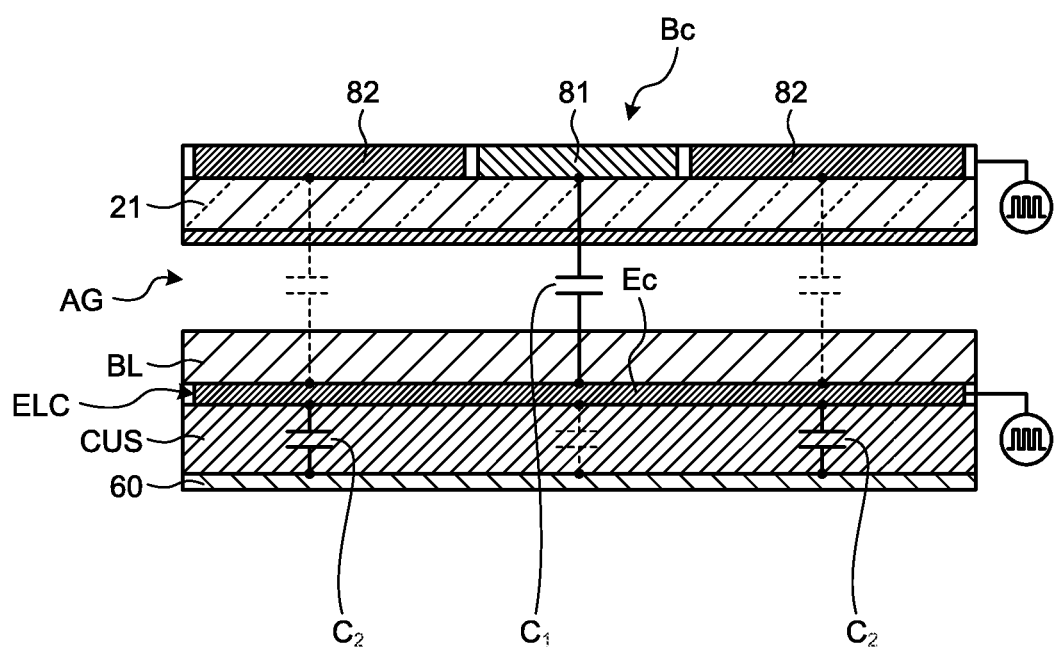
FIG. 51 is an enlarged sectional view of a portion surrounded by the broken line in FIG. 50.

Configuration of Display Apparatus with Touch Detection Function According to Third Embodiment FIG. 50 is a sectional view illustrating a configuration of a display apparatus with a touch detection function according to a third embodiment. FIG. 51 is an enlarged sectional view of a portion surrounded by the broken line in FIG. 50.

As illustrated in FIGS. 50 and 51, a display apparatus 1C with a touch detection function according to the third embodiment includes, in order from the side of an input surface IS, a cover member CG, a second optical element OD2, a counter substrate 3, a TFT substrate 21 including a drive electrode COML, a first optical element OD1, a backlight device BL, an intermediate electrode ELC, a cushion layer CUS, and a conductive film 60. Although not illustrated, a liquid crystal layer is arranged between the counter substrate 3 and the drive electrode COML. An air layer AG is arranged between the first optical element OD1 and the backlight device BL.

The drive electrode COML includes a plurality of drive electrode blocks Ba, Bb, Bc, Bd, and Be. Note that, unlike the first embodiment, each of the drive electrode blocks Ba, Bb, Bc, Bd, and Be includes a first drive electrode 81 and second drive electrodes 82 in the third embodiment. The first drive electrode 81 and the second drive electrodes 82 extend in an X direction. A space is provided between the first drive electrode 81 and the second drive electrodes 82.

When a force detector SE2 of the display apparatus 1C with a touch detection function detects force, the first drive electrode 81 is supplied with a reference potential (for example, a ground potential). Alternatively, a display drive voltage VcomDC may be supplied to the first drive electrode 81. A guard signal having the same phase and the same amplitude as a force detection drive signal is supplied to the second drive electrodes 82.

For example, the second drive electrode 82 is coupled with a drive electrode driver 14. The drive electrode driver 14 supplies a guard signal having the same phase and the same amplitude as a drive signal Vcomts2 to the second drive electrode 82. The second drive electrodes 82 of the drive electrode blocks Ba, Bb, Bc, Bd, and Be are coupled with respective voltage detectors DET.

The intermediate electrode blocks Ea, Eb, Ec, Ed, and Ee are not divided into first intermediate electrodes and second intermediate electrodes, but are single electrodes, similarly to the second embodiment. The drive signal Vcomts2 as a force detection drive signal is supplied to the intermediate electrode ELC, similarly to the second embodiment.

For example, the intermediate electrode blocks Ea, Eb, Ec, Ed, and Ee of the intermediate electrode ELC are coupled with the drive electrode driver 14, and are supplied with the drive signal Vcomts2 from the drive electrode driver 14. The intermediate electrode blocks Ea, Eb, Ec, Ed, and Ee are coupled with respective voltage detectors DET.

In the display apparatus 1C with a touch detection function, the drive electrode driver 14 sequentially selects one or more of the intermediate electrode blocks Ea, Eb, Ec, Ed, and Ee along a scanning direction (for example, a Y direction) when the force detector SE2 (see FIG. 1) performs the force detection operation. The drive electrode driver 14 then supplies the drive signal Vcomts2 as the force detection drive signal to the selected one or more of the intermediate electrode blocks Ea, Eb, Ec, Ed, and Ee. The drive electrode driver 14 supplies the guard signal in synchronization with the force detection drive signal to the second drive electrodes 82 corresponding to the selected one or more of the intermediate electrode blocks Ea, Eb, Ec, Ed, and Ee. The drive electrode driver 14 supplies the first drive electrodes 81 corresponding to the selected one or more of the intermediate electrode blocks Ea, Eb, Ec, Ed, and Ee, with the reference potential (for example, the ground potential). Alternatively, the drive electrode driver 14 supplies the display drive voltage VcomDC to the first drive electrodes 81 corresponding to the selected intermediate electrode blocks Ea, Eb, Ec, Ed, and Ee. The conductive film 60 is supplied with the reference potential (for example, the ground potential).

For example, as illustrated in FIG. 51, the drive electrode driver 14 supplies the drive signal Vcomts2 to the intermediate electrode block Ec, and supplies the guard signal in synchronization with the drive signal Vcomts2 to the second drive electrode 82 overlapping with the intermediate electrode block Ec when viewed from a Z direction. The drive electrode driver 14 drives the first drive electrode 81 overlapping with the intermediate electrode block Ec when viewed from the Z direction, to the reference potential (for example, the ground potential). With this configuration, a potential difference is generated between the intermediate electrode block Ec and the first drive electrode 81, and capacitance $C_1$ is generated. A potential difference is also generated between the intermediate electrode block Ec and the conductive film 60 overlapping with the intermediate electrode block Ec when viewed from the Z direction, and capacitance $C_2$ is generated.

Meanwhile, capacitance as illustrated by the broken line in FIG. 51 is not generated between the intermediate electrode block Ec and the second drive electrode 82 overlapping with the intermediate electrode block Ec when viewed from the Z direction. The reason is that the guard signal is supplied to the second drive electrode 82, and thus the intermediate electrode block Ec and the second drive electrode 82 have the same potential.

In the third embodiment, the intermediate electrode ELC and the second drive electrode 82 coupled with the voltage detector DET function as a force detection sensor. In the third embodiment, the intermediate electrode ELC and the second drive electrode 82 output a detection signal Vdet3 through the voltage detector DET.

Figure 52:
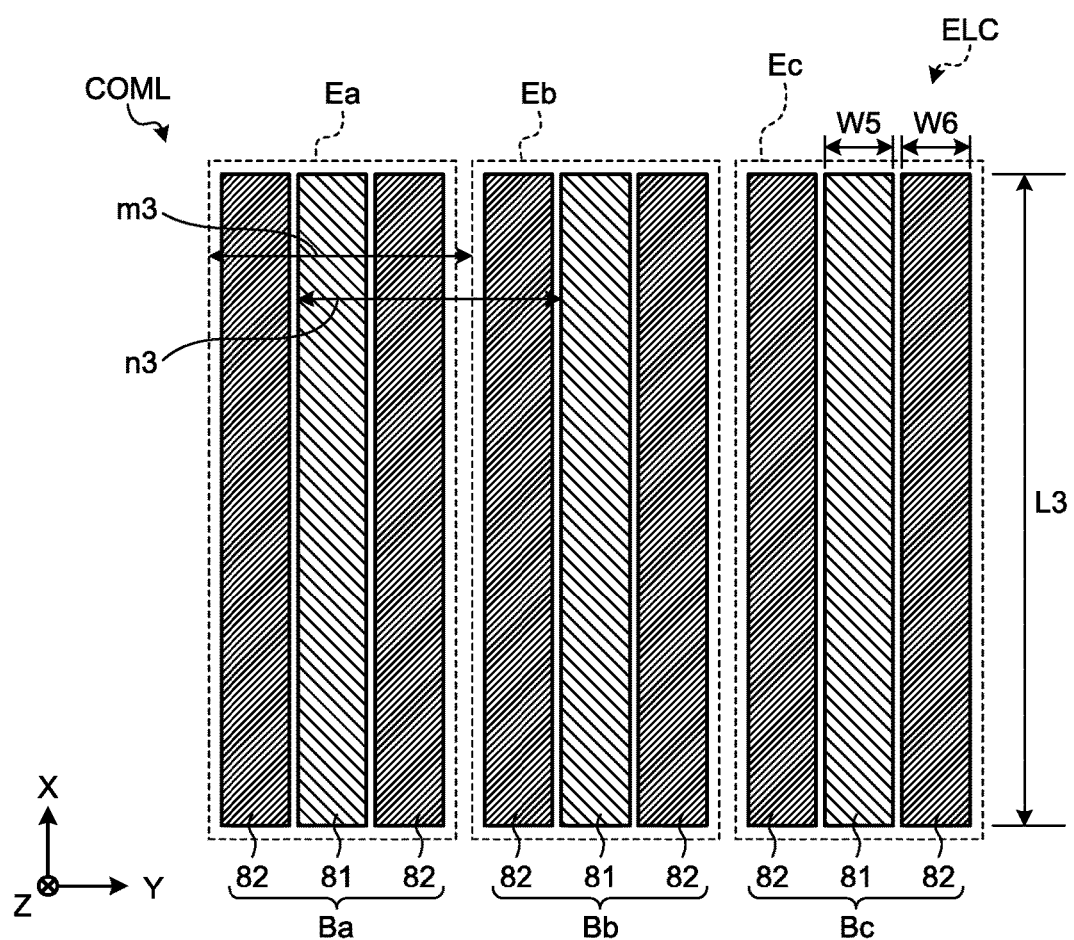
FIG. 52 is a plan view illustrating a configuration example of a drive electrode COML in the third embodiment.

FIG. 52 is a plan view illustrating a configuration example of a drive electrode COML in the third embodiment. FIG. 52 illustrates the intermediate electrode blocks Ea, Eb, and Ec of the intermediate electrode ELC by the broken lines to illustrate the positional relationship between the drive electrode COML and the intermediate electrode ELC when viewed from the Z direction. As illustrated in FIG. 52, the first drive electrodes 81 have a strip shape in plan view, and extend in an X direction. The second drive electrodes 82 also have a strip shape in plan view, and extend in the X direction. In a Y direction, each of the first drive electrodes 81 and the two associated second drive electrodes 82 are alternately arranged, and a space is provided between the first drive electrode 81 and the associated second drive electrodes 82. An arrangement interval n3 of the first drive electrodes 81 in the Y direction is the same as an arrangement interval m3 of the intermediate electrode blocks Ea, Eb, and Ec. With this configuration, three first drive electrodes 81 are arranged to overlap with respective intermediate electrode blocks Ea, Eb, and Ec when viewed from the Z direction.

The example of FIG. 52 illustrates a case in which the length of the first drive electrode 81 in the X direction and the length of the second drive electrode 82 in the X direction are the same. In FIG. 52, one first drive electrode 81 overlaps with one intermediate electrode block when viewed from the Z direction, and an area S5 of the first drive electrode 81 is calculated by S5=W5×L3. L3 is the length of the first drive electrode 81 in the X direction, and is also the length of the second drive electrode 82 in the X direction. W5 is the width of the first drive electrode 81 in the Y direction. Two second drive electrodes 82 overlap with one intermediate electrode block when viewed from the Z direction, and an area S6 of the two second drive electrodes 82 is calculated by S6=W6×L3×2. W6 is a width of the second drive electrode 82 in the Y direction. A ratio of the areas S5 and S6 can be expressed by the widths W5 and W6 by dividing the areas S5 and S6 by the length L3. In the example illustrated in FIG. 52, an arrangement interval n3 of the first drive electrodes 81 is the same as an arrangement interval m3 of the intermediate electrode blocks Ea, Eb, and Ec.

Detection Example of Capacitance Change in Third Embodiment

Next, a detection example of capacitance change per unit force in the third embodiment will be described.

Figure 53:
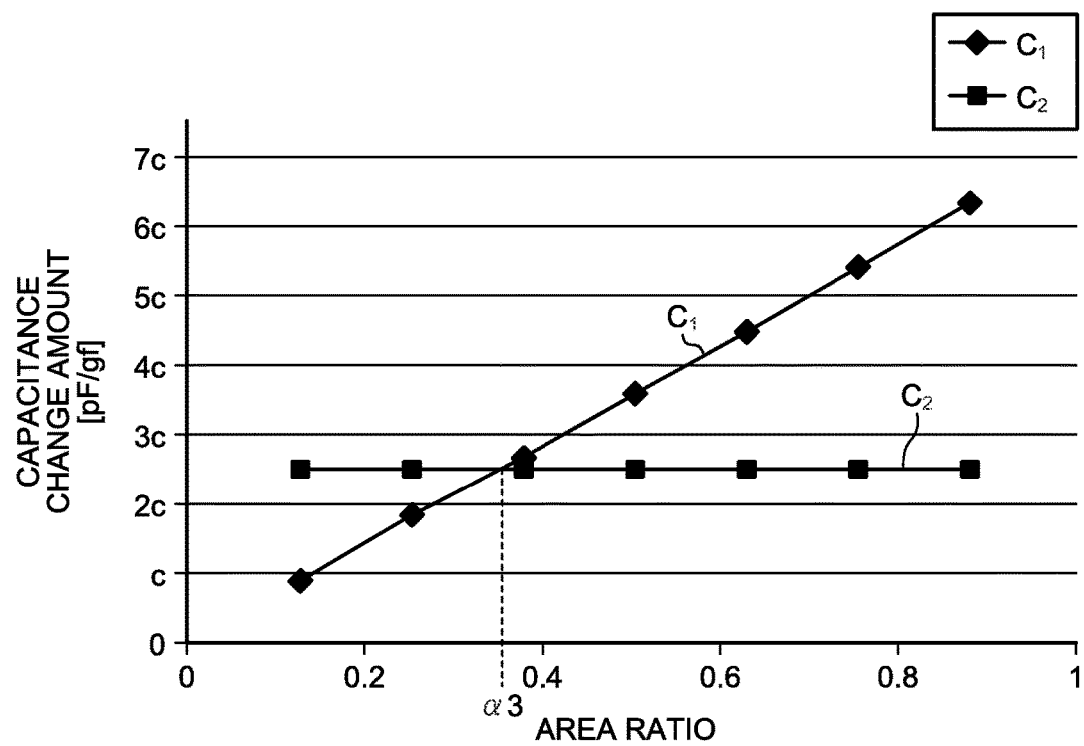
FIG. 53 is a graph illustrating a relationship between area ratios of first and second drive electrodes, and capacitance change amount per unit force according to the third embodiment.

FIG. 53 is a graph illustrating a relationship between area ratios of first and second drive electrodes, and capacitance change amount per unit force according to the third embodiment. The horizontal axis in FIG. 53 represents an area ratio S5/(S5+S6) of the first drive electrode 81 and the second drive electrode 82. The area S5 is an area, as viewed from the Z direction, of the first drive electrode 81 overlapping with one intermediate electrode block (for example, the intermediate electrode block Ec) when viewed from the Z direction. The area S6 is an area, as viewed from the Z direction, of the second drive electrode 82 overlapping with one intermediate electrode block when viewed from the Z direction. The vertical axis in FIG. 53 represents capacitance change amount per unit force [pF/gf], the force being applied from an input surface IS side, where "c" in the vertical axis is a constant.

A straight line $C_1$ in FIG. 53 indicates a change amount per unit force of the capacitance $C_1$. A straight line $C_2$ in FIG. 53 indicates a change amount per unit force of the capacitance $C_2$. In the third embodiment, the inclination of the straight line $C_2$ is substantially 0. The reason is that electrode plates of the capacitance $C_2$ are the intermediate electrode ELC and the conductive film 60, and the influence of the area ratio of the drive electrode COML, which is not the electrode plate, on a capacitance value of the capacitance $C_2$ is substantially 0.

In the third embodiment, a designer or the like obtains, in advance, an area ratio a3 when the change amount per unit force of the capacitance $C_1$ and the change amount per unit force of the capacitance $C_2$ are the same, similarly to the first embodiment. A method of obtaining the area ratio a3 is similar to that of the first embodiment, and examples of the method include a method using Expression (1) and a method of performing simulation, where a3 is larger than 0 and smaller than 1. In the display apparatus 1C with a touch detection function according to the third embodiment, if the area ratio S5/(S5+S6) of the first drive electrode 81 and the second drive electrode 82 is the specific area ratio a3 illustrated in FIG. 53, the change amount per unit force of the capacitance $C_1$ and the change amount per unit force of the capacitance $C_2$ become the same.

From this, in the third embodiment, the inclination in a first range R1 and the inclination in a second range R2 in a straight line (see FIG. 31) that indicates a relationship between force and a force signal value become the same, similarly to the first embodiment. The first range R1 is a range of force in which only the air layer AG becomes thin and the cushion layer CUS is not deformed, and the second range R2 is a range of force in which the thickness of the air layer AG reaches zero and the cushion layer CUS is elastically deformed according to force. The straight line that indicates the relationship between the force and the force signal value becomes a straight line 123 in an entire range R3 that is a combination of the first range R1 and the second range R2, and the inclination change at an inflection point P1 between the first range and the second range becomes small. In the display apparatus 1C with a touch detection function, a calculation amount of inclination correction of the straight line is reduced because the inclination change at the inflection point P1 becomes small in the straight line that indicates the relationship between the force and the force signal value.

Modification of Third Embodiment

Figure 54:
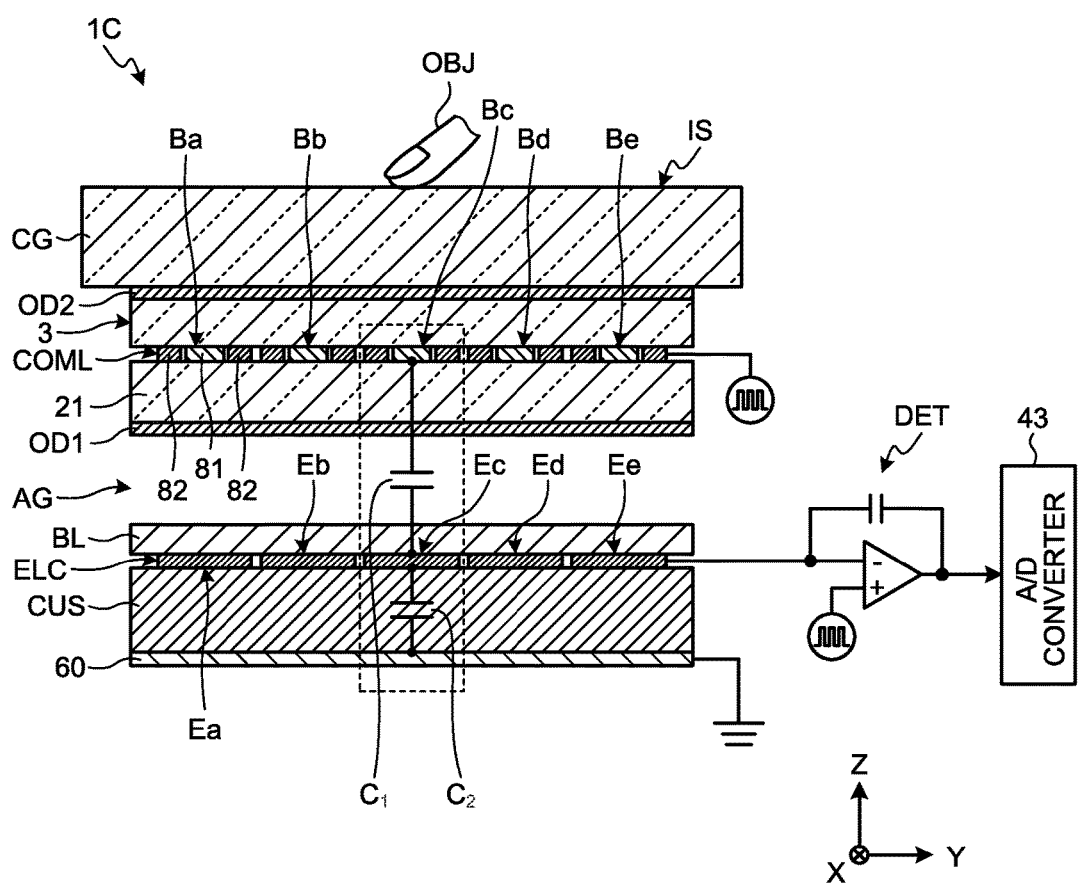
FIG. 54 is a sectional view illustrating a modification of the display apparatus with a touch detection function according to the third embodiment.

FIG. 54 is a sectional view illustrating a modification of the display apparatus with a touch detection function according to the third embodiment. As illustrated in FIG. 54, a voltage detector DET may not be coupled with a second drive electrode 82. In this case, the second drive electrode 82 is coupled with a drive electrode driver 14. Then, the drive electrode driver 14 supplies, to the second drive electrode 82, a signal that is the same as a drive signal Vcomts2 (for example, a guard signal having the same phase and the same amplitude as the drive signal Vcomts2) in synchronization with the drive signal Vcomts2. With this supply, an intermediate electrode block Ec and the second drive electrode 82 have the same potential, as illustrated in FIG. 51. Therefore, capacitance as illustrated by the broken line is not generated between the intermediate electrode block Ec and the second drive electrode 82. In a display apparatus 1C with a touch detection function illustrated in FIG. 54, the second drive electrode 82 is not coupled with the voltage detector DET, and thus does not function as a force detection sensor. Capacitance between the second drive electrode 82 and an object to be detected OBJ is not detected from the second drive electrode 82 through the voltage detector DET, and thus a capacitance calculator 52 can more accurately detect capacitance between a drive electrode COML and a conductive film 60.

In the third embodiment, the air layer AG may be replaced with a transparent cushion layer, similarly to the first embodiment. For example, in FIG. 50, a first cushion layer CUS1 may be arranged between a first optical element OD1 and a backlight device BL. In this case, the first cushion layer CUS1 is fabricated from a material more easily deformed (having lower Young's modulus) than a cushion layer (second cushion layer CUS2) between an intermediate electrode ELC and the conductive film 60. In such a configuration, if an area ratio S5/(S5+S6) of a first drive electrode 81 and the second drive electrode 82 is a specific area ratio a3 illustrated in FIG. 53, a change amount per unit force of capacitance $C_1$ and a change amount per unit force of capacitance $C_2$ become the same. With this configuration, as illustrated in FIG. 31, a straight line that indicates a relationship between force and a force signal value becomes a straight line 123 in an entire range R3 that is a combination of a first range R1 and a second range R2.

In the modification of the third embodiment, when a material used for the first cushion layer CUS1 and a material used for the second cushion layer CUS2 are transparent, it is favorable that a material having smaller capacitance change is used for the second cushion layer CUS2, and a material having larger capacitance change is used for the first cushion layer CUS1. The reason is that an electrode area generating the capacitance $C_1$ is smaller than an electrode area generating the capacitance $C_2$ in the third embodiment. Since the electrode area generating the capacitance $C_1$ is smaller and the degree of capacitance change is smaller, variation in detection of a capacitance value can be reduced by use of the material having a larger degree of capacitance change for the first cushion layer CUS1.

As described above, the display apparatus 1C with a touch detection function according to the third embodiment and the modification of the third embodiment includes the first drive electrodes 81 and the second drive electrodes 82, the conductive film 60, the intermediate electrode ELC, the first dielectric layer (for example, the air layer AG or the first cushion layer CUS1), and the second dielectric layer (for example, the cushion layer CUS or the second cushion layer CUS2). The first drive electrode 81 and the second drive electrode 82 face the input surface IS to which the object to be detected OBJ applies the force, and are supplied with the drive signal Vcomts2. The conductive film 60 faces the first drive electrode 81 and the second drive electrode 82, and is supplied with the reference potential (for example, the ground potential). The intermediate electrode ELC is arranged between the first drive electrode 81 and the second drive electrode 82, and the conductive film 60. The first dielectric layer (for example, the air layer AG or the first cushion layer CUS1) is arranged between the first drive electrode 81 and the second drive electrode 82, and the intermediate electrode ELC. The second dielectric layer (for example, the cushion layer CUS or the second cushion layer CUS2) is arranged between the intermediate electrode ELC and the conductive film 60. The first drive electrode 81 is supplied with the reference potential (for example, the ground potential). The second drive electrode 82 is supplied with the signal that is the same as the drive signal Vcomts2 (for example, the guard signal having the same phase and the same amplitude as the drive signal Vcomts2) in synchronization with the drive signal Vcomts2.

Configuration of Display Apparatus with Touch Detection Function According to Fourth Embodiment In an embodiment of the present invention, the scanning signal lines GCL may be operated as wiring to which a signal that drives the liquid crystal element LC (see FIG. 13) is supplied, and may be operated as the drive electrode COML of the force detector SE2 (see FIG. 1). For example, in the first to third embodiments, the scanning signal lines GCL may be used as the drive electrode COML of the force detector SE2.

Figure 55:
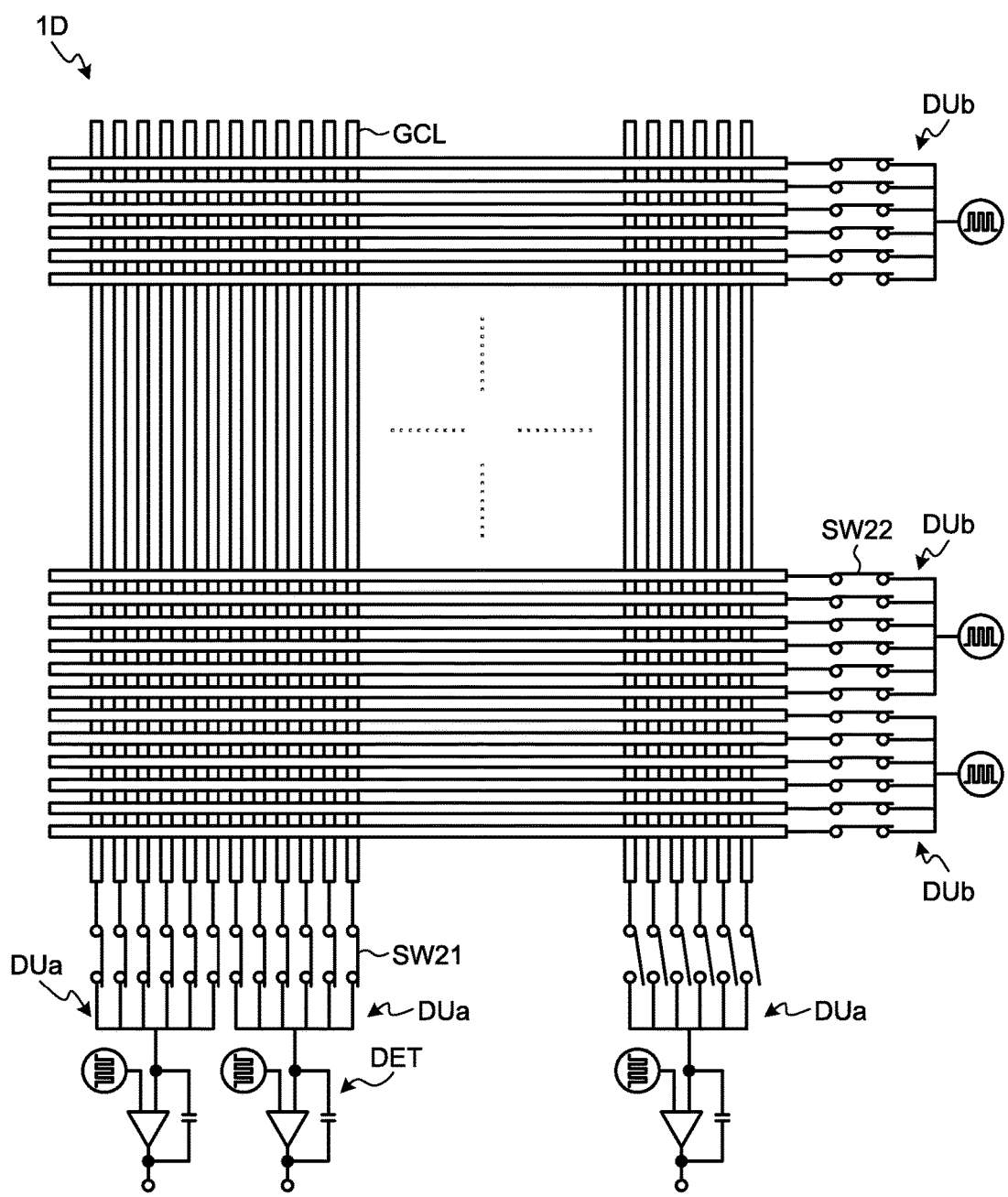
FIG. 55 is a diagram illustrating a connection example of scanning signal lines, operated as the drive electrode of a force detector, and voltage detectors DET according to a fourth embodiment.

FIG. 55 is a diagram illustrating a connection example of scanning signal lines, operated as the drive electrode of a force detector, and voltage detectors DET according to a fourth embodiment.

As illustrated in FIG. 55, in a display apparatus 1D with a touch detection function according to the fourth embodiment, the scanning signal lines GCL operated as the drive electrode COML of the force detector SE2 are arranged adjacent to one another. A switch SW21 is attached to each of the scanning signal lines GCL making up a scanning signal line block DUa. During a force detection period 137 (see FIG. 33), when the switches SW21 are turned ON, the scanning signal lines GCL are coupled in parallel to make up the single scanning signal line block DUa, and the single scanning signal line block DUa is coupled with one voltage detector DET. As illustrated in FIG. 55, the display apparatus 1D with a touch detection function according to the fourth embodiment includes a plurality of the scanning signal line blocks DUa.

One scanning signal line block DUa is used as one drive electrode block (for example, any one of drive electrode blocks Ba, Bb, Bc, Bd, and Be illustrated in FIG. 27). One intermediate electrode block (for example, any one of intermediate electrode blocks Ea, Eb, Ec, Ed, and Ee illustrated in FIG. 27) overlaps with one scanning signal line block DUa when viewed from the Z direction.

In a force detector SE2, a drive electrode driver 14 (see FIG. 1) sequentially selects one or more of the scanning signal line blocks DUa along a scanning direction $SC_1$. The drive electrode driver 14 then supplies a force detection drive signal or a guard signal to the selected one or more of the scanning signal line blocks DUa. Alternatively, the drive electrode driver 14 supplies the selected one or more of the scanning signal line blocks DUa with a reference potential.

In the first embodiment, when the scanning signal line block DUa is used as the drive electrode COML of the force detector SE2, the force detection drive signal (for example, the drive signal Vcomts2) is supplied to the scanning signal line block DUa. When the switches SW21 are turned ON, a voltage signal is output from the scanning signal line block DUa to the force detector DET. An output signal of the voltage detector DET is the detection signal Vdet3 according to the basic principle of self-capacitive touch detection.

In the second embodiment, when the scanning signal line block DUa is used as the drive electrode COML of the force detector SE2, the scanning signal line block DUa is supplied with the reference potential (for example, the ground potential). Alternatively, the scanning signal line block DUa is supplied with the display drive voltage VcomDC.

In the third embodiment, when the scanning signal line block DUa is used as the drive electrode COML of the force detector SE2, the scanning signal line block DUa is divided into a first scanning signal line as the first drive electrode 81 (see FIG. 51) and a second scanning signal line as the second drive electrode 82 (see FIG. 51) and used. The drive electrode driver 14 supplies the reference potential or the display drive voltage VcomDC to the first scanning signal line, and supplies the guard signal in synchronization with the drive signal Vcomts2 to the second scanning signal line.

In the third embodiment, when the scanning signal line block DUa is used as the drive electrode COML of the force detector SE2, the ratio of the area S5 of the first drive electrode 81 and the area S6 of the second drive electrode 82 can be replaced with a ratio of the number of the first scanning signal lines S'S overlapping with one intermediate electrode block when viewed from the Z direction and the number of the second scanning signal lines S'6 overlapping with one intermediate electrode block when viewed from the Z direction. The reason is that the lengths of the first and second scanning signal lines in an extending direction are the same, the widths of the first and second scanning signal lines are the same, and an area ratio of the first and second scanning signal lines is in accordance with the ratio of the numbers of the first and second scanning signal lines.

In the graph illustrated in FIG. 53, if a ratio S'5/(S'5+S'6) of the numbers of the first and second scanning signal lines is the specific ratio a3 obtained when the straight line $C_1$ and the straight line $C_2$ intersect with each other, a change amount per unit force of capacitance $C_1$ and a change amount per unit force of capacitance $C_2$ become the same.

As illustrated in FIG. 55, switches SW22 are attached to a plurality of pixel signal lines SGL. The pixel signal lines SGL are coupled with the drive electrode driver 14 (see FIG. 1) through the switches SW22. During a force detection period 137 (see FIG. 33), when the switches SW22 are turned ON, the pixel signal lines SGL are coupled in parallel to make up one pixel signal line block DUb.

The drive electrode driver 14 supplies the guard signal to the pixel signal line block DUb intersecting with the selected scanning signal line block DUa in synchronization with supply of the force detection drive signal or the guard signal to the selected scanning signal line block DUa. With this supply, generation of parasitic capacitance between the selected scanning signal line block DUa and the pixel signal line block DUb can be suppressed, and variation in the capacitance $C_1$ due to the parasitic capacitance can be decreased.

When the drive electrode driver 14 supplies the selected scanning signal line block DUa with the reference potential, the drive electrode driver 14 also supplies the pixel signal line block DUb intersecting with the selected scanning signal line block DUa, with the reference potential. When the drive electrode driver 14 supplies the display drive voltage VcomDC to the selected scanning signal line block DUa, the drive electrode driver 14 also supplies the display drive voltage VcomDC to the pixel signal line block DUb intersecting with the selected scanning signal line block DUa. With this supply, generation of parasitic capacitance between the selected scanning signal line block DUa and the pixel signal line block DUb can be suppressed, and variation in the capacitance $C_1$ due to the parasitic capacitance can be decreased.

The drive electrode driver 14 may supply the guard signal and the like not only to the pixel signal line blocks DUb but also to the drive electrode COML. For example, the drive electrode driver 14 supplies the guard signal to the drive electrode block overlapping with the selected scanning signal line block DUa when viewed from the Z direction in synchronization with the supply of the force detection drive signal or the guard signal to the selected scanning signal line block DUa.

When the drive electrode driver 14 supplies the selected scanning signal line block DUa with the reference potential, the drive electrode driver 14 also supplies the drive electrode block overlapping with the selected scanning signal line block DUa when viewed from the Z direction, with the reference potential. When the drive electrode driver 14 supplies the display drive voltage VcomDC to the selected scanning signal line block DUa, the drive electrode driver 14 also supplies the display drive voltage VcomDC to the drive electrode block overlapping with the selected scanning signal line block DUa when viewed from the Z direction. With this supply, generation of parasitic capacitance between the selected scanning signal line block DUa and the drive electrode COML can be suppressed, and variation in the capacitance $C_1$ due to the parasitic capacitance can be decreased.

In the fourth embodiment, each of the scanning signal lines GCL may be coupled with a corresponding one of the voltage detectors DET. However, in the example illustrated in FIG. 55, the scanning signal lines GCL are coupled in parallel and coupled with one voltage detector DET. With this configuration, the number of the voltage detectors DET can be decreased, as compared with the case of coupling the scanning signal lines GCL with the corresponding voltage detectors DET.

In the fourth embodiment, a pixel signal line block DUb that is made up of the pixel signal line SGL or the pixel signal lines SGL coupled in parallel may be used as the drive electrode COML of the force detector SE2, similarly to the case of using the scanning signal line CGL.

Favorable embodiments of the present invention have been described. However, the present invention is not limited by these embodiments. The content disclosed in the embodiments is merely an example, and various modifications can be made without departing from the gist of the present invention. The appropriate modifications made without departing from the gist of the present invention obviously belong to the technical scope of the present invention.

What is claimed is:

1. A force detection apparatus comprising:
   a first electrode facing an input surface to which an object to be detected applies force, and configured to be supplied with a drive signal;
   a conductor facing the first electrode, and supplied with a reference potential;
   a second electrode and a third electrode arranged between the first electrode and the conductor;
   a first dielectric layer arranged between the first electrode, and the second electrode and the third electrode; and
   a second dielectric layer arranged between the second electrode and the third electrode, and the conductor,
   wherein the second electrode is supplied with the reference potential,
   wherein a signal that is the same as the drive signal is supplied in synchronization with the drive signal to the third electrode, and
   wherein a change amount per unit force of a first capacitance obtained when a thickness of the first dielectric layer is decreased by the force is equal to a change amount per unit force of a second capacitance obtained when a thickness of the second dielectric layer is decreased by the force, the first capacitance being capacitance between the first electrode and the second electrode, and the second capacitance being capacitance between the third electrode and the conductor.

2. The force detection apparatus according to claim 1, wherein the second electrodes are arranged in a matrix in a plan view and the third electrodes are arranged in a matrix in a plan view.

3. A display apparatus comprising:
   the force detection apparatus according to claim 1; and
   a display function layer,
   wherein the display function layer overlaps with the first electrode in plan view.

4. A force detection apparatus comprising:
a first electrode facing an input surface to which an object to be detected applies force, and configured to be supplied with a drive signal;
a conductor facing the first electrode, and supplied with a reference potential;
a second electrode and a third electrode arranged between the first electrode and the conductor;
a first dielectric layer arranged between the first electrode, and the second electrode and the third electrode; and
a second dielectric layer arranged between the second electrode and the third electrode, and the conductor,
wherein the second electrode is supplied with the reference potential,
wherein a signal that is the same as the drive signal is supplied in synchronization with the drive signal to the third electrode,
wherein the second electrode has a strip shape and extends in a first direction,
wherein the third electrode has a strip shape and extends in the first direction, and
wherein the second electrode and the third electrode are adjacent to each other in a second direction intersecting with the first direction in plan view.

5. The force detection apparatus according to claim 4, wherein a length of the second electrode in the first direction is equal to a length of the third electrode in the first direction.

6. The force detection apparatus according to claim 4, wherein a plurality of the third electrodes is included, and wherein the third electrodes are arranged on both sides of the second electrode in the second direction.

7. The force detection apparatus according to claim 4, wherein a plurality of the second electrodes is included, and
wherein the second electrodes are arranged on both sides of the third electrode in the second direction.

8. An organic electro-luminescence display apparatus comprising:
a first electrode facing an input surface to which an object to be detected applies force, and configured to be supplied with a drive signal;
a conductor facing the first electrode, and supplied with a reference potential;
a second electrode and a third electrode arranged between the first electrode and the conductor;
a first dielectric layer arranged between the first electrode, and the second electrode and the third electrode;
a second dielectric layer arranged between the second electrode and the third electrode, and the conductor; and
an organic electro-luminescence display device arranged opposite the second electrode and the third electrode across the first electrode, and configured to display an image toward the input surface,
wherein the first electrode is coupled with an anode or a cathode of an organic electro-luminescence element,
wherein the second electrode is supplied with a reference potential, and
wherein a signal that is the same as the drive signal is supplied in synchronization with the drive signal to the third electrode, and
wherein a change amount per unit force of a first capacitance obtained when a thickness of the first dielectric layer is decreased by the force is equal to a change amount per unit force of a second capacitance obtained when a thickness of the second dielectric layer is decreased by the force, the first capacitance being capacitance between the first electrode and the second electrode, and the second capacitance being capacitance between the third electrode and the conductor.

9. An organic electro-luminescence display apparatus comprising:
a first electrode facing an input surface to which an object to be detected applies force, and configured to be supplied with a drive signal;
a conductor facing the first electrode, and supplied with a reference potential;
a second electrode and a third electrode arranged between the first electrode and the conductor;
a first dielectric layer arranged between the first electrode, and the second electrode and the third electrode;
a second dielectric layer arranged between the second electrode and the third electrode, and the conductor; and
an organic electro-luminescence display device arranged opposite the second electrode and the third electrode across the first electrode, and configured to display an image toward the input surface,
wherein the first electrode is coupled with an anode or a cathode of an organic electro-luminescence element,
wherein the second electrode is supplied with a reference potential,
wherein a signal that is the same as the drive signal is supplied in synchronization with the drive signal to the third electrode,
wherein the second electrode has a strip shape and extends in a first direction,
wherein the third electrode has a strip shape and extends in the first direction, and
wherein the second electrode and the third electrode are adjacent to each other in a second direction intersecting with the first direction in plan view.

10. A display apparatus comprising:
the force detection apparatus according to claim 4; and
a display function layer,
wherein the display function layer overlaps with the first electrode in plan view.

11. A force detection apparatus comprising:
a first electrode facing an input surface to which an object to be detected applies force, and configured to be supplied with a drive signal;
a conductor facing the first electrode, and supplied with a reference potential;
a second electrode and a plurality of third electrodes arranged between the first electrode and the conductor;
a first dielectric layer arranged between the first electrode, and the second electrode and the third electrodes; and
a second dielectric layer arranged between the second and third electrodes, and the conductor,
wherein the second electrode is supplied with the reference potential,
wherein a signal that is the same as the drive signal is supplied in synchronization with the drive signal to the third electrodes, and
wherein the third electrodes are arranged on both sides of the second electrode in the second direction.

12. A force detection apparatus comprising:
a first electrode facing an input surface to which an object to be detected applies force, and configured to be supplied with a drive signal;
a conductor facing the first electrode, and supplied with a reference potential;

a second electrode and a third electrode arranged between the first electrode and the conductor;
an air layer arranged between the first electrode, and the second electrode and the third electrode; and
a dielectric layer arranged between the second electrode and the third electrode, and the conductor,
wherein the second electrode is supplied with the reference potential, and
wherein a signal that is the same as the drive signal is supplied in synchronization with the drive signal to the third electrode.

13. A force detection apparatus comprising:
a first electrode facing an input surface to which an object to be detected applies force, and configured to be supplied with a drive signal;
a conductor facing the first electrode, and supplied with a reference potential;
a second electrode and a third electrode arranged between the first electrode and the conductor;
a first dielectric layer arranged between the first electrode, and the second electrode and the third electrode; and
a second dielectric layer arranged between the second electrode and the third electrode, and the conductor,
wherein the second electrode is supplied with the reference potential,
wherein a signal that is the same as the drive signal is supplied in synchronization with the drive signal to the third electrode, and
wherein the second electrode and the third electrode are arranged in the same layer.

14. A force detection apparatus comprising:
a first electrode facing an input surface to which an object to be detected applies force, and configured to be supplied with a drive signal;
a conductor facing the first electrode, and supplied with a reference potential;
a second electrode and a third electrode arranged between the first electrode and the conductor;
an air layer arranged between the first electrode, and the second electrode and the third electrode; and
a dielectric layer arranged between the second electrode and the third electrode, and the conductor,
wherein the second electrode is supplied with the reference potential,
wherein a signal that is the same as the drive signal is supplied in synchronization with the drive signal to the third electrode, and
wherein the second electrode and the third electrode are arranged in the same layer.

* * * * *